(12) United States Patent
Jeong

(10) Patent No.: US 12,316,855 B2
(45) Date of Patent: *May 27, 2025

(54) METHOD FOR ENCODING AND DECODING MOTION INFORMATION AND DEVICE FOR ENCODING AND DECODING MOTION INFORMATION

(71) Applicant: SAMSUNG ELECTRONICS CO., LTD., Suwon-si (KR)

(72) Inventor: Seung-soo Jeong, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 0 days.

This patent is subject to a terminal disclaimer.

(21) Appl. No.: 18/532,667

(22) Filed: Dec. 7, 2023

(65) Prior Publication Data

US 2024/0129484 A1 Apr. 18, 2024

Related U.S. Application Data

(63) Continuation of application No. 17/520,163, filed on Nov. 5, 2021, now Pat. No. 11,870,999, which is a
(Continued)

(51) Int. Cl.
*H04N 19/139* (2014.01)
*H04N 19/105* (2014.01)
(Continued)

(52) U.S. Cl.
CPC ......... *H04N 19/139* (2014.11); *H04N 19/105* (2014.11); *H04N 19/176* (2014.11); *H04N 19/577* (2014.11)

(58) Field of Classification Search
CPC .. H04N 19/139; H04N 19/105; H04N 19/176; H04N 19/577
(Continued)

(56) References Cited

U.S. PATENT DOCUMENTS

| 6,040,863 A | 3/2000 | Kato |
| 10,602,179 B2 | 3/2020 | Jeong et al. |

(Continued)

FOREIGN PATENT DOCUMENTS

| CN | 1106199 A | 8/1995 |
| CN | 105264894 A | 1/2016 |

(Continued)

OTHER PUBLICATIONS

Communication dated Apr. 22, 2024, issued by the National Intellectual Property Administration, PRC in Chinese Application No. 202310437000.7.
(Continued)

*Primary Examiner* — Nguyen T Truong
(74) *Attorney, Agent, or Firm* — Sughrue Mion, PLLC

(57) ABSTRACT

A method of decoding motion information according to an embodiment includes: determining a base motion vector of a current block; determining a primary differential motion vector for the current block based on information obtained from a bitstream from among one or more primary differential motion vector candidates classified according to a disparity distance and a disparity direction; and determining a motion vector of the current block by applying the primary differential motion vector to the base motion vector.

3 Claims, 34 Drawing Sheets

Related U.S. Application Data continuation of application No. 16/636,543, filed as application No. PCT/KR2018/010663 on Sep. 12, 2018, now Pat. No. 11,172,204.

(60) Provisional application No. 62/557,414, filed on Sep. 12, 2017.

(51) Int. Cl.
*H04N 19/176* (2014.01)
*H04N 19/577* (2014.01)

(58) Field of Classification Search
USPC .................................................. 375/240.15
See application file for complete search history.

(56) References Cited

U.S. PATENT DOCUMENTS

| | | | |
|---|---|---|---|
| 11,095,903 | B2 | 8/2021 | Jeong et al. |
| 11,523,130 | B2 | 12/2022 | Jeong et al. |
| 2005/0129117 | A1 | 6/2005 | Jeon |
| 2009/0028243 | A1 | 1/2009 | Suzuki et al. |
| 2010/0111183 | A1 | 5/2010 | Jeon et al. |
| 2011/0080954 | A1 | 4/2011 | Bossen et al. |
| 2012/0269270 | A1 | 10/2012 | Chen et al. |
| 2012/0269271 | A1 | 10/2012 | Chen et al. |
| 2013/0003851 | A1 | 1/2013 | Yu et al. |
| 2013/0177084 | A1 | 7/2013 | Wang et al. |
| 2015/0288981 | A1 | 10/2015 | Kim |
| 2016/0057433 | A1* | 2/2016 | Kudo ............... H04N 19/96 |
| 2016/0073115 | A1 | 3/2016 | Yoon et al. |
| 2018/0352247 | A1 | 12/2018 | Park et al. |
| 2020/0068215 | A1 | 2/2020 | Kim et al. |
| 2023/0043548 | A1 | 2/2023 | Jeong et al. |

FOREIGN PATENT DOCUMENTS

| | | |
|---|---|---|
| CN | 107113440 A | 8/2017 |
| EP | 2 684 356 B1 | 1/2016 |
| JP | 2006-279573 A | 10/2006 |
| JP | 2008-211697 A | 9/2008 |
| JP | 2013-34186 A | 2/2013 |
| JP | 2021-511754 A | 5/2021 |
| KR | 10-0991184 B1 | 11/2010 |
| KR | 10-2011-0023023 A | 3/2011 |
| KR | 10-1318869 B1 | 10/2013 |
| KR | 10-1441874 B1 | 9/2014 |
| KR | 10-2017-0078672 A | 7/2017 |
| KR | 10-2017-0086165 A | 7/2017 |
| WO | 2008/133455 A1 | 11/2008 |
| WO | 2011/025301 A2 | 3/2011 |
| WO | 2016/068685 A1 | 5/2016 |
| WO | 2017/039117 A1 | 3/2017 |
| WO | 2017/052081 A1 | 3/2017 |

OTHER PUBLICATIONS

Communication dated Feb. 18, 2024, issued by the National Intellectual Property Administration, PRC in Chinese Application No. 202310431192.0.
Chen et al., "Symmetrical mode for bi-prediction", Joint Video Exploration Team (JVET) of ITU-T SG 16 WP 3 and ISO/IEC JTC 1/SC 29/WG 11, JVET-J0063, 10th Meeting: San Diego, USA, Apr. 10-21, 2018, pp. 1-3 (3 pages total).
Communication dated Jan. 15, 2024 issued by the IP Australian Government in Application No. 2023200685.
Communication dated Nov. 30, 2023 issued by the Chinese Intellectual Property Office of PR China in Application No. 201880057556.0.
Communication dated Jan. 6, 2024 issued by the Chinese Intellectual Property Office of PR China in Application No. 202310437000.7.
Bross, Benjamin et al., "High Efficiency Video Coding (HEVC) text specification draft 10 (for FDIS & Last Call)", Joint Collaborative Team on Video Coding (JCT-VC) of ITU-T SG 16 WP 3 and ISO/IEC JTC 1/SC 29/WG 11, 12th Meeting: Geneva, CH, Jan. 14, 2013-Jan. 23, 2020, Document: JCTVC-L1003_v34. (310 pages total).
Wiegand, Thomas et al., "Overview of the H.264/AVC Video Coding Standard", IEEE Transactions on Circuits and Systems for Video Technology, vol. 13, No. 7, Jul. 2003, pp. 560-576. (17 pages total).
International Telecommunication Union, "Series H: Audiovisual and Multimedia Systems, Infrastructure of audiovisual services—Coding of moving video, High efficiency video coding" Recommendation ITU-T H.265 v2, Oct. 2014, 540 pages, url: https://www.itu.int/rec/T-REC-H.265-201410-S.
S. Jeong et al., "CE4 Ultimate motion vector expression in J0024 (Test 4.2.9)", Joint Video Experts Team (JVET) of ITU-T SG 16 WP 3 and ISO/IEC JTC 1/SC 29/WG 11, 11th Meeting, JVET-K0115-v1, Jul. 10-18, 2018, (6 pages total).
Sullivan, Gary J. et al., "Overview of the High Efficiency Video Coding (HEVC) Standard", IEEE Transactions on Circuits and Systems for Video Technology, vol. 22, No. 12, Dec. 2012, pp. 1649-1668. (20 pages total).
Communication dated Dec. 15, 2022 issued by Intellectual Property India in counterpart Indian Patent Application No. 202248042412.
Communication (PCT/ISA/237) issued Dec. 12, 2018 by the International Search Authority in counterpart International Patent Application No. PCT/KR2018/010663.
Communication issued on Jun. 6, 2023 by Brazil Patent Office for Brazilian Patent Application No. 112020001881-3.
Communication dated Dec. 15, 2022 issued by Intellectual Property India in counterpart Indian Patent Application No. 202248042416.
Communication dated Nov. 1, 2022 issued by the Japanese Patent Office in counterpart Japanese Patent Application No. 2020-511422.
Communication dated Apr. 19, 2021 issued by the European Intellectual Property Office in counterpart European Application No. 18856352.2.
Communication dated Dec. 15, 2022 issued by Intellectual Property India in counterpart Indian Patent Application No. 202248042513.
Communication issued on Jun. 6, 2023 by Brazil Patent Office for Brazilian Patent Application No. 122022003214-1.
Communication dated Dec. 15, 2022 issued by Intellectual Property India in counterpart Indian Patent Application No. 202248042417.
Communication dated Dec. 13, 2022 issued by Intellectual Property India in counterpart Indian Patent Application No. 202248042411.
Communication (KR OA) issued Jun. 17, 2020 by the Korean Intellectual Property Office in counterpart Korean Patent Application No. 10-2020-7001235.
Communication (PCT/ISA/210) issued Dec. 12, 2018 by the International Search Authority in counterpart International Patent Application No. PCT/KR2018/010663.
Communication issued Dec. 24, 2020 by the Korean Intellectual Property Office in counterpart Korean Patent Application No. 10-2020-7001235.
Communication dated Apr. 4, 2022 issued by Intellectual Property India in counterpart Indian Application No. 202047005819.
Communication issued on Aug. 19, 2023 by China National Intellectual Property Administration for Chinese Patent Application No. 202310437000.7.
Communication issued Nov. 7, 2023 the United Arab Emirates Ministry of Economy in counterpart UAE Patent Application No. P6000349/2020.
Communication issued Sep. 27, 2023 by the National Intellectual Property Administration, PRC in counterpart to Chinese Patent Application No. 202310431192.0.
Communication issued Oct. 3, 2023 by the Brazilian Patent Office in Brazilian Patent Application No. BR112020001881-3.
Communication issued Oct. 3, 2023 by the Brazilian Patent Office in Brazilian Patent Application No. BR122022003214-1.
Communication issued Oct. 3, 2023 by the Brazilian Patent Office in Brazilian Patent Application No. BR122022003217-6.
Communication issued Nov. 14, 2023 by the Japan Patent Office in Japanese Patent Application No. 2022-190952.

(56) References Cited

OTHER PUBLICATIONS

Communication issued Oct. 29, 2020 by the Korean Intellectual Property Office in counterpart Korean Patent Application No. 10-2020-7001235.
Communication dated Mar. 8, 2022 issued by the Korean Intellectual Property Office in counterpart Korean Application No. 10-2021-7040046.
Communication issued on Jun. 6, 2023 by Brazil Patent Office for Brazilian Patent Application No. 122022003217-6.
Communication dated May 21, 2024, issued by the National Intellectual Property Administration, PRC in Chinese Application No. 202310431192.0.
Chen, "Algorithm description for Versatile Video Coding and Test Model 1 (VTM 1)", Joint Video Experts Team (JVET) of ITU-T SG 16 WP3 and ISO/IEC JTC 1/ SC 29/WG 11, JVET-J1002-v1, Apr. 10-20, 2018, pp. 1-7 (7 pages total).
Li et al., "Multi-Type-Tree", Joint Video Exploration Team (JVET) of ITU-T SG 16 WP 3 and ISO/IEC JTC 1/SC 29/WG 11, JVET-D0117r1, Oct. 15-21, 2016, pp. 1-3 (3 pages total).
Huang et al., "EE2.1: Quadtree plus binary tree structure integration with JEM tools", Joint Video Exploration Team (JVET) of ITU-T SG 16 WP 3 and ISO/IEC JTC 1/SC 29/WG 11, JVET-C0024, May 26-Jun. 1, 2016, pp. 1-5 (5 pages total).
Li et al., "Multi-Type-Tree", Joint Video Exploration Team (JVET) of ITU-T SG 16 WP 3 and ISO/IEC JTC 1/SC 29/WG 11, JVET-D0117, Oct. 15-21, 2016, pp. 1-3 (3 pages total).

\* cited by examiner

FIG. 13

| BLOCK SHAPE / DEPTH | 0: SQUARE | 1: NS_VER | 2: NS_HOR |
|---|---|---|---|
| DEPTH OF D | 1300 | 1310 | 1320 |
| DEPTH OF D+1 | 1302 | 1312 | 1322 |
| DEPTH OF D+2 | 1304 | 1314 | 1324 |
| ... | ... | ... | ... |

FIG. 18
| SQUARE BLOCK | |
|---|---|
| (00)b |  |
| (01)b |  |
| (10)b |  |
| (11)b |  |
| NON-SQUARE BLOCK | |
|---|---|
| (0)b | 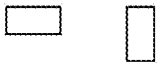 |
| (10)b |  |
| (11)b | 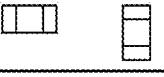 |

FIG. 19

| SQUARE BLOCK | |
|---|---|
| (00)b | □ |
| (10)b | ⊟ |
| (11)b | ⊞ |

| NON-SQUARE BLOCK | | |
|---|---|---|
| (0)b | ▭ | ▯ |
| (10)b | ▭▭ | ⊟ |
| (11)b | ▭▭ | ⊟ |

FIG. 29

|  |  | 0 | 1 |
|---|---|---|---|
| Cadidate group 0 | 0 | (1, 0), (−1, 0) | (−1, 0), (1, 0) |
|  | 1 | (0, 1), (0, −1) | (0, −1), (0, 1) |
| Cadidate group 1 | 0 | (2, 0), (−2, 0) | (−2, 0), (2, 0) |
|  | 1 | (0, 2), (0, −2) | (0, −2), (0, 2) |
| ⋮ | ⋮ | ⋮ | ⋮ |
| Cadidate group 7 | 0 | (128, 0), (−128, 0) | (−128, 0), (128, 0) |
|  | 1 | (0, 128), (0, −128) | (0, −128), (0, 128) |

FIG. 31

|  |  | 0 | 1 |
|---|---|---|---|
| Cadidate group 0 | 0 | (1, 0), (1, 0) | (−1, 0), (−1, 0) |
|  | 1 | (0, 1), (0, 1) | (0, −1), (0, −1) |
| Cadidate group 1 | 0 | (2, 0), (2, 0) | (−2, 0), (−2, 0) |
|  | 1 | (0, 2), (0, 2) | (0, −2), (0, −2) |
| ⋮ | ⋮ | ⋮ | ⋮ |
| Cadidate group 7 | 0 | (128, 0), (128, 0) | (−128, 0), (−128, 0) |
|  | 1 | (0, 128), (0, 128) | (0, −128), (0, −128) |

METHOD FOR ENCODING AND DECODING MOTION INFORMATION AND DEVICE FOR ENCODING AND DECODING MOTION INFORMATION

CROSS REFERENCE TO RELATED APPLICATION

This application is a Continuation application of U.S. application Ser. No. 17/520,163 filed Nov. 5, 2021, which is a Continuation application of U.S. application Ser. No. 16/636,543 filed Feb. 4, 2020, which is a National Stage of International Application No. PCT/KR2018/010663 filed Sep. 12, 2018, which claims priority to U.S. Provisional Application No. 62/557,414 filed Sep. 12, 2017, the entire contents of which are incorporated herein by reference.

TECHNICAL FIELD

The present disclosure relates to the field of image encoding and decoding. More particularly, the present disclosure relates to a method and apparatus for encoding motion information used for image encoding and decoding, and a method and apparatus for decoding motion information used for image encoding and decoding.

BACKGROUND ART

In a method of encoding and decoding an image, in order to encode an image, one picture may be split into blocks and each of the blocks may be prediction encoded by using inter prediction or intra prediction.

Inter prediction refers to a method of compressing an image by removing temporal redundancy between pictures, and a representative example thereof is motion estimation encoding. In motion estimation encoding, blocks of a current picture are predicted by using at least one reference picture. A reference block that is most similar to a current block may be found within a predetermined search range by using a predetermined evaluation function. A current block is predicted based on a reference block, and a residual block, which is generated by subtracting from the current block a prediction block generated as a prediction result, is encoded. In this case, in order to more accurately perform prediction, interpolation is performed on a search range of the reference picture, sub-pel-unit pixels smaller than integer-pel-unit pixels may be generated, and inter prediction may be performed on the generated sub-pel-unit pixels.

In a codec such as H.264 advanced video coding (AVC) and high efficiency video coding (HEVC), in order to predict a motion vector of a current block, a motion vector of previously encoded blocks adjacent to the current block or blocks included in a previously encoded picture is used as a prediction motion vector of the current block. A differential motion vector, which is a difference between the prediction motion vector and the motion vector of the current block, is signaled to a decoder by using a predetermined method.

DESCRIPTION OF EMBODIMENTS

Technical Problem

According to an embodiment, provided is a method of encoding and decoding motion information and an apparatus for encoding and decoding motion information which may represent motion information by using a small number of bits.

Also, according to an embodiment, provided is a method of encoding and decoding motion information and an apparatus for encoding and decoding motion information which may represent a differential motion vector by using a small number of bits.

Solution to Problem

A method of decoding motion information according to an embodiment of the present disclosure includes: determining a base motion vector of a current block; determining a primary differential motion vector for the current block based on information obtained from a bitstream from among one or more primary differential motion vector candidates classified according to a disparity distance and a disparity direction; and determining a motion vector of the current block by applying the primary differential motion vector to the base motion vector.

In an embodiment, the determining of the motion vector of the current block may include: obtaining, from the bitstream, information indicating a secondary differential motion vector related to the current block; and determining the motion vector of the current block by applying the secondary differential motion vector determined based on the information indicating the secondary differential motion vector to the base motion vector changed by applying the primary differential motion vector.

Advantageous Effects of Disclosure

A method of encoding and decoding motion information and an apparatus for encoding and decoding motion information according to an embodiment may represent motion information by using a small number of bits.

Also, a method of encoding and decoding motion information and an apparatus for encoding and decoding motion information according to an embodiment may represent a differential motion vector by using a small number of bits.

However, technical effects achievable by a method of encoding and decoding motion information and an apparatus for encoding and decoding motion information according to an embodiment are not limited thereto, and other unmentioned technical effects will be apparent to one of ordinary skill in the art from the following description.

BRIEF DESCRIPTION OF DRAWINGS

A brief explanation of each drawing is provided to more fully understand the accompanying drawings.

FIG. 13 illustrates a process of determining a depth of a coding unit as a shape and a size of the coding unit change, when the coding unit is recursively split such that a plurality of coding units are determined, according to an embodiment.

FIG. 18 illustrates various shapes of a coding unit determinable based on split shape mode information representable as a binary code, according to an embodiment.

FIG. 19 illustrates other shapes of a coding unit determinable based on split shape information representable as a binary code, according to an embodiment.

FIG. 29 is a diagram illustrating primary differential motion vector candidates for a current block that is bi-directionally predicted.

FIG. 31 is a diagram illustrating primary differential motion vector candidates for a current block that is bi-directionally predicted.

BEST MODE

Figure 1:
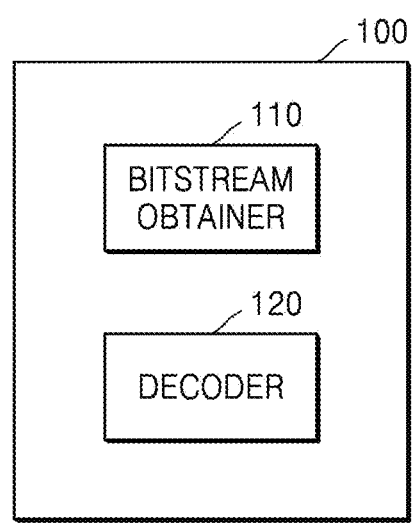
FIG. 1 is a block diagram of an image decoding apparatus according to an embodiment.

A method of decoding motion information according to an embodiment of the present disclosure includes: determining a base motion vector of a current block; determining a primary differential motion vector for the current block based on information obtained from a bitstream from among one or more primary differential motion vector candidates classified according to a disparity distance and a disparity direction; and determining a motion vector of the current block by applying the primary differential motion vector to the base motion vector.

In an embodiment, the determining of the motion vector of the current block may include: obtaining, from the bitstream, information indicating a secondary differential motion vector related to the current block; and determining the motion vector of the current block by applying the secondary differential motion vector determined based on the information indicating the secondary differential motion vector to the base motion vector changed by applying the primary differential motion vector.

In an embodiment, the method may further include obtaining, from the bitstream, an index indicating at least one of the disparity distance and the disparity direction of the primary differential motion vector, wherein the determining of the primary differential motion vector includes determining a primary differential motion vector candidate corresponding to the obtained index from among the one or more primary differential motion vector candidates as the primary differential motion vector for the current block.

In an embodiment, the method may further include determining one base motion vector candidate from among one or more base motion vector candidates as the base motion vector of the current block.

In an embodiment, the determining of the motion vector of the current block may include: when the base motion vector of the current block corresponds to a bi-directional motion vector, a prediction direction of the current block corresponds to a bi-direction, and the primary differential motion vector is determined for a first uni-direction, determining the primary differential motion vector for a second uni-direction based on the primary differential motion vector for the first uni-direction; determining the motion vector of the first uni-direction of the current block by applying the primary differential motion vector for the first uni-direction to the base motion vector of the first uni-direction; and determining the motion vector for the second uni-direction of the current block by applying the primary differential motion vector for the second uni-direction to the base motion vector of the second uni-direction.

In an embodiment, the determining of the primary differential motion vector for the second uni-direction may include determining at least one of a size and a sign of a component value of the primary differential motion vector for the second uni-direction, based on a positional relationship among a reference picture corresponding to the base motion vector of the first uni-direction, a reference picture corresponding to the base motion vector of the second uni-direction, and a current picture including the current block.

In an embodiment, the determining of the motion vector of the current block may include: when the base motion vector of the current block corresponds to a motion vector of a first uni-direction and a prediction direction of the current block corresponds to a second uni-direction different from the first uni-direction, determining the base motion vector of the second uni-direction based on the base motion vector of the first uni-direction and determining the primary differential motion vector for the second uni-direction based on the primary differential motion vector for the first uni-direction; and determining the motion vector of the current block by applying the primary differential motion vector for the second uni-direction to the base motion vector of the second uni-direction.

In an embodiment, the determining of the motion vector of the current block may include: when the base motion vector of the current block corresponds to a motion vector of a first uni-direction and a prediction direction of the current block corresponds to a bi-direction, determining the base motion vector of a second uni-direction based on the base motion vector of the first uni-direction and determining the primary differential motion vector for the second uni-direction based on the primary differential motion vector for the first uni-direction; determining the motion vector of the first uni-direction of the current block by applying the primary differential motion vector for the first uni-direction to the base motion vector of the first uni-direction; and determining the motion vector of the second uni-direction of the current block by applying the primary differential motion vector for the second uni-direction to the base motion vector of the second uni-direction.

In an embodiment, the method may further include entropy decoding at least some of indexes indicating the primary differential motion vector from the bitstream according to a context model.

In an embodiment, the method may further include determining the one or more primary differential motion vector candidates for each of one or more base motion vector candidates, wherein a primary differential motion vector candidate determined to correspond to a bi-directional base motion vector candidate from among the one or more primary differential motion vector candidates includes a primary differential motion vector candidate of a list 0 direction and a primary differential motion vector candidate of a list 1 direction having values of the same sign or opposite signs.

In an embodiment, a size of a value of at least one of the primary differential motion vector candidate of the list 0 direction and the primary differential motion vector candidate of the list 1 direction may be scaled in consideration of a distance between a first reference picture corresponding to a base motion vector candidate of a first uni-direction, a current picture including the current block, and a second reference picture corresponding to a base motion vector candidate of a second uni-direction.

In an embodiment, the method may further include: when the current block corresponds to a first child block split from a parent block, determining the motion vector of the current block as a base motion vector of a second child block; and determining a motion vector of the second child block by applying a primary differential motion vector determined for the second child block to the base motion vector of the second child block.

In an embodiment, the method may further include, when the current block corresponds to a first child block split from a parent block, applying, to a second child block, at least one from among information indicating the base motion vector obtained in relation to the current block, information indicating the disparity distance, and information indicating the disparity direction.

In an embodiment, the method may further include obtaining information indicating at least one from among whether a predetermined coding mode is applied to the current block, the base motion vector for the current block, the primary differential motion vector for the current block, a priority between disparity distances, and a priority between disparity directions, at at least one of a transform unit level, a coding unit level, a largest coding unit level, a slice level, and a picture level.

A method of encoding motion information according to an embodiment of the present disclosure includes:
determining a base motion vector of a current block;
determining a primary differential motion vector for the current block from among one or more primary differential motion vector candidates classified according to a disparity distance and a disparity direction, based on a difference between a motion vector of the current block and the base motion vector; and generating a bitstream including at least one of information indicating the base motion vector and information indicating the primary differential motion vector.

MODE OF DISCLOSURE

As the present disclosure allows for various changes and numerous embodiments, exemplary embodiments will be illustrated in the drawings and described in detail in the written description. However, this is not intended to limit the present disclosure to particular modes of practice, and it is to be appreciated that all changes, equivalents, and replacements that do not depart from the spirit and technical scope of the present disclosure are encompassed in the present disclosure.

In the description of the present disclosure, certain detailed explanations of the related art are omitted when it is deemed that they may unnecessarily obscure the essence of the present disclosure. Also, numbers (e.g., first and second) used in the description of embodiments of the disclosure are intended to merely distinguish one component from another.

When a component is referred to as being "connected" or "accessed" to or by any other component, it should be understood that the component may be directly connected or accessed to or by the other component, but another new component may also be interposed between them, unless otherwise specifically indicated.

Regarding an element with a suffix such as 'unit' or 'module', two or more elements may be combined into one element or one element may be divided into two or more elements according to functions. In addition, each of respective components to be described below may additionally perform some or all functions among functions which other components take charge of in addition to a primary function which each component takes charge of, and some functions among primary functions which the respective components take charge of may be exclusively performed by other components.

Also, the term 'image' or picture' used herein may refer to a still image of a video, or a moving image, i.e., a video itself.

Also, the term 'sample' used herein refers to data that is assigned to a sampling location of an image and is to be processed. For example, pixels in an image of a spatial domain or transform coefficients in a transform domain may be samples. A unit including one or more samples may be defined as a block.

Also, the term 'current block' used herein may refer to a block of a largest coding unit, a coding unit, a prediction unit, or a transform unit of a current image to be encoded or decoded.

Also, in the present specification, when a motion vector is in a list 0 direction, it may mean that the motion vector is a motion vector used to indicate a block in a reference picture included in a list 0, and when a motion vector is in a list 1 direction, it may mean that the motion vector is a motion vector used to indicate a block in a reference picture included in a list 1. Also, when a motion vector is uni-directional, it may mean that the motion vector is a motion vector used to indicate a block in a reference picture included in the list 0 or the list 1, and when a motion vector is bi-directional, it may mean that the motion vector includes a motion vector in the list 0 direction and a motion vector in the list 1 direction.

An image encoding method and apparatus and an image decoding method and apparatus based on transform units and coding units having a tree structure according to an embodiment will be described with reference to FIGS. 1 through 20. An image encoding apparatus 200 and an image decoding apparatus 100 to be described with reference to FIGS. 1 through 20 may respectively include an image encoding apparatus 3300 and an image decoding apparatus 2100 to be described with reference to FIGS. 21 through 34.

FIG. 1 is a block diagram of an image decoding apparatus 100 according to an embodiment.

The image decoding apparatus 100 may include a bitstream obtainer 110 and a decoder 120. The bitstream obtainer 110 and the decoder 120 may include at least one processor. Also, the bitstream obtainer 110 and the decoder 120 may include a memory in which instructions to be executed by at least one processor are stored.

The bitstream obtainer 110 may receive a bitstream. The bitstream includes information obtained when the image encoding apparatus 200 encodes an image as described below. Also, the bitstream may be transmitted from the image encoding apparatus 200. The image encoding apparatus 200 and the image decoding apparatus 100 may be connected to each other by wire or wirelessly, and the bitstream obtainer 110 may receive the bitstream by wire or wirelessly. The bitstream obtainer 110 may receive the bitstream from a storage medium such as an optical medium or a hard disk. The decoder 120 may reconstruct an image based on information obtained from the received bitstream. The decoder 120 may obtain a syntax element for reconstructing the image from the bitstream. The decoder 120 may reconstruct the image based on the syntax element.

Operations of the image decoding apparatus 100 will be described in detail. The bitstream obtainer 110 may receive a bitstream.

The image decoding apparatus 100 may perform an operation of obtaining a bin string corresponding to a split shape mode of a coding unit from the bitstream. The image decoding apparatus 100 may perform an operation of determining a splitting rule of the coding unit. Also, the image decoding apparatus 100 may perform an operation of splitting the coding unit into a plurality of coding units, based on at least one of the bin string corresponding to the split shape mode and the splitting rule. The image decoding apparatus 100 may determine an allowable first range of a size of the coding unit, according to a ratio between a width and a height of the coding unit, in order to determine the splitting rule. The image decoding apparatus 100 may determine an allowable second range of a size of the coding unit, according to the split shape mode of the coding unit, in order to determine the splitting rule.

Splitting of a coding unit according to an embodiment of the present disclosure will be described in detail.

First, one picture may be split into one or more slices. One slice may be a sequence of largest coding units (coding tree units (CTUs)). There is a largest coding block (coding tree block (CTB)) conceptually compared to a largest coding unit (CTU).

A largest coding block (CTB) refers to an N×N block including N×N samples (N is an integer). Each color component may be split into one or more largest coding blocks.

When a picture has three sample arrays (sample arrays for Y, Cr, and Cb components), a largest coding unit (CTU) includes a largest coding block of a luma sample, two corresponding largest coding blocks of chroma samples, and syntax structures used to encode the luma sample and the chroma samples. When a picture is a monochrome picture, a largest coding unit includes a largest coding block of a monochrome sample and syntax structures used to encode the monochrome samples. When a picture is a picture having color planes separated according to color components, a largest coding unit includes syntax structures used to encode the picture and samples of the picture.

One largest coding block (CTB) may be split into M×N coding blocks including M×N samples (M and N are integers).

When a picture has sample arrays for Y, Cr, and Cb components, a coding unit (CU) includes a coding block of a luma sample, two corresponding coding blocks of chroma samples, and syntax structures used to encode the luma sample and the chroma samples. When a picture is a monochrome picture, a coding unit includes a coding block of a monochrome sample and syntax structures used to encode the monochrome samples. When a picture is a picture having color planes separated according to color components, a coding unit includes syntax structures used to encode the picture and samples of the picture.

As described above, a largest coding block and a largest coding unit are conceptually distinguished from each other, and a coding block and a coding unit are conceptually distinguished from each other. That is, a (largest) coding unit refers to a data structure including a (largest) coding block including a corresponding sample and a syntax structure corresponding to the (largest) coding block. However, because it is understood by one of ordinary skill in the art that a (largest) coding unit or a (largest) coding block refers to a block of a predetermined size including a predetermined number of samples, a largest coding block and a largest coding unit, or a coding block and a coding unit are mentioned in the following specification without being distinguished unless otherwise described.

An image may be split into largest coding units (CTUs). A size of each largest coding unit may be determined based on information obtained from a bitstream. A shape of each largest coding unit may be a square shape of the same size. However, the present disclosure is not limited thereto.

For example, information about a maximum size of a luma coding block may be obtained from a bitstream. For example, the maximum size of the luma coding block indicated by the information about the maximum size of the luma coding block may be one of 4×4, 8×8, 16×16, 32×32, 64×64, 128×128, and 256×256.

For example, information about a luma block size difference and a maximum size of a luma coding block that may be split into two may be obtained from a bitstream. The information about the luma block size difference may refer to a size difference between a luma largest coding unit and a largest luma coding block that may be split into two. Accordingly, when the information about the maximum size of the luma coding block that may be split into two and the information about the luma block size difference obtained from the bitstream are combined with each other, a size of the luma largest coding unit may be determined. A size of a chroma largest coding unit may be determined by using the size of the luma largest coding unit. For example, when a Y:Cb:Cr ratio is 4:2:0 according to a color format, a size of a chroma block may be half a size of a luma block, and a size of a chroma largest coding unit may be half a size of a luma largest coding unit.

According to an embodiment, because information about a maximum size of a luma coding block that is binary splittable is obtained from a bitstream, the maximum size of the luma coding block that is binary splittable may be variably determined. In contrast, a maximum size of a luma coding block that is ternary splittable may be fixed. For example, the maximum size of the luma coding block that is ternary splittable in an I-slice may be 32×32, and the maximum size of the luma coding block that is ternary splittable in a P-slice or a B-slice may be 64×64.

Also, a largest coding unit may be hierarchically split into coding units based on split shape mode information obtained from a bitstream. At least one of information indicating whether quad splitting is performed, information indicating whether multi-splitting is performed, split direction information, and split type information may be obtained as the split shape mode information from the bitstream.

For example, the information indicating whether quad splitting is performed may indicate whether a current coding unit is quad split (QUAD_SPLIT) or not.

When the current coding unit is not quad split, the information indicating whether multi-splitting is performed may indicate whether the current coding unit is no longer split (NO_SPLIT) or binary/ternary split.

When the current coding unit is binary split or ternary split, the split direction information indicates that the current coding unit is split in one of a horizontal direction and a vertical direction.

When the current coding unit is split in the horizontal direction or the vertical direction, the split type information indicates that the current coding unit is binary split or ternary split.

A split mode of the current coding unit may be determined according to the split direction information and the split type information. A split mode when the current coding unit is binary split in the horizontal direction may be determined to be a binary horizontal split mode (SPLIT_BT_HOR), a split mode when the current coding unit is ternary split in the horizontal direction may be determined to be a ternary horizontal split mode (SPLIT_TT_HOR), a split mode when the current coding unit is binary split in the vertical direction may be determined to be a binary vertical split mode (SPLIT_BT_VER), and a split mode when the current coding unit is ternary split in the vertical direction may be determined to be a ternary vertical split mode (SPLIT_TT_VER).

The image decoding apparatus 100 may obtain split shape mode information from a bitstream from one bin string. The bitstream received by the image decoding apparatus 100 may include a fixed length binary code, a unary code, a truncated unary code, a pre-determined binary code, etc. The bin string is a binary sequence of information. The bin string may include at least one bit. The image decoding apparatus 100 may obtain the split shape mode information corresponding to the bin string based on a splitting rule. The image decoding apparatus 100 may determine whether or not to quad split a coding unit, a split direction, and a split type, based on one bin string.

A coding unit may be equal to or smaller than a largest coding unit. For example, because a largest coding unit is a coding unit having a maximum size, the largest coding unit is one of coding units. When split shape mode information about a largest coding unit indicates that splitting is not performed, a coding unit determined in the largest coding unit has the same size as that of the largest coding unit. When split shape code information about a largest coding unit indicates that splitting is performed, the largest coding unit may be split into coding units. Also, when split shape mode information about a coding unit indicates that splitting is performed, the coding unit may be split into smaller coding units. However, splitting of an image is not limited thereto, and a largest coding unit and a coding unit may not be distinguished from each other. Splitting of a coding unit will be described in more detail with reference to FIGS. 3 through 16.

Also, one or more prediction blocks for prediction may be determined from a coding unit. A prediction block may be equal to or smaller than a coding unit. Also, one or more transform blocks for transform may be determined from a coding unit. A transform block may be equal to or smaller than a coding unit.

Shapes and sizes of a transform block and a prediction block may not be related to each other.

In another embodiment, prediction may be performed by using a coding unit as a prediction unit. Also, transform may be performed by using a coding unit as a transform block.

Splitting of a coding unit will be described in more detail with reference to FIGS. 3 through 16. Each of a current block and a neighboring block of the present disclosure may indicate one of a largest coding unit, a coding unit, a prediction block, and a transform block. Also, a current block or a current coding unit is a block on which decoding or encoding is currently performed or a block on which splitting is currently performed. A neighboring block may be a block that is reconstructed before a current block. A neighboring block may be spatially or temporally adjacent to a current block. A neighboring block may be located at one of a left lower side, a left side, a left upper side, an upper side, a right upper side, a right side, and a right lower side of a current block.

Figure 3:
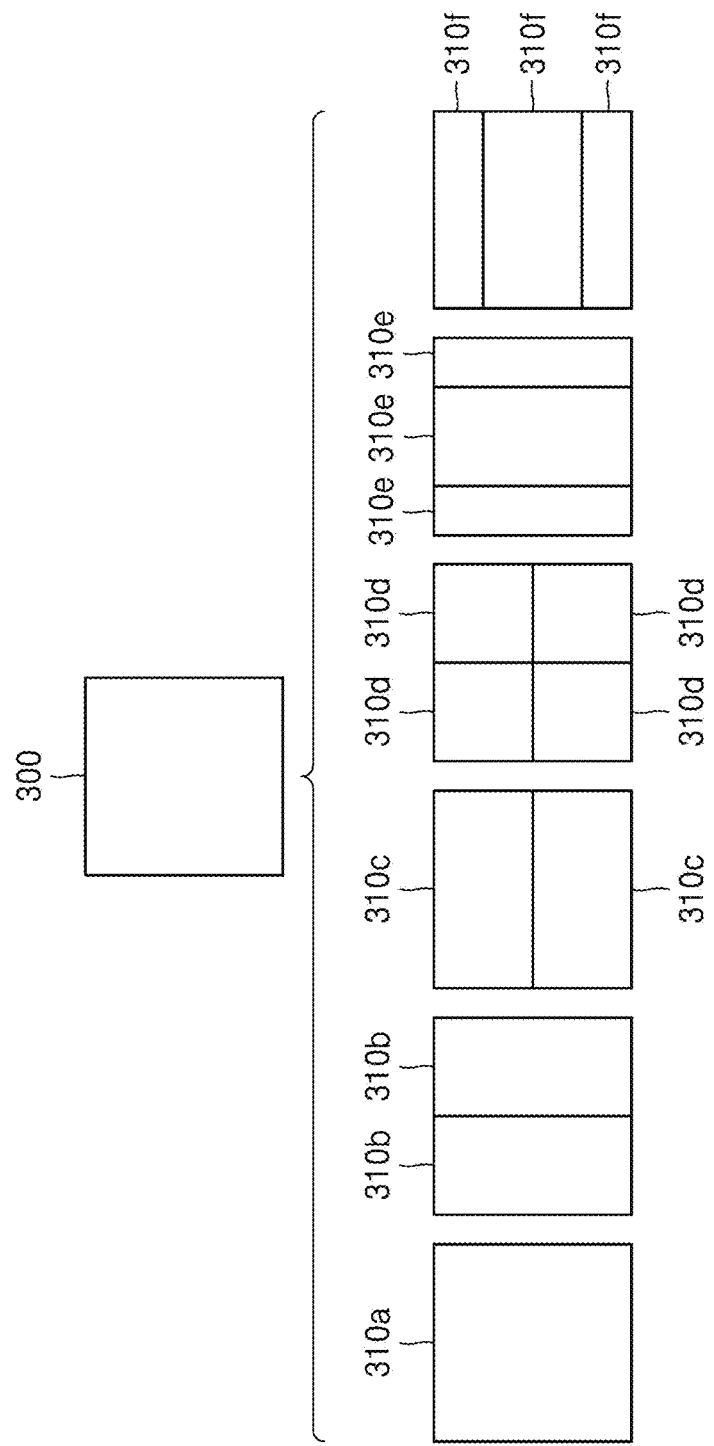
FIG. 3 illustrates a process, performed by the image decoding apparatus, of determining at least one coding unit by splitting a current coding unit, according to an embodiment.

FIG. 3 illustrates a process, performed by the image decoding apparatus 100, of determining at least one coding unit by splitting a current coding unit, according to an embodiment.

A block shape may include 4N×4N, 4N×2N, 2N×4N, 4N×N, N×4N, 32N×N, N×32N, 16N×N, N×16N, 8N×N, or N×8N. N may be a positive integer. Block shape information is information indicating at least one from among a shape, a direction, a ratio between a width and a height, and a size of a coding unit.

The shape of the coding unit may include a square shape and a non-square shape. When the width and the height of the coding unit are the same (i.e., when the block shape of the coding unit is 4N×4N), the image decoding apparatus 100 may determine the block shape information of the coding unit as a square shape. The image decoding apparatus 100 may determine the shape of the coding unit as a non-square shape.

When the width and the height of the coding unit are different from each other (i.e., when the block shape of the coding unit is 4N×2N, 2N×4N, 4N×N, N×4N, 32N×N, N×32N, 16N×N, N×16N, 8N×N, or N×8N), the image decoding apparatus 100 may determine the block shape information of the coding unit as a non-square shape. When the shape of the coding unit is a non-square shape, the image decoding apparatus 100 may determine the ratio of the width and the height in the block shape information of the coding unit as at least one from among 1:2, 2:1, 1:4, 4:1, 1:8, 8:1, 1:16, 16:1, 1:32, and 32:1. Also, the image decoding apparatus 100 may determine whether the coding unit is in a horizontal direction or a vertical direction, based on a length of the width and a length of the height of the coding unit. Also, the image decoding apparatus 100 may determine the size of the coding unit, based on at least one from among the length of the width, the length of the height, and an area of the coding unit.

According to an embodiment, the image decoding apparatus 100 may determine a shape of the coding unit by using the block shape information, and may determine which shape the coding unit is split into by using split shape mode information. That is, a coding unit splitting method indicated by the split shape mode information may be determined according to which block shape is indicated by the block shape information used by the image decoding apparatus 100.

The image decoding apparatus 100 may determine the split shape mode information from a bitstream. However, the present disclosure is not limited thereto, and the image decoding apparatus 100 and the image encoding apparatus 200 may determine the split shape mode information that is pre-promised based on the block shape information. The image decoding apparatus 100 may determine the split shape mode information that is pre-promised for a largest coding unit or a smallest coding unit. For example, the image decoding apparatus 100 may determine that the pre-promised split shape mode information of the largest coding unit indicates quad splitting. Also, the image decoding apparatus 100 may determine that the pre-promised split shape mode information of the smallest coding unit indicates "not to perform splitting". For example, the image decoding apparatus 100 may determine a size of the largest coding unit to be 256×256. The image decoding apparatus 100 may determine that the pre-promised split shape mode information indicates quad splitting. The quad splitting is a split shape mode in which the width and the height of the coding unit are halved. The image decoding apparatus 100 may obtain the coding unit having a size of 128×128 from the largest coding unit having a size of 256×256 based on the split shape mode information. Also, the image decoding apparatus 100 may determine a size of the smallest coding unit to be 4×4. The image decoding apparatus 100 may obtain the split shape mode information indicating "not to perform splitting" for the smallest coding unit.

According to an embodiment, the image decoding apparatus 100 may use the block shape information indicating that the current coding unit has a square shape. For example, the image decoding apparatus 100 may determine whether not to split a square coding unit, whether to vertically split the square coding unit, whether to horizontally split the square coding unit, or whether to split the square coding unit into four coding units, based on the split shape mode information. Referring to FIG. 3, when the block shape information of a current coding unit 300 indicates a square shape, the decoder 120 may determine that a coding unit 310a having the same size as the current coding unit 300 is not split, based on the split shape mode information indicating not to perform splitting, or may determine coding units 310b, 310c, 310d, 310e, and 310f split based on the split shape mode information indicating a predetermined splitting method.

Referring to FIG. 3, according to an embodiment, the image decoding apparatus 100 may determine two coding units 310b obtained by vertically splitting the current coding unit 300, based on the split shape mode information indicating to vertically perform splitting. The image decoding apparatus 100 may determine two coding units 310c obtained by horizontally splitting the current coding unit 300, based on the split shape mode information indicating to horizontally perform splitting. The image decoding apparatus 100 may determine four coding units 310d obtained by vertically and horizontally splitting the current coding unit 300, based on the split shape mode information indicating to vertically and horizontally perform splitting. The image decoding apparatus 100 may determine three coding units 310e obtained by vertically splitting the current coding unit 300, based on the split shape mode information indicating to vertically perform ternary splitting according to an embodiment. The image decoding apparatus 100 may determine three coding units 310f obtained by horizontally splitting the current coding unit 300, based on the split shape mode information indicating to horizontally perform ternary splitting. However, splitting methods of the square coding unit are not limited to the above-described methods, and the split shape mode information may include various methods. Predetermined splitting methods of splitting the square coding unit will be described in detail below through various embodiments.

Figure 4:
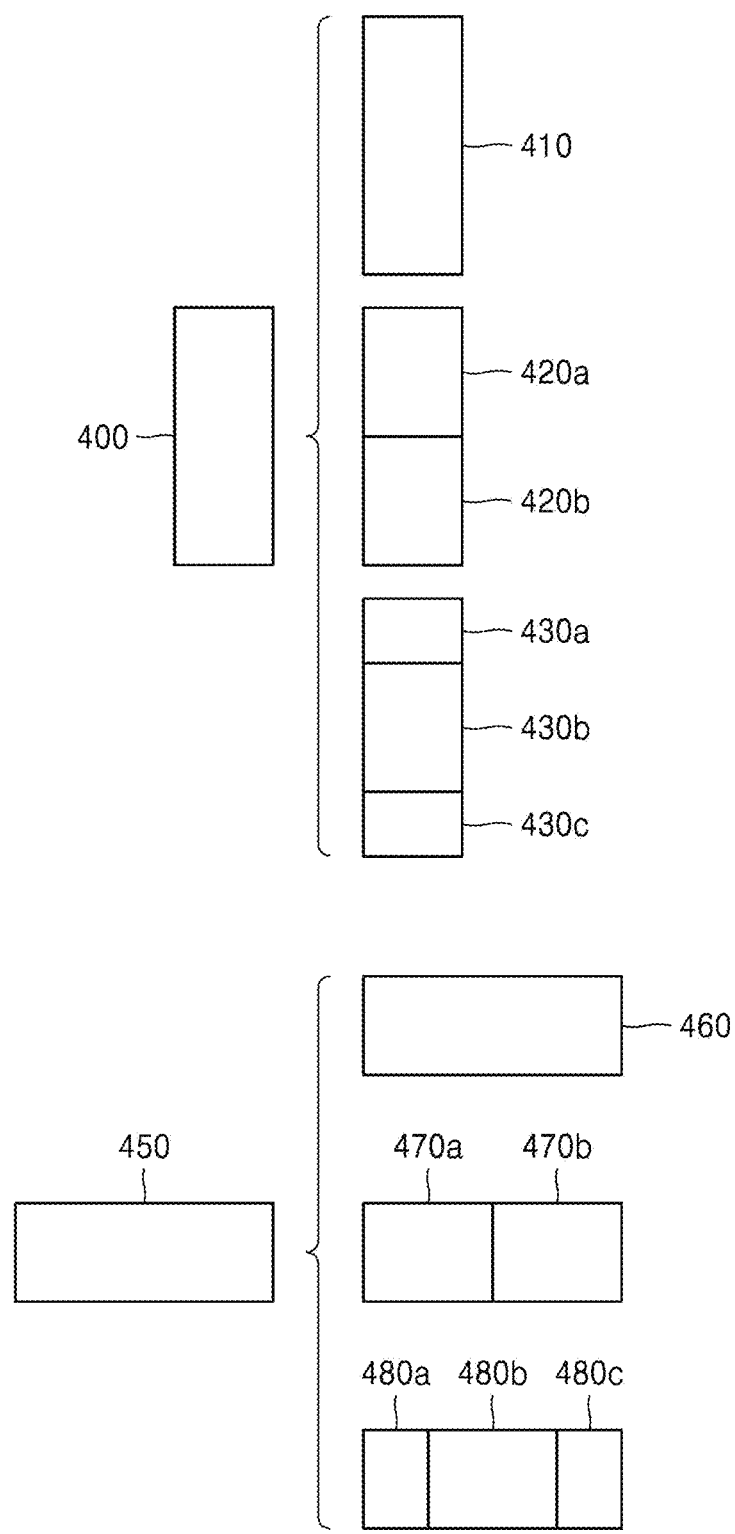
FIG. 4 illustrates a process, performed by the image decoding apparatus, of determining at least one coding unit by splitting a non-square coding unit, according to an embodiment.

FIG. 4 illustrates a process, performed by the image decoding apparatus 100, of determining at least one coding unit by splitting a non-square coding unit, according to an embodiment.

According to an embodiment, the image decoding apparatus 100 may use block shape information indicating that a current coding unit has a non-square shape. The image decoding apparatus 100 may determine, according to split shape mode information, whether not to split the non-square current coding unit or whether to split the non-square current coding unit by using a predetermined method information. Referring to FIG. 4, when the block shape information of a current coding unit 400 or 450 indicates a non-square shape, the image decoding apparatus 100 may determine a coding unit 410 or 460 having the same size as the current coding unit 400 or 450 based on the split shape mode information indicating not to perform splitting, or determine coding units 420a and 420b, 430a to 430c, 470a and 470b, or 480a to 480c split based on the split shape mode information indicating a predetermined splitting method. Predetermined splitting methods of splitting a non-square coding unit will be described in detail below through various embodiments.

According to an embodiment, the image decoding apparatus 100 may determine a splitting method of a coding unit by using the split shape mode information and, in this case, the split shape mode information may indicate the number of one or more coding units generated by splitting the coding unit. Referring to FIG. 4, when the split shape mode information indicates to split the current coding unit 400 or 450 into two coding units, the image decoding apparatus 100 may determine two coding units 420a and 420b, or 470a and 470b included in the current coding unit 400 or 450 by splitting the current coding unit 400 or 450 based on the split shape mode information.

According to an embodiment, when the image decoding apparatus 100 splits the non-square current coding unit 400 or 450 based on the split shape mode information, the location of a long side of the non-square current coding unit 400 or 450 may be considered. For example, the image decoding apparatus 100 may determine a plurality of coding units by splitting the long side of the current coding unit 400 or 450, in consideration of the shape of the current coding unit 400 or 450.

According to an embodiment, when the split shape mode information indicates to split (ternary split) a coding unit into an odd number of blocks, the image decoding apparatus 100 may determine an odd number of coding units included in the current coding unit 400 or 450. For example, when the split shape mode information indicates to split the current coding unit 400 or 450 into three coding units, the image decoding apparatus 100 may split the current coding unit 400 or 450 into three coding units 430a, 430b, and 430c, or 480a, 480b, and 480c.

According to an embodiment, a ratio between a width and a height of the current coding unit 400 or 450 may be 4:1 or 1:4. When the ratio between the width and the height is 4:1, a length of the width is greater than a length of the height, and thus the block shape information may be horizontal. When the ratio between the width and the height is 1:4, a length of the width is less than a length of the height, and thus the block shape information may be vertical. The image decoding apparatus 100 may determine to split the current coding unit into an odd number of blocks based on the split shape mode information. Also, the image decoding apparatus 100 may determine a split direction of the current coding unit 400 or 450 based on the block shape information of the current coding unit 400 or 450. For example, when the current coding unit 400 is in a vertical direction, the image decoding apparatus 100 may horizontally split the current coding unit 400 and may determine the coding units 430a, 430b, and 430c. Also, when the current coding unit 450 is in a horizontal direction, the image decoding apparatus 100 may vertically split the current coding unit 450 and may determine the coding units 480a, 480b, and 480c.

According to an embodiment, the image decoding apparatus 100 may determine an odd number of coding units included in the current coding unit 400 or 450, and sizes of all of the determined coding units may not be the same. For example, a predetermined coding unit 430b or 480b from among the determined odd number of coding units 430a, 430b, and 430c, or 480a, 480b, and 480c may have a size different from sizes of the other coding units 430a and 430c, or 480a and 480c. That is, coding units which may be determined by splitting the current coding unit 400 or 450 may have multiple sizes and, in some cases, all of the odd number of coding units 430a, 430b, and 430c, or 480a, 480b, and 480c may have different sizes.

According to an embodiment, when the split shape mode information indicates to split a coding unit into an odd number of blocks, the image decoding apparatus 100 may determine an odd number of coding units included in the current coding unit 400 or 450, and may put a predetermined restriction on at least one coding unit from among the odd number of coding units generated by splitting the current coding unit 400 or 450. Referring to FIG. 4, the image decoding apparatus 100 may allow a decoding method of the coding unit 430b or 480b to be different from that of the other coding units 430a and 430c, or 480a and 480c, wherein the coding unit 430b or 480b is at a center location from among the three coding units 430a, 430b, and 430c, or 480a, 480b, and 480c generated by splitting the current coding unit 400 or 450. For example, the image decoding apparatus 100 may restrict the coding unit 430b or 480b at the center location to be no longer split or to be split only a predetermined number of times, unlike the other coding units 430a and 430c, or 480a and 480c.

Figure 5:
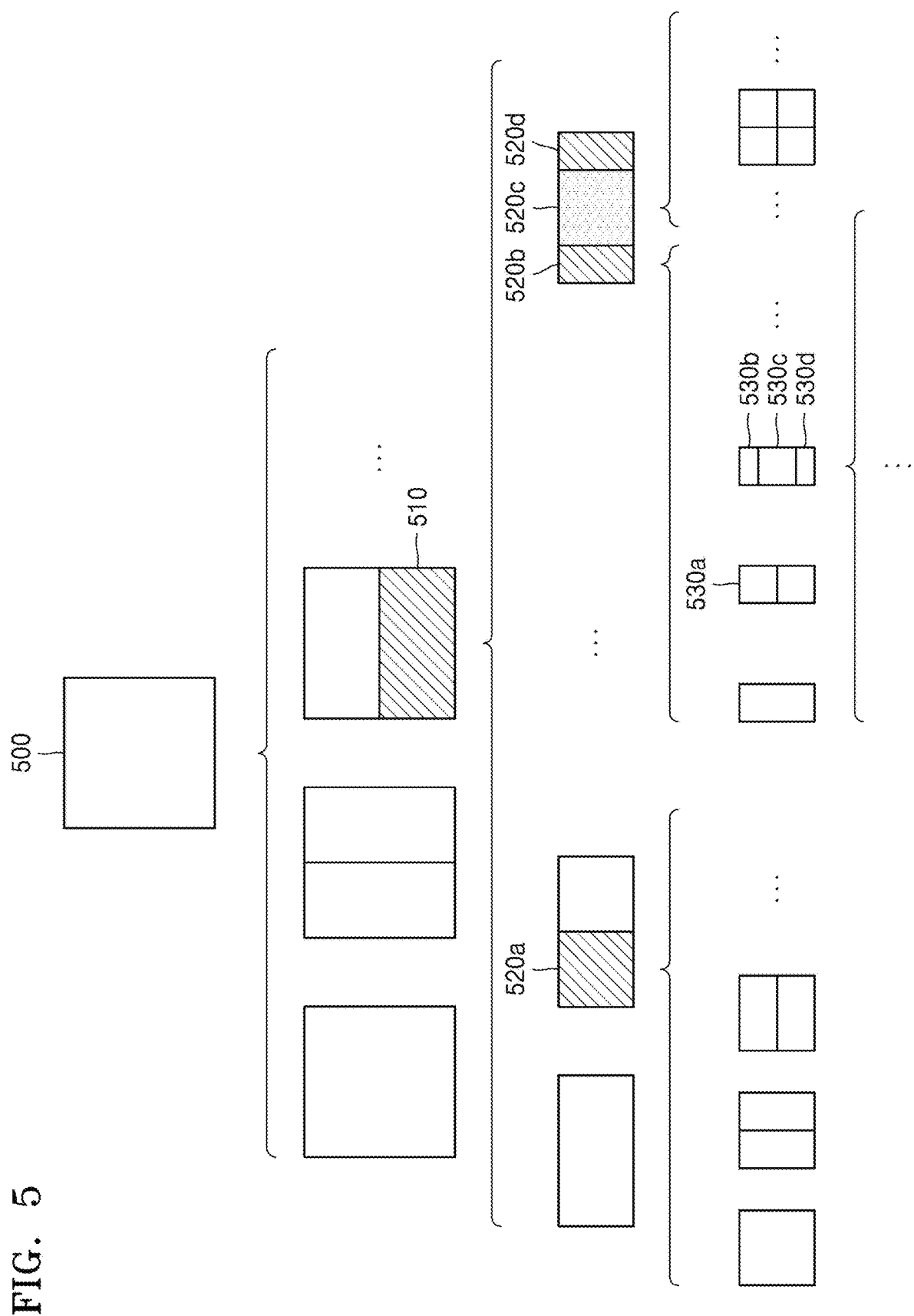
FIG. 5 illustrates a process, performed by the image decoding apparatus, of splitting a coding unit based on at least one of block shape information and split shape mode information, according to an embodiment.

FIG. 5 illustrates a process, performed by the image decoding apparatus 100, of splitting a coding unit based on at least one of block shape information and split shape mode information, according to an embodiment.

According to an embodiment, the image decoding apparatus 100 may determine to split or not to split a square first coding unit 500 into coding units based on at least one of the block shape information and the split shape mode information. According to an embodiment, when the split shape mode information indicates to split the first coding unit 500 in a horizontal direction, the image decoding apparatus 100 may determine a second coding unit 510 by splitting the first coding unit 500 in a horizontal direction. A first coding unit, a second coding unit, and a third coding unit used according to an embodiment are terms used to understand a relation before and after splitting a coding unit. For example, the second coding unit may be determined by splitting the first coding unit, and the third coding unit may be determined by splitting the second coding unit. It will be understood that a relationship among the first coding unit, the second coding unit, and the third coding unit applies to the following descriptions.

According to an embodiment, the image decoding apparatus 100 may determine to split or not to split the determined second coding unit 510 into coding units, based on the split shape mode information. Referring to FIG. 5, the image decoding apparatus 100 may or may not split the non-square second coding unit 510, which is determined by splitting the first coding unit 500, into one or more third coding units 520a, or 520b, 520c, and 520d based on the split shape mode information. The image decoding apparatus 100 may obtain the split shape mode information, and may split a plurality of various-shaped second coding units (e.g., 510) by splitting the first coding unit 500, based on the obtained split shape mode information, and the second coding unit 510 may be split by using a splitting method of the first coding unit 500 based on the split shape mode information. According to an embodiment, when the first coding unit 500 is split into the second coding units 510 based on the split shape mode information of the first coding unit 500, the second coding unit 510 may also be split into the third coding units 520a, or 520b, 520c, and 520d based on the split shape mode information of the second coding unit 510. That is, a coding unit may be recursively split based on the split shape mode information of each coding unit. Therefore, a square coding unit may be determined by splitting a non-square coding unit, and a non-square coding unit may be determined by recursively splitting the square coding unit.

Referring to FIG. 5, a predetermined coding unit (e.g., a coding unit at a center location or a square coding unit) from among an odd number of third coding units 520b, 520c, and 520d determined by splitting the non-square second coding unit 510 may be recursively split. According to an embodiment, the square third coding unit 520b from among the odd number of third coding units 520b, 520c, and 520d may be split in a horizontal direction into a plurality of fourth coding units. A non-square fourth coding unit 530b or 530d from among the plurality of fourth coding units 530a, 530b, 530c, and 530d may be split again into a plurality of coding units. For example, the non-square fourth coding unit 530b or 530d may be split again into an odd number of coding units, A method that may be used to recursively split a coding unit will be described below through various embodiments.

According to an embodiment, the image decoding apparatus 100 may split each of the third coding units 520a, or 520b, 520c, and 520d into coding units, based on the split shape mode information. Also, the image decoding apparatus 100 may determine not to split the second coding unit 510 based on the split shape mode information. According to an embodiment, the image decoding apparatus 100 may split the non-square second coding unit 510 into the odd number of third coding units 520b, 520c, and 520d. The image decoding apparatus 100 may put a predetermined restriction on a predetermined third coding unit from among the odd number of third coding units 520b, 520c, and 520d. For example, the image decoding apparatus 100 may restrict the third coding unit 520c at a center location from among the odd number of third coding units 520b, 520c, and 520d to be no longer split or to be split a settable number of times.

Referring to FIG. 5, the image decoding apparatus 100 may restrict the third coding unit 520c, which is at the center location from among the odd number of third coding units 520b, 520c, and 520d included in the non-square second coding unit 510, to be no longer split, to be split by using a predetermined splitting method (e.g., split into only four coding units or split by using a splitting method of the second coding unit 510), or to be split only a predetermined number of times (e.g., split only n times (where n>0)). However, the restrictions on the third coding unit 520c at the center location are not limited to the above-described examples, and may include various restrictions for decoding the third coding unit 520c at the center location differently from the other third coding units 520b and 520d.

According to an embodiment, the image decoding apparatus 100 may obtain the split shape mode information, which is used to split a current coding unit, from a predetermined location in the current coding unit.

Figure 6:
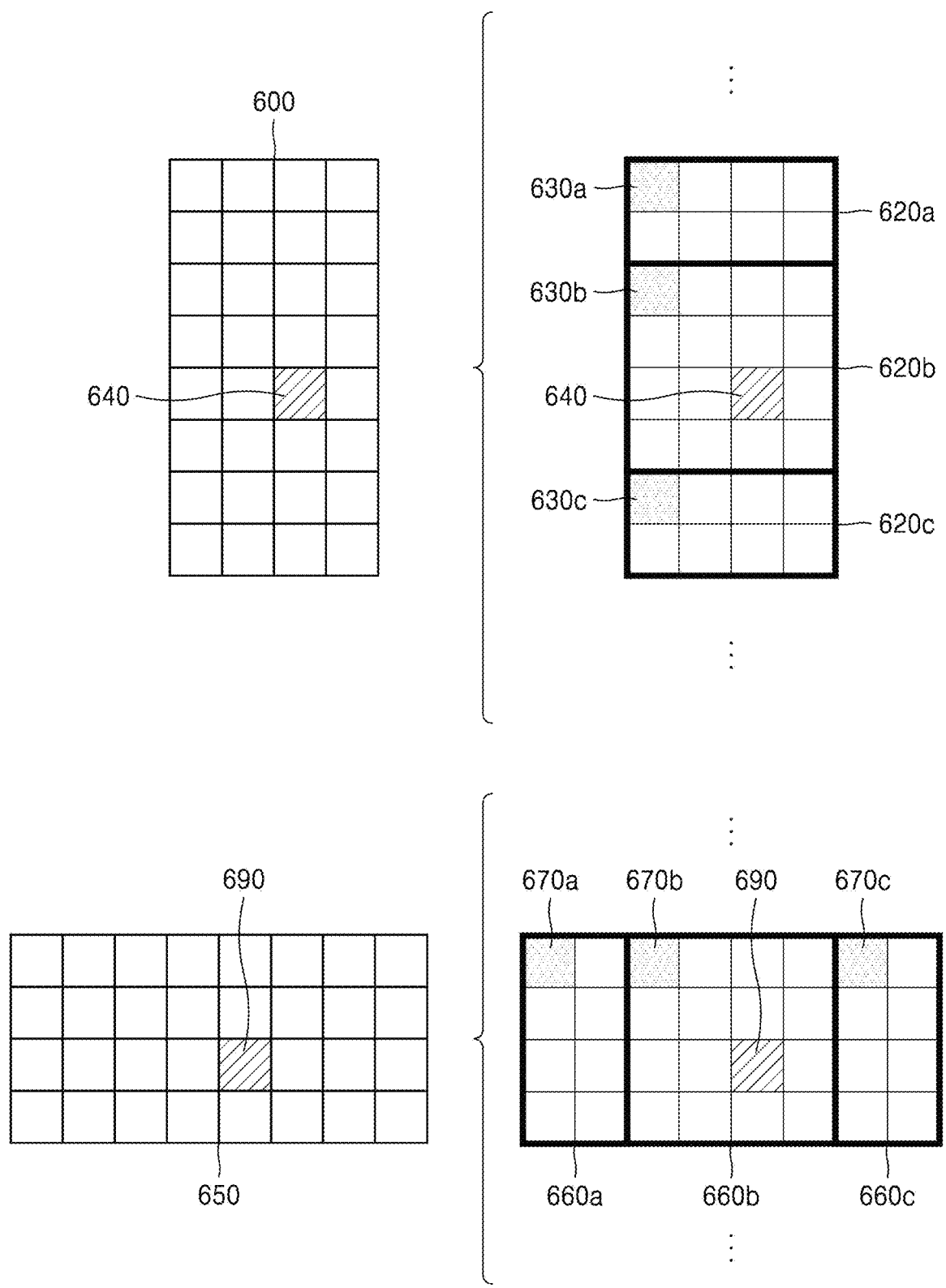
FIG. 6 illustrates a method, performed by the image decoding apparatus, of determining a predetermined coding unit from among an odd number of coding units, according to an embodiment.

FIG. 6 illustrates a method, performed by the image decoding apparatus 100, of determining a predetermined coding unit from among an odd number of coding units, according to an embodiment.

Referring to FIG. 6, split shape mode information of a current coding unit 600 or 650 may be obtained from a sample of a predetermined location (e.g., a sample 640 or 690 of a center location) from among a plurality of samples included in the current coding unit 600 or 650. However, the predetermined location in the current coding unit 600, from which at least one of the split shape mode information may be obtained, is not limited to the center location in FIG. 6, and may include various locations (e.g., top, bottom, left, right, top left, bottom left, top right, and bottom right locations) included in the current coding unit 600. The image decoding apparatus 100 may obtain the split shape mode information from the predetermined location and may determine to split or not to split the current coding unit into various-shaped and various-sized coding units.

According to an embodiment, when the current coding unit is split into a predetermined number of coding units, the image decoding apparatus 100 may select one of the coding units. Various methods that may be used to select one of a plurality of coding units will be described below through various embodiments.

According to an embodiment, the image decoding apparatus 100 may split the current coding unit into a plurality of coding units, and may determine a coding unit at a predetermined location.

According to an embodiment, the image decoding apparatus 100 may use information indicating locations of an odd number of coding units to determine a coding unit at a center location from among the odd number of coding units. Referring to FIG. 6, the image decoding apparatus 100 may determine an odd number of coding units 620a, 620b, and 620c or an odd number of coding units 660a, 660b, and 660c by splitting the current coding unit 600 or the current coding unit 650. The image decoding apparatus 100 may determine the coding unit 620b at a center location or the coding unit 660b at a center location by using information about locations of the odd number of coding units 620a, 620b, and 620c or the odd number of coding units 660a, 660b, and 660c. For example, the image decoding apparatus 100 may determine the coding unit 620b of the center location by determining the locations of the coding units 620a, 620b, and 620c based on information indicating locations of predetermined samples included in the coding units 620a, 620b, and 620c. In detail, the image decoding apparatus 100 may determine the coding unit 620b at the center location by determining the locations of the coding units 620a, 620b, and 620c based on information indicating locations of top left samples 630a, 630b, and 630c of the coding units 620a, 620b, and 620c.

According to an embodiment, the information indicating the locations of the top left samples 630a, 630b, and 630c, which are included in the coding units 620a, 620b, and 620c, respectively, may include information about locations or coordinates of the coding units 620a, 620b, and 620c in a picture. According to an embodiment, the information indicating the locations of the top left samples 630a, 630b, and 630c, which are included in the coding units 620a, 620b, and 620c, respectively, may include information indicating widths or heights of the coding units 620a, 620b, and 620c included in the current coding unit 600, and the widths or heights may correspond to information indicating differences between the coordinates of the coding units 620a, 620b, and 620c in the picture. That is, the image decoding apparatus 100 may determine the coding unit 620b at the center location by directly using the information about the locations or coordinates of the coding units 620a, 620b, and 620c in the picture, or by using the information about the widths or heights of the coding units, which correspond to the difference values between the coordinates.

According to an embodiment, information indicating the location of the top left sample 630a of the upper coding unit 620a may include coordinates (xa, ya), information indicating the location of the top left sample 630b of the middle coding unit 620b may include coordinates (xb, yb), and information indicating the location of the top left sample 630c of the lower coding unit 620c may include coordinates (xc, yc). The image decoding apparatus 100 may determine the middle coding unit 620b by using the coordinates of the top left samples 630a, 630b, and 630c which are included in the coding units 620a, 620b, and 620c, respectively. For example, when the coordinates of the top left samples 630a, 630b, and 630c are sorted in an ascending or descending order, the coding unit 620b including the coordinates (xb, yb) of the sample 630b at a center location may be determined as a coding unit at a center location from among the coding units 620a, 620b, and 620c determined by splitting the current coding unit 600. However, the coordinates indicating the locations of the top left samples 630a, 630b, and 630c may include coordinates indicating absolute locations in the picture, or may use coordinates (dxb, dyb) indicating a relative location of the top left sample 630b of the middle coding unit 620b and coordinates (dxc, dyc) indicating a relative location of the top left sample 630c of the lower coding unit 620c, with reference to the location of the top left sample 630a of the upper coding unit 620a. Also, a method of determining a coding unit at a predetermined location by using coordinates of a sample included in the coding unit as information indicating a location of the sample is not limited to the above-described method, and may include various arithmetic methods capable of using the coordinates of the sample.

According to an embodiment, the image decoding apparatus 100 may split the current coding unit 600 into the plurality of coding units 620a, 620b, and 620c, and may select one of the coding units 620a, 620b, and 620c based on a predetermined criterion. For example, the image decoding apparatus 100 may select the coding unit 620b, which has a size different from that of the others, from among the coding units 620a, 620b, and 620c.

According to an embodiment, the image decoding apparatus 100 may determine the widths or heights of the coding units 620a, 620b, and 620c by using the coordinates (xa, ya) indicating the location of the top left sample 630a of the upper coding unit 620a, the coordinates (xb, yb) indicating the location of the top left sample 630b of the middle coding unit 620b, and the coordinates (xc, yc) indicating the location of the top left sample 630c of the lower coding unit 620c. The image decoding apparatus 100 may determine the respective sizes of the coding units 620a, 620b, and 620c by using the coordinates (xa, ya), (xb, yb), and (xc, yc) indicating the locations of the coding units 620a, 620b, and 620c. According to an embodiment, the image decoding apparatus 100 may determine the width of the upper coding unit 620a to be a width of the current coding unit 600. The image decoding apparatus 100 may determine the height of the upper coding unit 620a to be yb-ya. According to an embodiment, the image decoding apparatus 100 may determine the width of the middle coding unit 620b to be a width of the current coding unit 600. The image decoding apparatus 100 may determine the height of the middle coding unit 620b to be yc-yb. According to an embodiment, the image decoding apparatus 100 may determine the width or height of the lower coding unit 620c by using the width or height of the current coding unit 600 and the widths or heights of the upper and middle coding units 620a and 620b. The image decoding apparatus 100 may determine a coding unit, which has a size different from that of the others, based on the determined widths and heights of the coding units 620a to 620c. Referring to FIG. 6, the image decoding apparatus 100 may determine the middle coding unit 620b, which has a size different from the size of the upper and lower coding units 620a and 620c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

The image decoding apparatus 100 may determine a width or a height of each of the coding units 660a, 660b, and 660c by using coordinates (xd, yd) that are information indicating a location of a top left sample 670a of the left coding unit 660a, coordinates (xe, ye) that are information indicating a location of a top left sample 670b of the middle coding unit 660b, and coordinates (xf, yf) that are information indicating a location of a top left sample 670c of the right coding unit 660c. The image decoding apparatus 100 may determine sizes of the coding units 660a, 660b, and 660c by using the coordinates (xd, yd), (xe, ye), and (xf, yf) indicating the locations of the coding units 660a, 660b, and 660c.

According to an embodiment, the image decoding apparatus 100 may determine the width of the left coding unit 660a to be xe-xd. The image decoding apparatus 100 may determine the height of the left coding unit 660a as the height of the current coding unit 650. According to an embodiment, the image decoding apparatus 100 may determine the width of the middle coding unit 660b to be xf-xe. The image decoding apparatus 100 may determine the height of the middle coding unit 660b to be the height of the current coding unit 600. According to an embodiment, the image decoding apparatus 100 may determine the width or the height of the right coding unit 660c by using the width or the height of the current coding unit 650 and the width and the height of the left coding unit 660a and the middle coding unit 660b. The image decoding apparatus 100 may determine a coding unit, which has a size different from that of the others, based on the determined widths and heights of the coding units 660a, 660b, and 660c. Referring to FIG. 6, the image decoding apparatus 100 may determine the middle coding unit 660b, which has a size different from the size of the left coding unit 660a and the right coding unit 660c, as the coding unit of the predetermined location. However, the above-described method, performed by the image decoding apparatus 100, of determining a coding unit having a size different from the size of the other coding units merely corresponds to an example of determining a coding unit at a predetermined location by using the sizes of coding units, which are determined based on coordinates of samples, and thus various methods of determining a coding unit at a predetermined location by comparing the sizes of coding units, which are determined based on coordinates of predetermined samples, may be used.

However, locations of samples considered to determine locations of coding units are not limited to the above-described top left locations, and information about arbitrary locations of samples included in the coding units may be used.

According to an embodiment, the image decoding apparatus 100 may select a coding unit at a predetermined location from among an odd number of coding units determined by splitting the current coding unit, considering the shape of the current coding unit. For example, when the current coding unit has a non-square shape, a width of which is longer than a height, the image decoding apparatus 100 may determine the coding unit at the predetermined location in a horizontal direction. That is, the image decoding apparatus 100 may determine one of coding units at different locations in a horizontal direction and may put a restriction on the coding unit. When the current coding unit has a non-square shape, a height of which is longer than a width, the image decoding apparatus 100 may determine the coding unit at the predetermined location in a vertical direction. That is, the image decoding apparatus 100 may determine one of coding units at different locations in a vertical direction and may put a restriction on the coding unit.

According to an embodiment, the image decoding apparatus 100 may use information indicating respective locations of an even number of coding units, to determine the coding unit at the predetermined location from among the even number of coding units. The image decoding apparatus 100 may determine an even number of coding units by splitting (binary splitting) the current coding unit, and may determine the coding unit at the predetermined location by using the information about the locations of the even number of coding units. An operation related thereto may correspond to the operation of determining a coding unit at a predetermined location (e.g., a center location) from among an odd number of coding units, which has been described in detail above with reference to FIG. 6, and thus detailed descriptions thereof are not provided here.

According to an embodiment, when a non-square current coding unit is split into a plurality of coding units, predetermined information about a coding unit at a predetermined location may be used in a splitting operation to determine the coding unit at the predetermined location from among the plurality of coding units. For example, the image decoding apparatus 100 may use at least one of block shape information and split shape mode information, which is stored in a sample included in a coding unit at a center location, in a splitting operation to determine the coding unit at the center location from among the plurality of coding units determined by splitting the current coding unit.

Referring to FIG. 6, the image decoding apparatus 100 may split the current coding unit 600 into the plurality of coding units 620*a*, 620*b*, and 620*c* based on the split shape mode information, and may determine the coding unit 620*b* at a center location from among the plurality of the coding units 620*a*, 620*b*, and 620*c*. Furthermore, the image decoding apparatus 100 may determine the coding unit 620*b* at the center location, in consideration of a location from which the split shape mode information is obtained. That is, the split shape mode information of the current coding unit 600 may be obtained from the sample 640 at a center location of the current coding unit 600 and, when the current coding unit 600 is split into the plurality of coding units 620*a*, 620*b*, and 620*c* based on the split shape mode information, the coding unit 620*b* including the sample 640 may be determined as the coding unit at the center location. However, information used to determine the coding unit at the center location is not limited to the split shape mode information, and various kinds of information may be used to determine the coding unit at the center location.

According to an embodiment, predetermined information for identifying the coding unit at the predetermined location may be obtained from a predetermined sample included in a coding unit to be determined. Referring to FIG. 6, the image decoding apparatus 100 may use the split shape mode information, which is obtained from a sample at a predetermined location in the current coding unit 600 (e.g., a sample at a center location of the current coding unit 600) to determine a coding unit at a predetermined location from among the plurality of the coding units 620*a*, 620*b*, and 620*c* determined by splitting the current coding unit 600 (e.g., a coding unit at a center location from among a plurality of split coding units). That is, the image decoding apparatus 100 may determine the sample at the predetermined location by considering a block shape of the current coding unit 600, may determine the coding unit 620*b* including a sample, from which predetermined information (e.g., the split shape mode information) may be obtained, from among the plurality of coding units 620*a*, 620*b*, and 620*c* determined by splitting the current coding unit 600, and may put a predetermined restriction on the coding unit 620*b*. Referring to FIG. 6, according to an embodiment, the image decoding apparatus 100 may determine the sample 640 at the center location of the current coding unit 600 as the sample from which the predetermined information may be obtained, and may put a predetermined restriction on the coding unit 620*b* including the sample 640, in a decoding operation. However, the location of the sample from which the predetermined information may be obtained is not limited to the above-described location, and may include arbitrary locations of samples included in the coding unit 620*b* to be determined for a restriction.

According to an embodiment, the location of the sample from which the predetermined information may be obtained may be determined based on the shape of the current coding unit 600. According to an embodiment, the block shape information may indicate whether the current coding unit has a square or non-square shape, and the location of the sample from which the predetermined information may be obtained may be determined based on the shape. For example, the image decoding apparatus 100 may determine a sample located on a boundary for dividing at least one of a width and height of the current coding unit in half, as the sample from which the predetermined information may be obtained, by using at least one of information about the width of the current coding unit and information about the height of the current coding unit. As another example, when the block shape information of the current coding unit indicates a non-square shape, the image decoding apparatus 100 may determine one of samples adjacent to a boundary for dividing a long side of the current coding unit in half, as the sample from which the predetermined information may be obtained.

According to an embodiment, when the current coding unit is split into a plurality of coding units, the image decoding apparatus 100 may use the split shape mode information to determine a coding unit at a predetermined location from among the plurality of coding units. According to an embodiment, the image decoding apparatus 100 may obtain the split shape mode information from a sample at a predetermined location in a coding unit, and may split the plurality of coding units, which are generated by splitting the current coding unit, by using the split shape mode information, which is obtained from the sample of the predetermined location in each of the plurality of coding units. That is, a coding unit may be recursively split based on the split shape mode information, which is obtained from the sample at the predetermined location in each coding unit. An operation of recursively splitting a coding unit has been described above with reference to FIG. 5, and thus detailed descriptions thereof will not be provided here.

According to an embodiment, the image decoding apparatus 100 may determine one or more coding units by splitting the current coding unit, and may determine an order of decoding the one or more coding units based on a predetermined block (e.g., the current coding unit).

Figure 7:
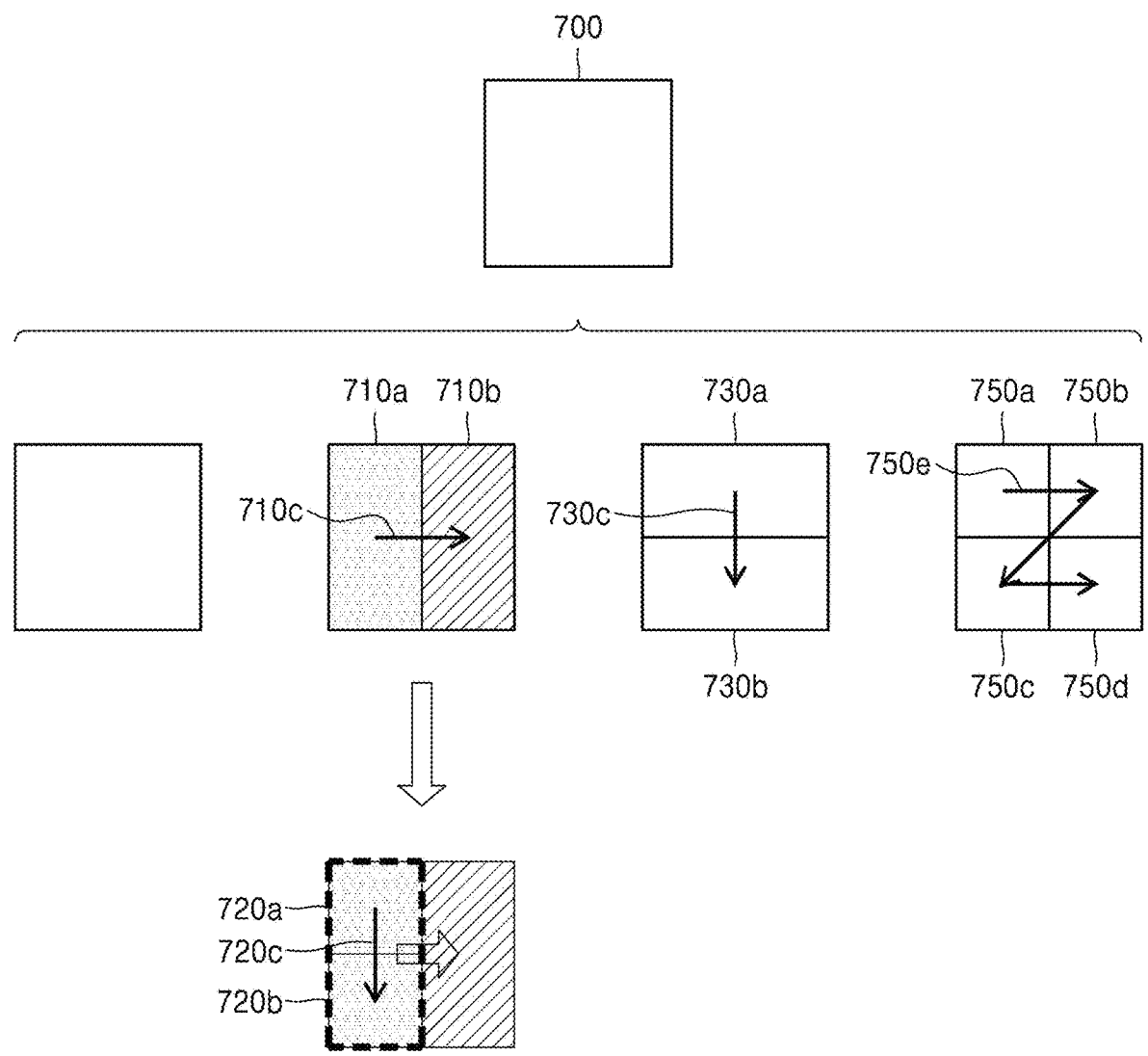
FIG. 7 illustrates an order of processing a plurality of coding units when the image decoding apparatus 100 determines the plurality of coding units by splitting a current coding unit, according to an embodiment.

FIG. 7 illustrates an order of processing a plurality of coding units when the image decoding apparatus 100 determines the plurality of coding units by splitting a current coding unit, according to an embodiment.

According to an embodiment, the image decoding apparatus 100 may determine second coding units 710a and 710b by splitting a first coding unit 700 in a vertical direction, may determine second coding units 730a and 730b by splitting the first coding unit 700 in a horizontal direction, or may determine second coding units 750a to 750d by splitting the first coding unit 700 in vertical and horizontal directions, based on split shape mode information.

Referring to FIG. 7, the image decoding apparatus 100 may determine to process the second coding units 710a and 710b, which are determined by splitting the first coding unit 700 in a vertical direction, in a horizontal direction order 710c. The image decoding apparatus 100 may determine to process the second coding units 730a and 730b, which are determined by splitting the first coding unit 700 in a horizontal direction, in a vertical direction order 730c. The image decoding apparatus 100 may determine to process the second coding units 750a to 750d, which are determined by splitting the first coding unit 700 in vertical and horizontal directions, in a predetermined order for processing coding units in a row and then processing coding units in a next row (e.g., in a raster scan order or Z-scan order 750e).

According to an embodiment, the image decoding apparatus 100 may recursively split coding units. Referring to FIG. 7, the image decoding apparatus 100 may determine the plurality of second coding units 710a, 710b, 730a, 730b, 750a, 750b, 750c, and 750d by splitting the first coding unit 700, and may recursively split each of the determined plurality of second coding units 710a, 710b, 730a, 730b, 750a, 750b, 750c, and 750d. A splitting method of the plurality of second coding units 710a, 710b, 730a, 730b, 750a, 750b, 750c, and 750d may correspond to a splitting method of the first coding unit 700. As such, each of the plurality of second coding units 710a, 710b, 730a, 730b, 750a, 750b, 750c, and 750d may be independently split into a plurality of coding units. Referring to FIG. 7, the image decoding apparatus 100 may determine the second coding units 710a and 710b by splitting the first coding unit 700 in a vertical direction, and may determine to independently split or not to split each of the second coding units 710a and 710b.

According to an embodiment, the image decoding apparatus 100 may determine third coding units 720a and 720b by splitting the left second coding unit 710a in a horizontal direction, and may not split the right second coding unit 710b.

According to an embodiment, a processing order of coding units may be determined based on an operation of splitting a coding unit. In other words, a processing order of split coding units may be determined based on a processing order of coding units immediately before being split. The image decoding apparatus 100 may determine a processing order of the third coding units 720a and 720b determined by splitting the left second coding unit 710a, independently of the right second coding unit 710b. Because the third coding units 720a and 720b are determined by splitting the left second coding unit 710a in a horizontal direction, the third coding units 720a and 720b may be processed in a vertical direction order 720c. Because the left and right second coding units 710a and 710b are processed in the horizontal direction order 710c, the right second coding unit 710b may be processed after the third coding units 720a and 720b included in the left second coding unit 710a are processed in the vertical direction order 720c. An operation of determining a processing order of coding units based on a coding unit before being split is not limited to the above-described example, and various methods may be used to independently process coding units, which are split and determined to various shapes, in a predetermined order.

Figure 8:
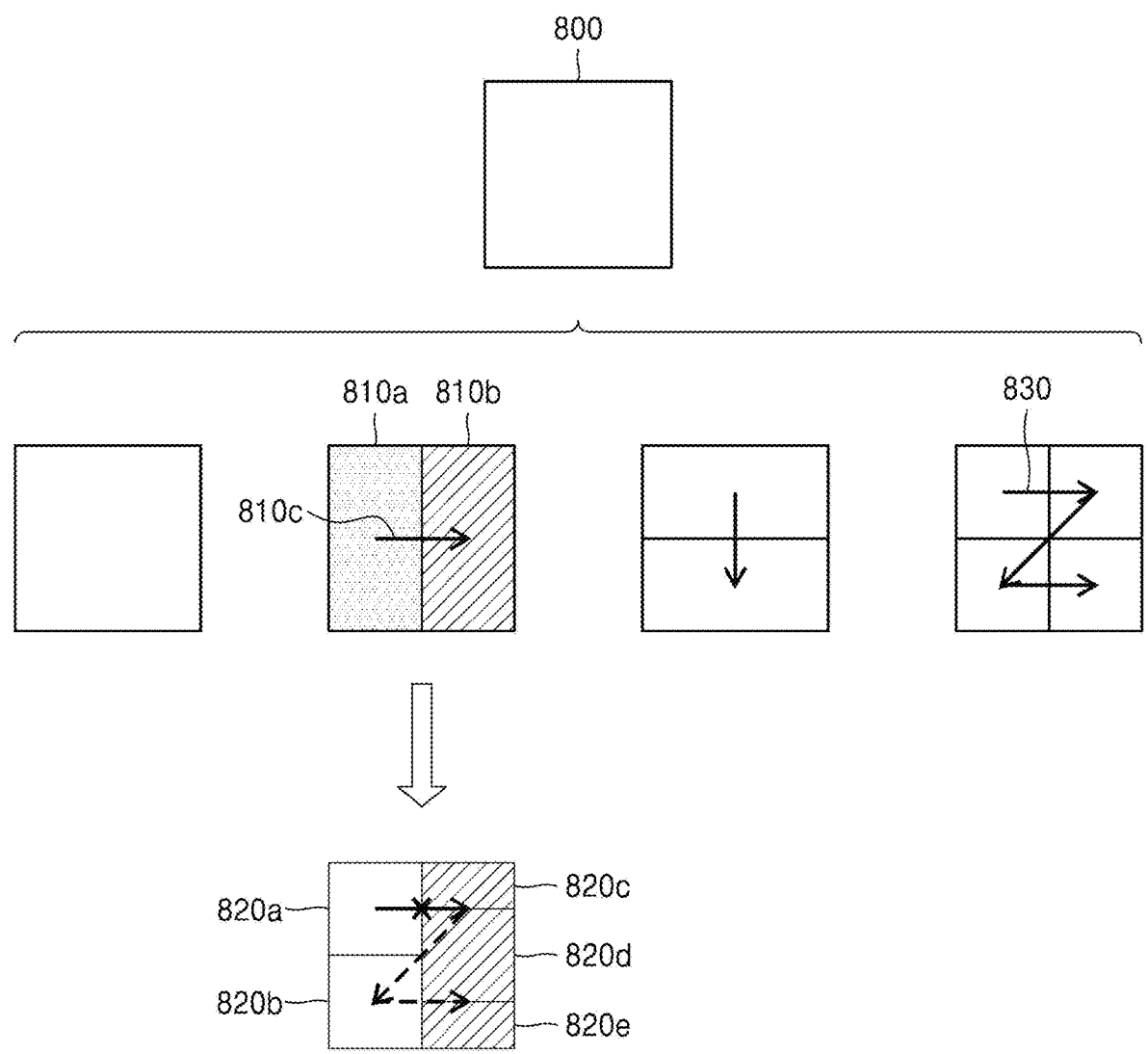
FIG. 8 illustrates a process, performed by the image decoding apparatus, of determining that a current coding unit is to be split into an odd number of coding units, when the coding units are not processable in a predetermined order, according to an embodiment.

FIG. 8 illustrates a process, performed by the image decoding apparatus 100, of determining that a current coding unit is to be split into an odd number of coding units, when the coding units are not processable in a predetermined order, according to an embodiment.

According to an embodiment, the image decoding apparatus 100 may determine whether the current coding unit is split into an odd number of coding units, based on obtained split shape mode information. Referring to FIG. 8, a square first coding unit 800 may be split into non-square second coding units 810a and 810b, and the second coding units 810a and 810b may be independently split into third coding units 820a and 820b, and 820c to 820e. According to an embodiment, the image decoding apparatus 100 may determine the plurality of third coding units 820a and 820b by splitting the left second coding unit 810a in a horizontal direction, and may split the right second coding unit 810b into an odd number of third coding units 820c to 820e.

According to an embodiment, the image decoding apparatus 100 may determine whether any coding unit is split into an odd number of coding units, by determining whether the third coding units 820a and 820b, and 820c to 820e are processable in a predetermined order. Referring to FIG. 8, the image decoding apparatus 100 may determine the third coding units 820a and 820b, and 820c to 820e by recursively splitting the first coding unit 800. The image decoding apparatus 100 may determine whether any of the first coding unit 800, the second coding units 810a and 810b, and the third coding units 820a and 820b, and 820c, 820d, and 820e is split into an odd number of coding units, based on at least one of block shape information and split shape mode information. For example, the right second coding unit 810b may be split into an odd number of third coding units 820c, 820d, and 820e. A processing order of a plurality of coding units included in the first coding unit 800 may be a predetermined order (e.g., a Z-scan order 830), and the image decoding apparatus 100 may decide whether the third coding units 820c, 820d, and 820e, which are determined by splitting the right second coding unit 810b into an odd number of coding units, satisfy a condition for processing in the predetermined order.

According to an embodiment, the image decoding apparatus 100 may determine whether the third coding units 820a and 820b, and 820c, 820d, and 820e included in the first coding unit 800 satisfy the condition for processing in the predetermined order, and the condition relates to whether at least one of a width and height of the second coding units 810a and 810b is divided in half along a boundary of the third coding units 820a and 820b, and 820c, 820d, and 820e. For example, the third coding units 820a and 820b determined by dividing the height of the non-square left second coding unit 810a in half may satisfy the condition. However, because boundaries of the third coding units 820c, 820d, and 820e determined by splitting the right second coding unit 810b into three coding units do not divide the width or height of the right second coding unit 810b in half, it may be determined that the third coding units 820c, 820d, and 820e do not satisfy the condition. When the condition is not satisfied as described above, the image decoding apparatus 100 may decide disconnection of a scan order, and determine that the right second coding unit 810b is split into an odd number of coding units, based on a result of the decision. According to an embodiment, when a coding unit is split into an odd number of coding units, the image decoding apparatus 100 may put a predetermined restriction on a coding unit at a predetermined location among the split coding units, and the restriction or the predetermined location has been described above through various embodiments and thus detailed descriptions thereof will not be provided here.

Figure 9:
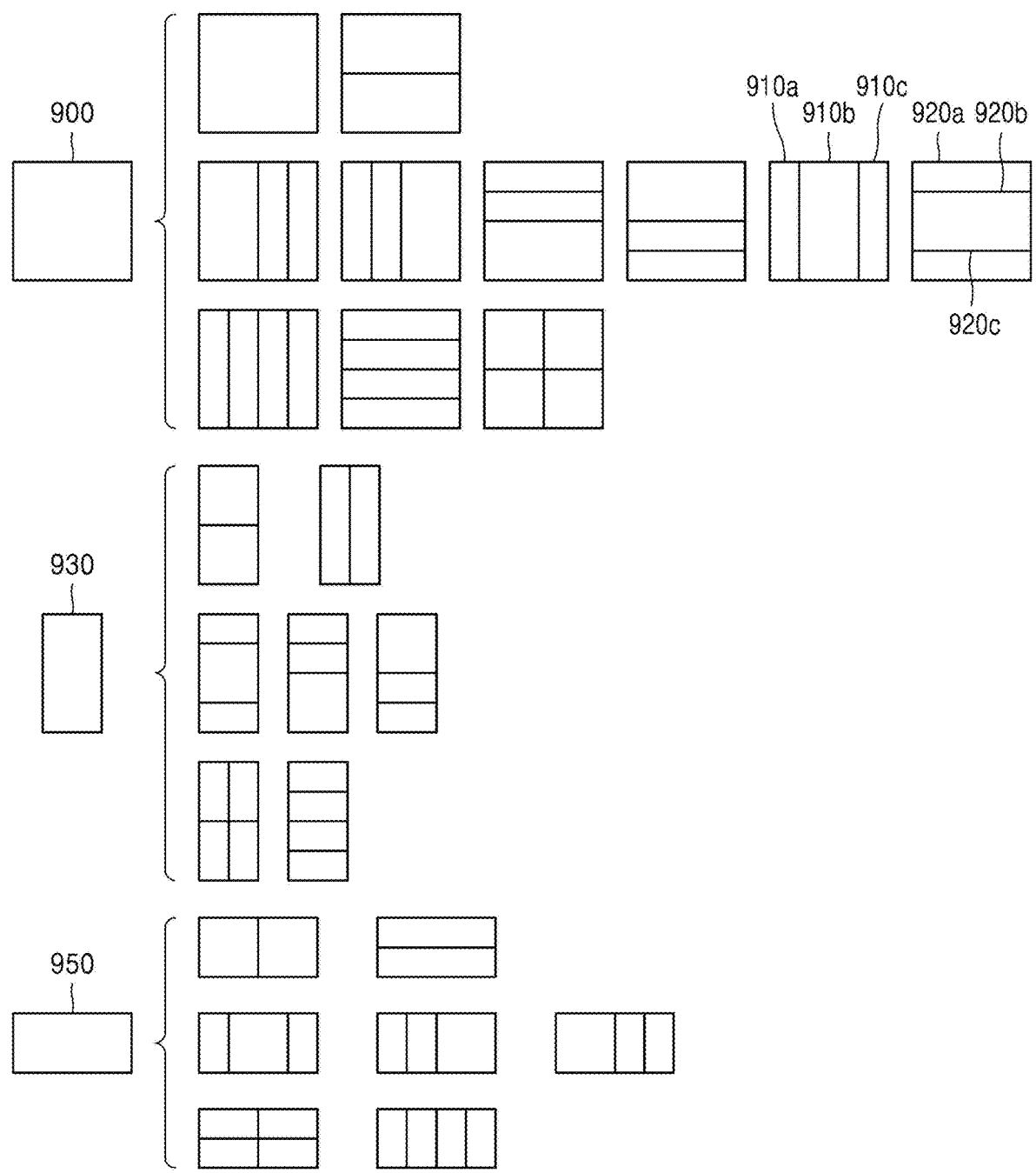
FIG. 9 illustrates a process, performed by the image decoding apparatus, of determining at least one coding unit by splitting a first coding unit, according to an embodiment.

FIG. 9 illustrates a process, performed by the image decoding apparatus 100, of determining at least one coding unit by splitting a first coding unit 900, according to an embodiment.

According to an embodiment, the image decoding apparatus 100 may split the first coding unit 900, based on split shape mode information, which is obtained by the bitstream obtainer 110. The square first coding unit 900 may be split into four square coding units, or may be split into a plurality of non-square coding units. For example, referring to FIG. 9, when the first coding unit 900 has a square shape and the split shape mode information indicates to split the first coding unit 900 into non-square coding units, the image decoding apparatus 100 may split the first coding unit 900 into a plurality of non-square coding units. In detail, when the split shape mode information indicates to determine an odd number of coding units by splitting the first coding unit 900 in a horizontal direction or a vertical direction, the image decoding apparatus 100 may split the square first coding unit 900 into an odd number of coding units, e.g., second coding units 910a, 910b, and 910c determined by splitting the square first coding unit 900 in a vertical direction or second coding units 920a, 920b, and 920c determined by splitting the square first coding unit 900 in a horizontal direction.

According to an embodiment, the image decoding apparatus 100 may determine whether the second coding units 910a, 910b, 910c, 920a, 920b, and 920c included in the first coding unit 900 satisfy a condition for processing in a predetermined order, and the condition relates to whether at least one of a width and height of the first coding unit 900 is divided in half along a boundary of the second coding units 910a, 910b, 910c, 920a, 920b, and 920c. Referring to FIG. 9, because boundaries of the second coding units 910a, 910b, and 910c determined by splitting the square first coding unit 900 in a vertical direction do not divide the width of the first coding unit 900 in half, it may be determined that the first coding unit 900 does not satisfy the condition for processing in the predetermined order. In addition, because boundaries of the second coding units 920a, 920b, and 920c determined by splitting the square first coding unit 900 in a horizontal direction do not divide the width of the first coding unit 900 in half, it may be determined that the first coding unit 900 does not satisfy the condition for processing in the predetermined order. When the condition is not satisfied as described above, the image decoding apparatus 100 may decide disconnection of a scan order, and may determine that the first coding unit 900 is split into an odd number of coding units based on a result of the decision. According to an embodiment, when a coding unit is split into an odd number of coding units, the image decoding apparatus 100 may put a predetermined restriction on a coding unit at a predetermined location from among the split coding units, and the restriction or the predetermined location has been described above through various embodiments and thus detailed descriptions thereof will not be provided here.

According to an embodiment, the image decoding apparatus 100 may determine various-shaped coding units by splitting a first coding unit.

Referring to FIG. 9, the image decoding apparatus 100 may split the square first coding unit 900 or a non-square first coding unit 930 or 950 into various-shaped coding units.

Figure 10:
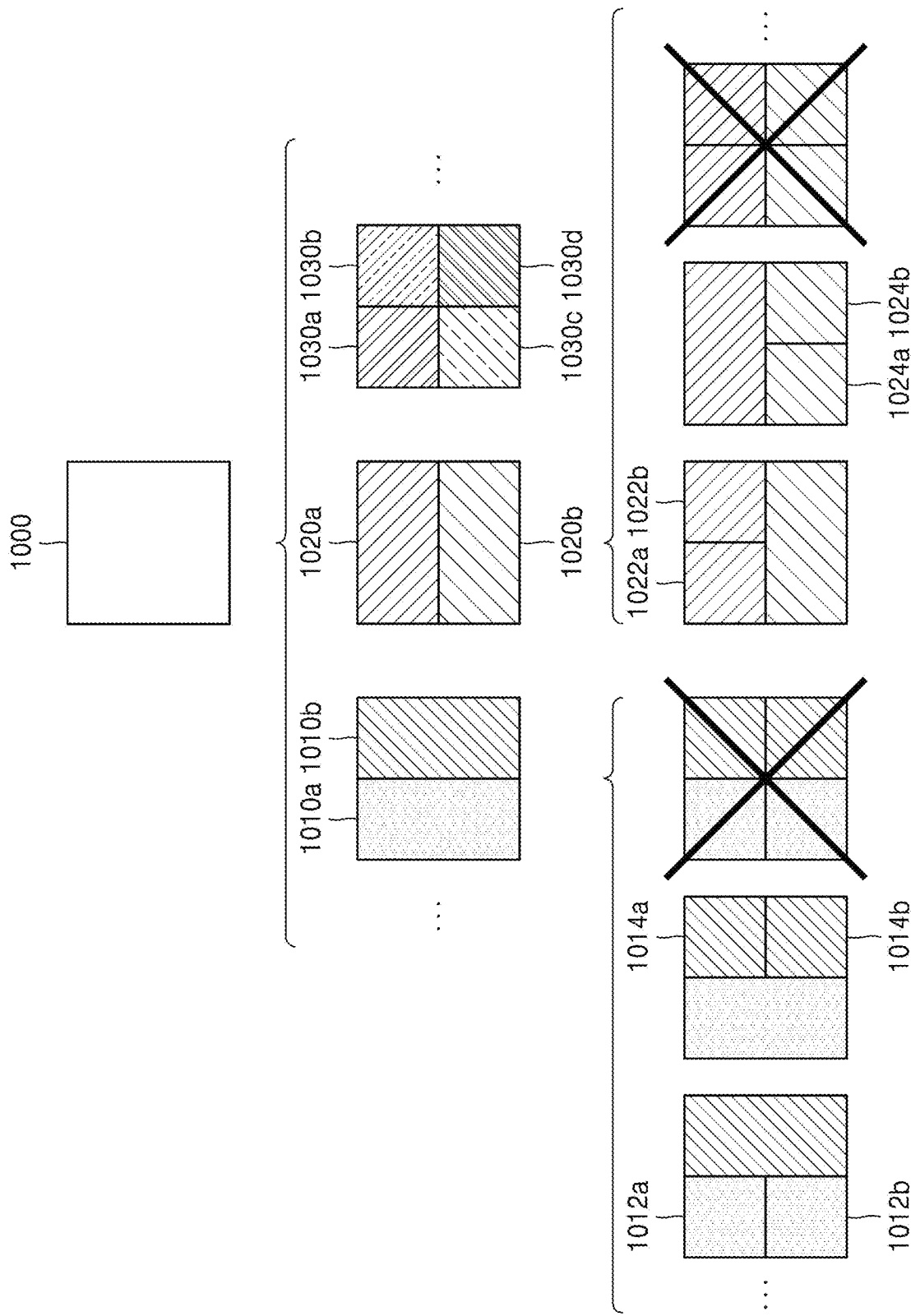
FIG. 10 illustrates that a shape into which a second coding unit is splittable by the image decoding apparatus is restricted when a second coding unit having a non-square shape, which is determined by splitting a first coding unit, satisfies a predetermined condition, according to an embodiment.

FIG. 10 illustrates that a shape into which a second coding unit is splittable by the image decoding apparatus 100 is restricted when a second coding unit having a non-square shape, which is determined by splitting a first coding unit 1000, satisfies a predetermined condition, according to an embodiment.

According to an embodiment, the image decoding apparatus 100 may determine to split the square first coding unit 1000 into non-square second coding units 1010a, 1010b, 1020a, and 1020b, based on split shape mode information, which is obtained by the bitstream obtainer 110. The second coding units 1010a, 1010b, 1020a, and 1020b may be independently split. As such, the image decoding apparatus 100 may determine to split or not to split the first coding unit 1000 into a plurality of coding units, based on the split shape mode information of each of the second coding units 1010a, 1010b, 1020a, and 1020b. According to an embodiment, the image decoding apparatus 100 may determine third coding units 1012a and 1012b by splitting the non-square left second coding unit 1010a, which is determined by splitting the first coding unit 1000 in a vertical direction, in a horizontal direction. However, when the left second coding unit 1010a is split in a horizontal direction, the image decoding apparatus 100 may restrict the right second coding unit 1010b to not be split in a horizontal direction in which the left second coding unit 1010a is split. When third coding units 1014a and 1014b are determined by splitting the right second coding unit 1010b in the same direction, because the left and right second coding units 1010a and 1010b are independently split in a horizontal direction, the third coding units 1012a, 1012b, 1014a, and 1014b may be determined. However, this case serves equally as a case in which the image decoding apparatus 100 splits the first coding unit 1000 into four square second coding units 1030a, 1030b, 1030c, and 1030d, based on the split shape mode information, and may be inefficient in terms of image decoding.

According to an embodiment, the image decoding apparatus 100 may determine third coding units 1022a, 1022b, 1024a, and 1024b by splitting the non-square second coding unit 1020a or 1020b, which is determined by splitting the first coding unit 1000 in a horizontal direction, in a vertical direction. However, when a second coding unit (e.g., the upper second coding unit 1020a) is split in a vertical direction, for the above-described reason, the image decoding apparatus 100 may restrict the other second coding unit (e.g., the lower second coding unit 1020b) to not be split in a vertical direction in which the upper second coding unit 1020a is split.

Figure 11:
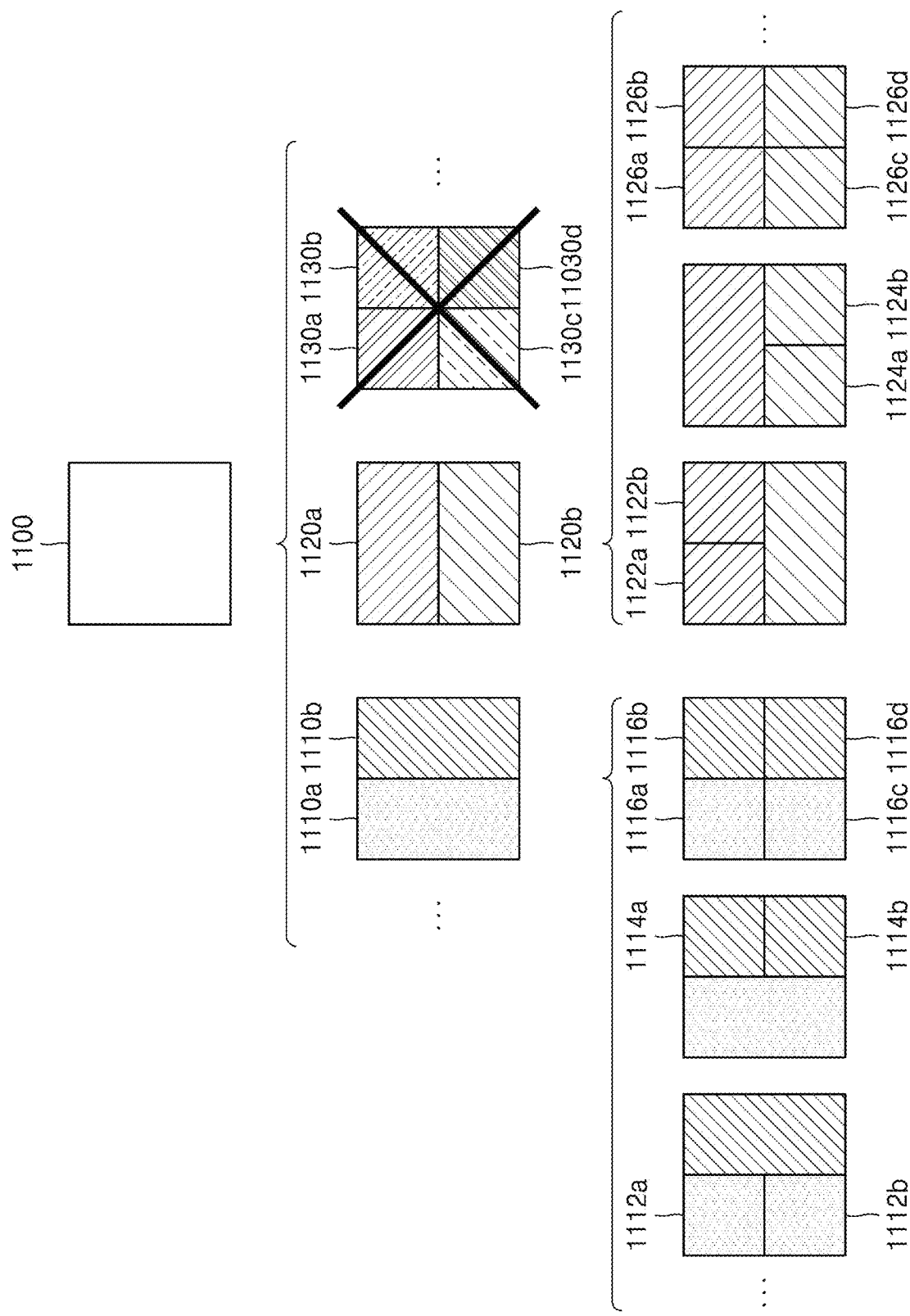
FIG. 11 illustrates a process, performed by the image decoding apparatus, of splitting a square coding unit when split shape mode information indicates that the square coding unit is not to be split into four square coding units, according to an embodiment.

FIG. 11 illustrates a process, performed by the image decoding apparatus 100, of splitting a square coding unit when split shape mode information indicates that the square coding unit is not to be split into four square coding units, according to an embodiment.

According to an embodiment, the image decoding apparatus 100 may determine second coding units 1110a, 1110b, 1120a, 1120b, etc. by splitting a first coding unit 1100 based on split shape mode information. The split shape mode information may include information about various methods of splitting a coding unit but, the information about various splitting methods may not include information for splitting a coding unit into four square coding units. According to such split shape mode information, the image decoding apparatus 100 may not split the first square coding unit 1100 into four square second coding units 1130a, 1130b, 1130c, and 1130d. The image decoding apparatus 100 may determine the non-square second coding units 1110a, 1110b, 1120a, 1120b, etc., based on the split shape mode information.

According to an embodiment, the image decoding apparatus 100 may independently split the non-square second coding units 1110a, 1110b, 1120a, 1120b, etc. Each of the second coding units 1110a, 1110b, 1120a, 1120b, etc. may be recursively split in a predetermined order, and this splitting method may correspond to a method of splitting the first coding unit 1100 based on the split shape mode information.

For example, the image decoding apparatus 100 may determine square third coding units 1112a and 1112b by splitting the left second coding unit 1110a in a horizontal direction, and may determine square third coding units 1114a and 1114b by splitting the right second coding unit 1110b in a horizontal direction. Furthermore, the image decoding apparatus 100 may determine square third coding units 1116a, 1116b, 1116c, and 1116d by splitting both of the left and right second coding units 1110a and 1110b in a horizontal direction. In this case, coding units having the same shape as the four square second coding units 1130a, 1130b, 1130c, and 1130d split from the first coding unit 1100 may be determined.

As another example, the image decoding apparatus 100 may determine square third coding units 1122a and 1122b by splitting the upper second coding unit 1120a in a vertical direction, and may determine square third coding units 1124a and 1124b by splitting the lower second coding unit 1120b in a vertical direction. Furthermore, the image decoding apparatus 100 may determine square third coding units 1126a, 1126b, 1126c, and 1126d by splitting both of the upper and lower second coding units 1120a and 1120b in a vertical direction. In this case, coding units having the same shape as the four square second coding units 1130a, 1130b, 1130c, and 1130d split from the first coding unit 1100 may be determined.

Figure 12:
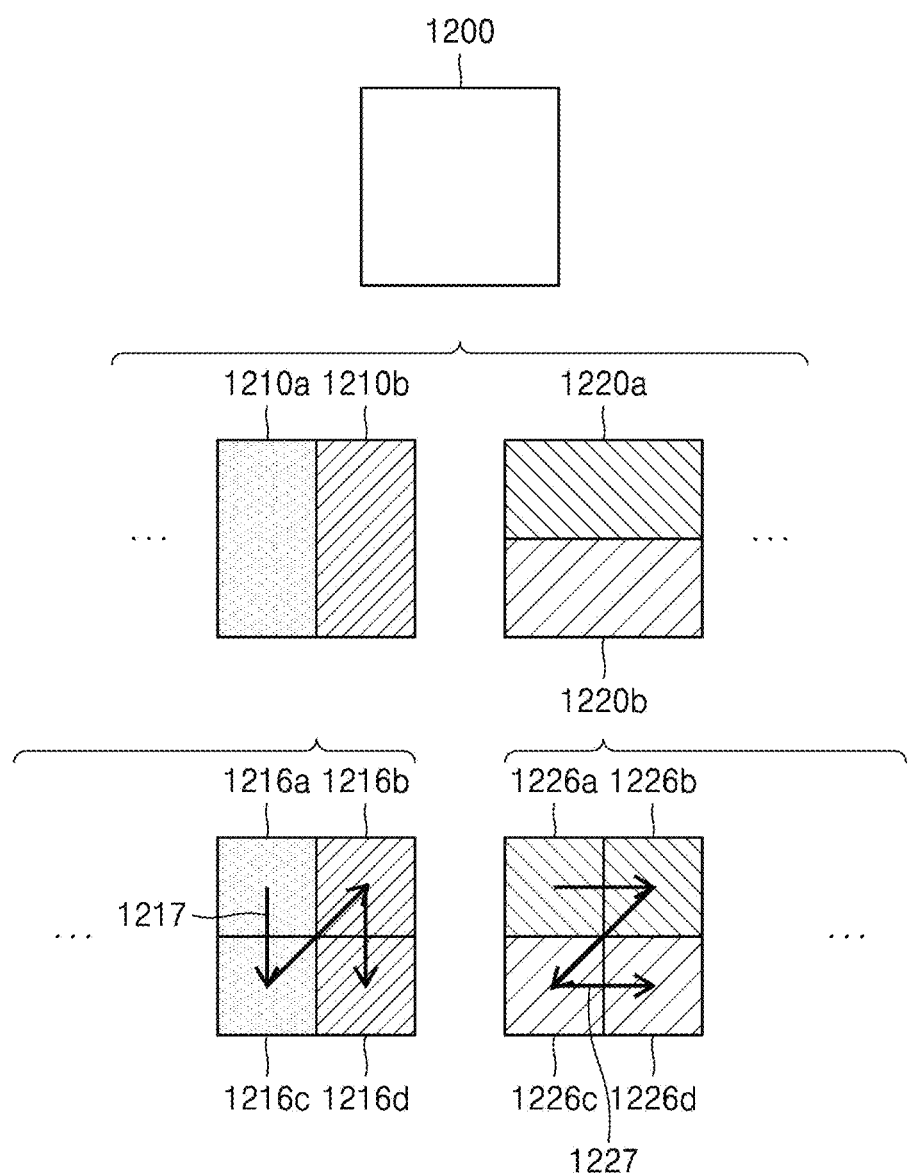
FIG. 12 illustrates that a processing order between a plurality of coding units may be changed depending on a process of splitting a coding unit, according to an embodiment.

FIG. 12 illustrates that a processing order between a plurality of coding units may be changed depending on a process of splitting a coding unit, according to an embodiment.

According to an embodiment, the image decoding apparatus 100 may split a first coding unit 1200, based on split shape mode information. When a block shape is a square shape and the split shape mode information indicates to split the first coding unit 1200 in at least one of horizontal and vertical directions, the image decoding apparatus 100 may determine second coding units 1210a, 1210b, 1220a, 1220b, etc. by splitting the first coding unit 1200. Referring to FIG. 12, the non-square second coding units 1210a, 1210b, 1220a, and 1220b determined by splitting the first coding unit 1200 in only a horizontal direction or vertical direction may be independently split based on the split shape mode information of each coding unit. For example, the image decoding apparatus 100 may determine third coding units 1216a, 1216b, 1216c, and 1216d by splitting the second coding units 1210a and 1210b, which are generated by splitting the first coding unit 1200 in a vertical direction, in a horizontal direction, and may determine third coding units 1226a, 1226b, 1226c, and 1226d by splitting the second coding units 1220a and 1220b, which are generated by splitting the first coding unit 1200 in a horizontal direction, in a horizontal direction. An operation of splitting the second coding units 1210a, 1210b, 1220a, and 1220b has been described above with reference to FIG. 11, and thus detailed descriptions thereof will not be provided here.

According to an embodiment, the image decoding apparatus 100 may process coding units in a predetermined order. An operation of processing coding units in a predetermined order has been described above with reference to FIG. 7, and thus detailed descriptions thereof will not be provided here. Referring to FIG. 12, the image decoding apparatus 100 may determine four square third coding units 1216a, 1216b, 1216c, and 1216d, and 1226a, 1226b, 1226c, and 1226d by splitting the square first coding unit 1200. According to an embodiment, the image decoding apparatus 100 may determine processing orders of the third coding units 1216a, 1216b, 1216c, and 1216d, and 1226a, 1226b, 1226c, and 1226d based on a splitting method of the first coding unit 1200.

According to an embodiment, the image decoding apparatus 100 may determine the third coding units 1216a, 1216b, 1216c, and 1216d by splitting the second coding units 1210a and 1210b generated by splitting the first coding unit 1200 in a vertical direction, in a horizontal direction, and may process the third coding units 1216a, 1216b, 1216c, and 1216d in a processing order 1217 for initially processing the third coding units 1216a and 1216c, which are included in the left second coding unit 1210a, in a vertical direction and then processing the third coding unit 1216b and 1216d, which are included in the right second coding unit 1210b, in a vertical direction.

According to an embodiment, the image decoding apparatus 100 may determine the third coding units 1226a, 1226b, 1226c, and 1226d by splitting the second coding units 1220a and 1220b generated by splitting the first coding unit 1200 in a horizontal direction, in a vertical direction, and may process the third coding units 1226a, 1226b, 1226c, and 1226d in a processing order 1227 for initially processing the third coding units 1226a and 1226b, which are included in the upper second coding unit 1220a, in a horizontal direction and then processing the third coding unit 1226c and 1226d, which are included in the lower second coding unit 1220b, in a horizontal direction.

Referring to FIG. 12, the square third coding units 1216a, 1216b, 1216c, and 1216d, and 1226a, 1226b, 1226c, and 1226d may be determined by splitting the second coding units 1210a, 1210b, 1220a, and 1220b, respectively. Although the second coding units 1210a and 1210b are determined by splitting the first coding unit 1200 in a vertical direction differently from the second coding units 1220a and 1220b which are determined by splitting the first coding unit 1200 in a horizontal direction, the third coding units 1216a, 1216b, 1216c, and 1216d, and 1226a, 1226b, 1226c, and 1226d split therefrom eventually show same-shaped coding units split from the first coding unit 1200. As such, by recursively splitting a coding unit in different manners based on the split shape mode information, the image decoding apparatus 100 may process a plurality of coding units in different orders even when the coding units are eventually determined to be the same shape.

FIG. 13 illustrates a process of determining a depth of a coding unit as a shape and a size of the coding unit change, when the coding unit is recursively split such that a plurality of coding units are determined, according to an embodiment.

According to an embodiment, the image decoding apparatus 100 may determine the depth of the coding unit, based on a predetermined criterion. For example, the predetermined criterion may be the length of a long side of the coding unit. When the length of a long side of a coding unit before being split is 2n times (n>0) the length of a long side of a split current coding unit, the image decoding apparatus 100 may determine that a depth of the current coding unit is increased from a depth of the coding unit before being split, by n. In the following description, a coding unit having an increased depth is expressed as a coding unit of a deeper depth.

Referring to FIG. 13, according to an embodiment, the image decoding apparatus 100 may determine a second coding unit 1302, a third coding unit 1304, etc. of deeper depths by splitting a square first coding unit 1300 based on block shape information indicating a square shape (e.g., the block shape information may be expressed as '0: SQUARE'). Assuming that the size of the square first coding unit 1300 is 2N×2N, the second coding unit 1302 determined by dividing a width and height of the first coding unit 1300 to ½ may have a size of N×N. Furthermore, the third coding unit 1304 determined by dividing a width and height of the second coding unit 1302 to ½ may have a size of N/2×N/2. In this case, a width and height of the third coding unit 1304 are ¼ times those of the first coding unit 1300. When a depth of the first coding unit 1300 is D, a depth of the second coding unit 1302, the width and height of which are ½ times those of the first coding unit 1300, may be D+1, and a depth of the third coding unit 1304, the width and height of which are ¼ times those of the first coding unit 1300, may be D+2.

According to an embodiment, the image decoding apparatus 100 may determine a second coding unit 1312 or 1322, a third coding unit 1314 or 1324, etc. of deeper depths by splitting a non-square first coding unit 1310 or 1320 based on block shape information indicating a non-square shape (e.g., the block shape information may be expressed as '1: NS_VER' indicating a non-square shape, a height of which is longer than a width, or as '2: NS_HOR' indicating a non-square shape, a width of which is longer than a height).

The image decoding apparatus 100 may determine the second coding unit 1302, 1312, or 1322 by dividing at least one of a width and height of the first coding unit 1310 having a size of N×2N. That is, the image decoding apparatus 100 may determine the second coding unit 1302 having a size of N×N or the second coding unit 1322 having a size of N×N/2 by splitting the first coding unit 1310 in a horizontal direction, or may determine the second coding unit 1312 having a size of N/2×N by splitting the first coding unit 1310 in horizontal and vertical directions.

According to an embodiment, the image decoding apparatus 100 may determine the second coding unit 1302, 1312, or 1322 by dividing at least one of a width and height of the first coding unit 1320 having a size of 2N×N. That is, the image decoding apparatus 100 may determine the second coding unit 1302 having a size of N×N or the second coding unit 1312 having a size of N/2×N by splitting the first coding unit 1320 in a vertical direction, or may determine the second coding unit 1322 having a size of N×N/2 by splitting the first coding unit 1320 in horizontal and vertical directions.

According to an embodiment, the image decoding apparatus 100 may determine the third coding unit 1304, 1314, or 1324 by dividing at least one of a width and height of the second coding unit 1302 having a size of N×N. That is, the image decoding apparatus 100 may determine the third coding unit 1304 having a size of N/2×N/2, the third coding unit 1314 having a size of N/4×N/2, or the third coding unit 1324 having a size of N/2×N/4 by splitting the second coding unit 1302 in vertical and horizontal directions.

According to an embodiment, the image decoding apparatus 100 may determine the third coding unit 1304, 1314, or 1324 by dividing at least one of a width and height of the second coding unit 1312 having a size of N/2×N. That is, the image decoding apparatus 100 may determine the third coding unit 1304 having a size of N/2×N/2 or the third coding unit 1324 having a size of N/2×N/4 by splitting the second coding unit 1312 in a horizontal direction, or may determine the third coding unit 1314 having a size of N/4×N/2 by splitting the second coding unit 1312 in vertical and horizontal directions.

According to an embodiment, the image decoding apparatus 100 may determine the third coding unit 1304, 1314, or 1324 by dividing at least one of a width and height of the second coding unit 1322 having a size of N×N/2. That is, the image decoding apparatus 100 may determine the third coding unit 1304 having a size of N/2×N/2 or the third coding unit 1314 having a size of N/4×N/2 by splitting the second coding unit 1322 in a vertical direction, or may determine the third coding unit 1324 having a size of N/2×N/4 by splitting the second coding unit 1322 in vertical and horizontal directions.

According to an embodiment, the image decoding apparatus 100 may split the square coding unit 1300, 1302, or 1304 in a horizontal or vertical direction. For example, the image decoding apparatus 100 may determine the first coding unit 1310 having a size of N×2N by splitting the first coding unit 1300 having a size of 2N×2N in a vertical direction, or may determine the first coding unit 1320 having a size of 2N×N by splitting the first coding unit 1300 in a horizontal direction. According to an embodiment, when a depth is determined based on the length of the longest side of a coding unit, a depth of a coding unit determined by splitting the first coding unit 1300 having a size of 2N×2N in a horizontal or vertical direction may be the same as the depth of the first coding unit 1300.

According to an embodiment, a width and height of the third coding unit 1314 or 1324 may be ¼ times those of the first coding unit 1310 or 1320. When a depth of the first coding unit 1310 or 1320 is D, a depth of the second coding unit 1312 or 1322, the width and height of which are ½ times those of the first coding unit 1310 or 1320, may be D+1, and a depth of the third coding unit 1314 or 1324, the width and height of which are ¼ times those of the first coding unit 1310 or 1320, may be D+2.

Figure 14:
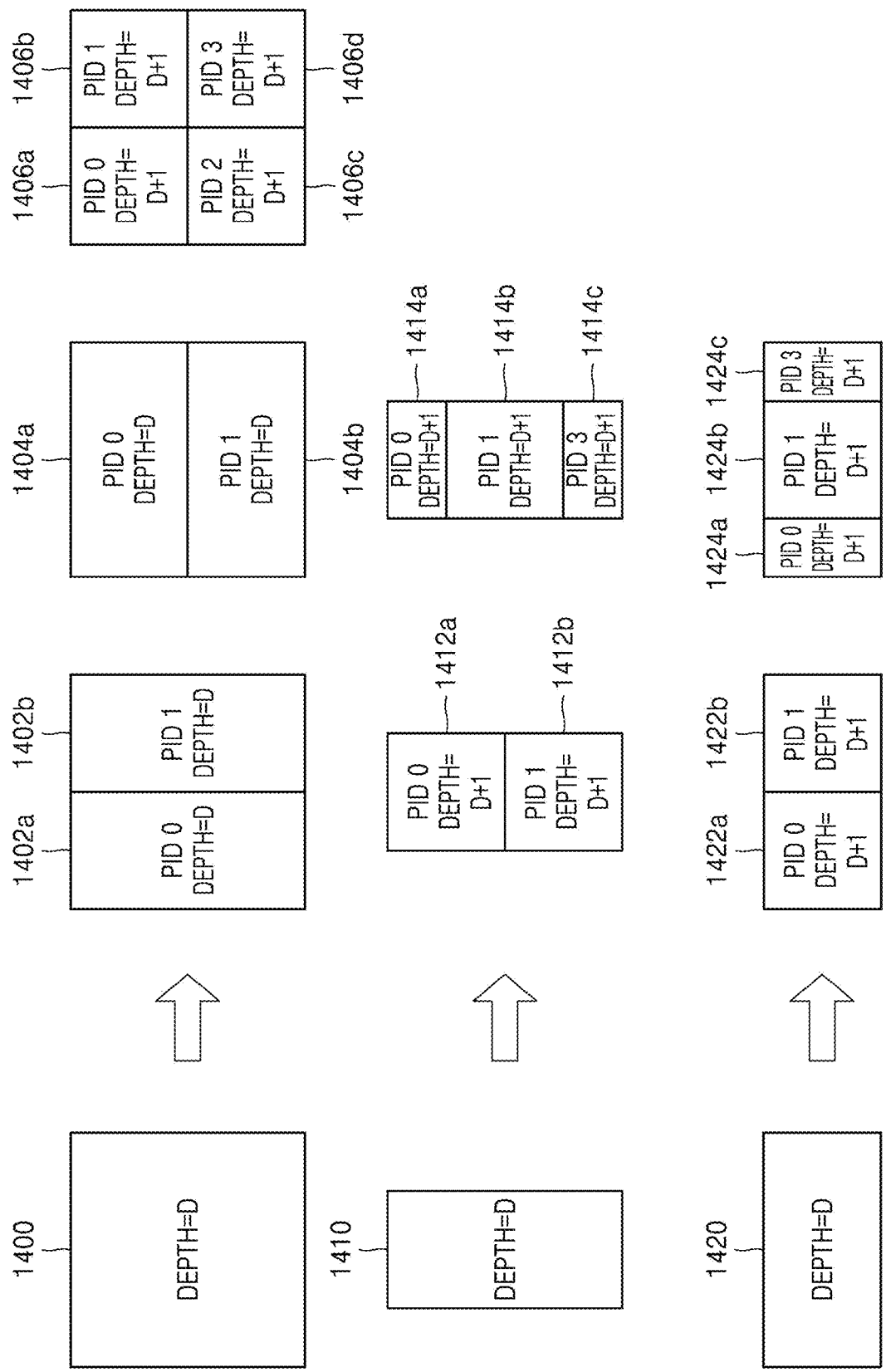
FIG. 14 illustrates depths that are determinable based on shapes and sizes of coding units, and part indexes (PIDs) that are for distinguishing the coding units, according to an embodiment.

FIG. 14 illustrates depths that are determinable based on shapes and sizes of coding units, and part indexes (PIDs) that are for distinguishing the coding units, according to an embodiment.

According to an embodiment, the image decoding apparatus 100 may determine various-shaped second coding units by splitting a square first coding unit 1400. Referring to FIG. 14, the image decoding apparatus 100 may determine second coding units 1402a and 1402b, 1404a and 1404b, and 1406a, 1406b, 1406c, and 1406d by splitting the first coding unit 1400 in at least one of vertical and horizontal directions based on split shape mode information. That is, the image decoding apparatus 100 may determine the second coding units 1402a and 1402b, 1404a and 1404b, and 1406a, 1406b, 1406c, and 1406d, based on the split shape mode information of the first coding unit 1400.

According to an embodiment, a depth of the second coding units 1402a and 1402b, 1404a and 1404b, and 1406a, 1406b, 1406c, and 1406d, which are determined based on the split shape mode information of the square first coding unit 1400, may be determined based on the length of a long side thereof. For example, because the length of a side of the square first coding unit 1400 equals the length of a long side of the non-square second coding units 1402a and 1402b, and 1404a and 1404b, the first coding unit 1400 and the non-square second coding units 1402a and 1402b, and 1404*a* and 1404*b* may have the same depth, e.g., D. However, when the image decoding apparatus 100 splits the first coding unit 1400 into the four square second coding units 1406*a*, 1406*b*, 1406*c*, and 1406*d* based on the split shape mode information, because the length of a side of the square second coding units 1406*a*, 1406*b*, 1406*c*, and 1406*d* is ½ times the length of a side of the first coding unit 1400, a depth of the second coding units 1406*a*, 1406*b*, 1406*c*, and 1406*d* may be D+1 which is deeper than the depth D of the first coding unit 1400 by 1.

According to an embodiment, the image decoding apparatus 100 may determine a plurality of second coding units 1412*a* and 1412*b*, and 1414*a*, 1414*b*, and 1414*c* by splitting a first coding unit 1410, a height of which is longer than a width, in a horizontal direction based on the split shape mode information. According to an embodiment, the image decoding apparatus 100 may determine a plurality of second coding units 1422*a* and 1422*b*, and 1424*a*, 1424*b*, and 1424*c* by splitting a first coding unit 1420, a width of which is longer than a height, in a vertical direction based on the split shape mode information.

According to an embodiment, a depth of the second coding units 1412*a* and 1412*b*, 1414*a*, 1414*b*, and 1414*c*, 1422*a* and 1422*b*, and 1424*a*, 1424*b*, and 1424*c*, which are determined based on the split shape mode information of the non-square first coding unit 1410 or 1420, may be determined based on the length of a long side thereof. For example, because the length of a side of the square second coding units 1412*a* and 1412*b* is ½ times the length of a long side of the first coding unit 1410 having a non-square shape, a height of which is longer than a width, a depth of the square second coding units 1412*a* and 1412*b* is D+1 which is deeper than the depth D of the non-square first coding unit 1410 by 1.

Furthermore, the image decoding apparatus 100 may split the non-square first coding unit 1410 into an odd number of second coding units 1414*a*, 1414*b*, and 1414*c* based on the split shape mode information. The odd number of second coding units 1414*a*, 1414*b*, and 1414*c* may include the non-square second coding units 1414*a* and 1414*c* and the square second coding unit 1414*b*. In this case, because the length of a long side of the non-square second coding units 1414*a* and 1414*c* and the length of a side of the square second coding unit 1414*b* are ½ times the length of a long side of the first coding unit 1410, a depth of the second coding units 1414*a*, 1414*b*, and 1414*c* may be D+1 which is deeper than the depth D of the non-square first coding unit 1410 by 1. The image decoding apparatus 100 may determine depths of coding units split from the first coding unit 1420 having a non-square shape, a width of which is longer than a height, by using the above-described method of determining depths of coding units split from the first coding unit 1410.

According to an embodiment, the image decoding apparatus 100 may determine PIDs for identifying split coding units, based on a size ratio between the coding units when an odd number of split coding units do not have equal sizes. Referring to FIG. 14, the coding unit 1414*b* of a center location among the odd number of split coding units 1414*a*, 1414*b*, and 1414*c* may have a width equal to that of the other coding units 1414*a* and 1414*c* and a height which is two times that of the other coding units 1414*a* and 1414*c*. That is, in this case, the coding unit 1414*b* at the center location may include two of the other coding unit 1414*a* or 1414*c*. Therefore, when a PID of the coding unit 1414*b* at the center location is 1 based on a scan order, a PID of the coding unit 1414*c* located next to the coding unit 1414*b* may be increased by 2 and thus may be 3. That is, discontinuity in PID values may be present. According to an embodiment, the image decoding apparatus 100 may determine whether an odd number of split coding units do not have equal sizes, based on whether discontinuity is present in PIDs for identifying the split coding units.

According to an embodiment, the image decoding apparatus 100 may determine whether to use a specific splitting method, based on PID values for identifying a plurality of coding units determined by splitting a current coding unit. Referring to FIG. 14, the image decoding apparatus 100 may determine an even number of coding units 1412*a* and 1412*b* or an odd number of coding units 1414*a*, 1414*b*, and 1414*c* by splitting the first coding unit 1410 having a rectangular shape, a height of which is longer than a width. The image decoding apparatus 100 may use PIDs to identify respective coding units. According to an embodiment, the PID may be obtained from a sample of a predetermined location (e.g., a top left sample) of each coding unit.

According to an embodiment, the image decoding apparatus 100 may determine a coding unit at a predetermined location from among the split coding units, by using the PIDs for distinguishing the coding units. According to an embodiment, when the split shape mode information of the first coding unit 1410 having a rectangular shape, a height of which is longer than a width, indicates to split a coding unit into three coding units, the image decoding apparatus 100 may split the first coding unit 1410 into three coding units 1414*a*, 1414*b*, and 1414*c*. The image decoding apparatus 100 may assign a PID to each of the three coding units 1414*a*, 1414*b*, and 1414*c*. The image decoding apparatus 100 may compare PIDs of an odd number of split coding units to determine a coding unit at a center location from among the coding units. The image decoding apparatus 100 may determine the coding unit 1414*b* having a PID corresponding to a middle value among the PIDs of the coding units, as the coding unit at the center location from among the coding units determined by splitting the first coding unit 1410. According to an embodiment, the image decoding apparatus 100 may determine PIDs for distinguishing split coding units, based on a size ratio between the coding units when the split coding units do not have equal sizes. Referring to FIG. 14, the coding unit 1414*b* generated by splitting the first coding unit 1410 may have a width equal to that of the other coding units 1414*a* and 1414*c* and a height which is two times that of the other coding units 1414*a* and 1414*c*. In this case, when the PID of the coding unit 1414*b* at the center location is 1, the PID of the coding unit 1414*c* located next to the coding unit 1414*b* may be increased by 2 and thus may be 3. When the PID is not uniformly increased as described above, the image decoding apparatus 100 may determine that a coding unit is split into a plurality of coding units including a coding unit having a size different from that of the other coding units. According to an embodiment, when the split shape mode information indicates to split a coding unit into an odd number of coding units, the image decoding apparatus 100 may split a current coding unit in such a manner that a coding unit of a predetermined location (e.g., a coding unit of a center location) among an odd number of coding units has a size different from that of the other coding units. In this case, the image decoding apparatus 100 may determine the coding unit of the center location, which has a different size, by using PIDs of the coding units. However, the PID and the size or location of the coding unit of the predetermined location to be determined are not limited to the above-described examples, and various PIDs and various locations and sizes of coding units may be used.

According to an embodiment, the image decoding apparatus 100 may use a predetermined data unit where a coding unit starts to be recursively split.

Figure 15:
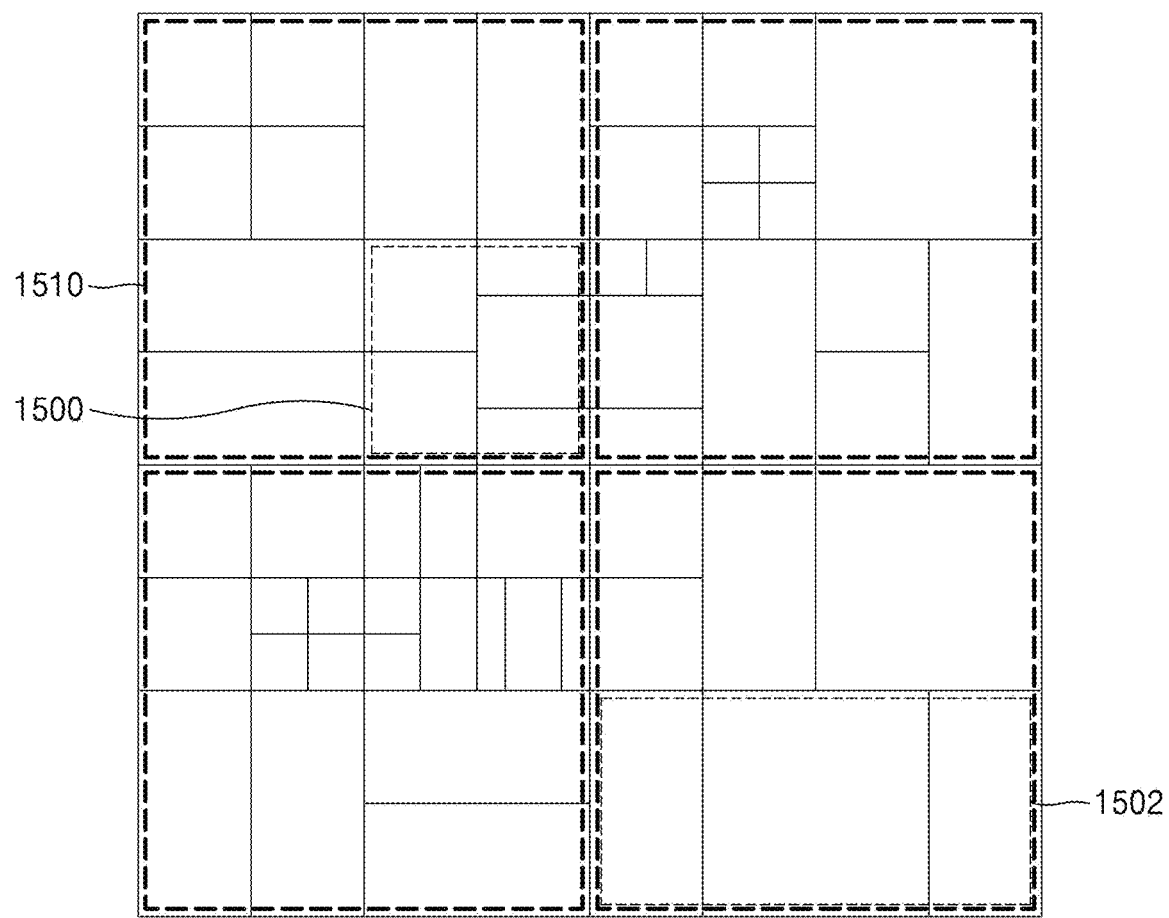
FIG. 15 illustrates that a plurality of coding units are determined based on a plurality of predetermined data units included in a picture, according to an embodiment.

FIG. 15 illustrates that a plurality of coding units are determined based on a plurality of predetermined data units included in a picture, according to an embodiment.

According to an embodiment, a predetermined data unit may be defined as a data unit where a coding unit starts to be recursively split by using split shape mode information. That is, the predetermined data unit may correspond to a coding unit of an uppermost depth, which is used to determine a plurality of coding units split from a current picture. In the following descriptions, for convenience of explanation, the predetermined data unit is referred to as a reference data unit.

According to an embodiment, the reference data unit may have a predetermined size and a predetermined shape. According to an embodiment, the reference data unit may include M×N samples. Herein, M and N may be equal to each other, and may be integers expressed as powers of 2. That is, the reference data unit may have a square or non-square shape, and may be split into an integer number of coding units.

According to an embodiment, the image decoding apparatus 100 may split the current picture into a plurality of reference data units. According to an embodiment, the image decoding apparatus 100 may split the plurality of reference data units, which are split from the current picture, by using split shape mode information for each reference data unit. The operation of splitting the reference data unit may correspond to a splitting operation using a quadtree structure.

According to an embodiment, the image decoding apparatus 100 may previously determine the minimum size allowed for the reference data units included in the current picture. Accordingly, the image decoding apparatus 100 may determine various reference data units having sizes equal to or greater than the minimum size, and may determine one or more coding units by using the split shape mode information with reference to the determined reference data unit.

Referring to FIG. 15, the image decoding apparatus 100 may use a square reference coding unit 1500 or a non-square reference coding unit 1502. According to an embodiment, the shape and size of reference coding units may be determined based on various data units capable of including one or more reference coding units (e.g., sequences, pictures, slices, slice segments, largest coding units, or the like).

According to an embodiment, the bitstream obtainer 110 of the image decoding apparatus 100 may obtain, from a bitstream, at least one of reference coding unit shape information and reference coding unit size information with respect to each of the various data units. An operation of determining one or more coding units included in the square reference coding unit 1500 has been described above in relation to the operation of splitting the current coding unit 300 of FIG. 3, and an operation of determining one or more coding units included in the non-square reference coding unit 1502 has been described above in relation to the operation of splitting the current coding unit 400 or 450 of FIG. 4, and thus, detailed descriptions thereof will not be provided here.

According to an embodiment, the image decoding apparatus 100 may use a PID for identifying the size and shape of reference coding units, to determine the size and shape of reference coding units according to some data units previously determined based on a predetermined condition. That is, the bitstream obtainer 110 may obtain, from the bitstream, only the PID for identifying the size and shape of reference coding units with respect to each slice, slice segment, or largest coding unit which is a data unit satisfying a predetermined condition (e.g., a data unit having a size equal to or smaller than a slice) among the various data units (e.g., sequences, pictures, slices, slice segments, largest coding units, or the like). The image decoding apparatus 100 may determine the size and shape of reference data units with respect to each data unit, which satisfies the predetermined condition, by using the PID. When the reference coding unit shape information and the reference coding unit size information are obtained and used from the bitstream according to each data unit having a relatively small size, efficiency of using the bitstream may not be high, and therefore, only the PID may be obtained and used instead of directly obtaining the reference coding unit shape information and the reference coding unit size information. In this case, at least one of the size and shape of reference coding units corresponding to the PID for identifying the size and shape of reference coding units may be previously determined. That is, the image decoding apparatus 100 may determine at least one of the size and shape of reference coding units included in a data unit serving as a unit for obtaining the PID, by selecting the previously determined at least one of the size and shape of reference coding units based on the PID.

According to an embodiment, the image decoding apparatus 100 may use one or more reference coding units included in a largest coding unit. That is, a largest coding unit split from a picture may include one or more reference coding units, and coding units may be determined by recursively splitting each reference coding unit. According to an embodiment, at least one of a width and height of the largest coding unit may be integer times at least one of the width and height of the reference coding units. According to an embodiment, the size of reference coding units may be obtained by splitting the largest coding unit n times based on a quadtree structure. That is, the image decoding apparatus 100 may determine the reference coding units by splitting the largest coding unit n times based on a quadtree structure, and may split the reference coding unit based on at least one of the block shape information and the split shape mode information according to various embodiments.

Figure 16:
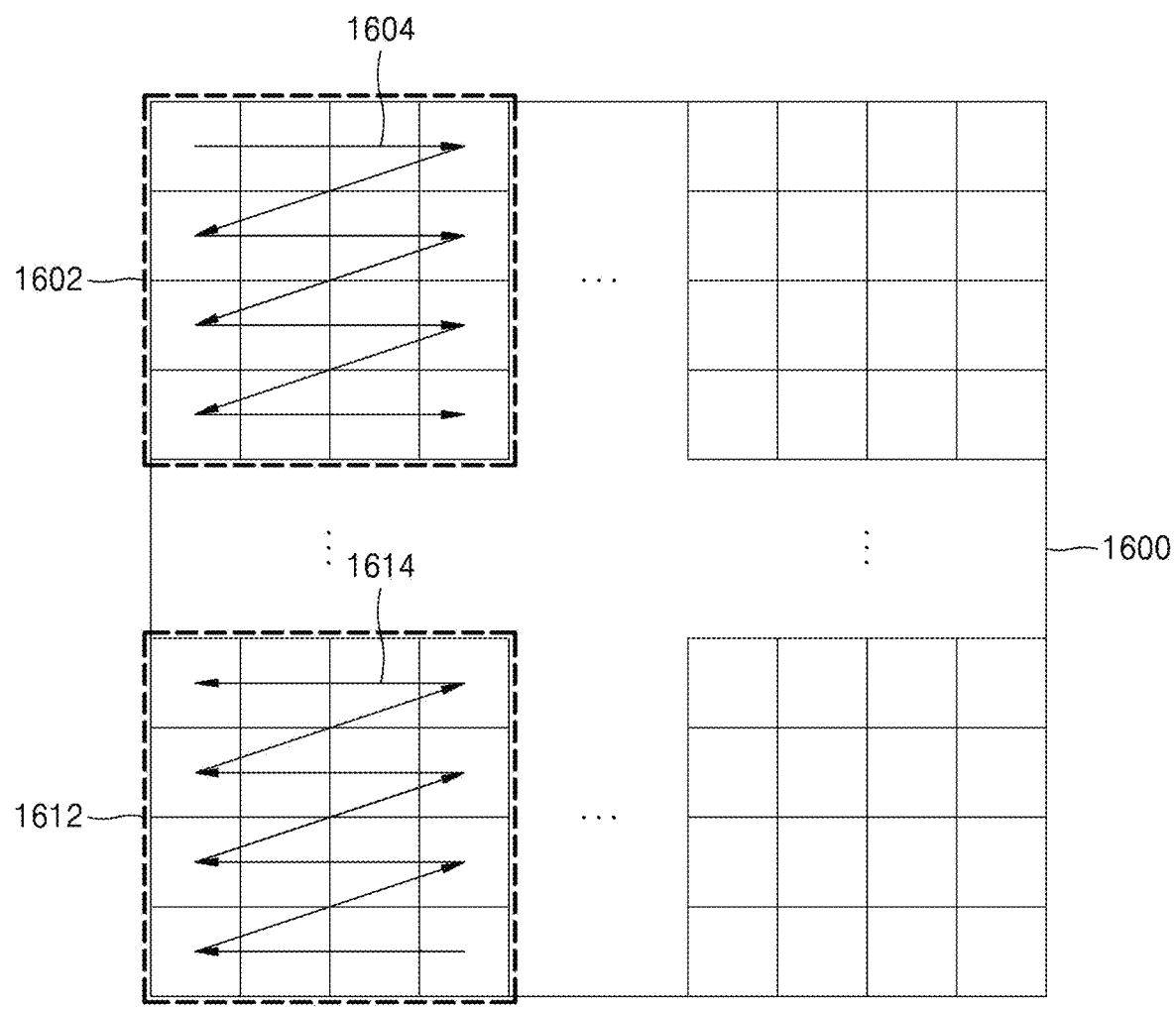
FIG. 16 illustrates a processing block serving as a unit for determining a determination order of reference coding units included in a picture, according to an embodiment.

FIG. 16 illustrates a processing block serving as a unit for determining a determination order of reference coding units included in a picture 1600, according to an embodiment.

According to an embodiment, the image decoding apparatus 100 may determine one or more processing blocks split from a picture. The processing block is a data unit including one or more reference coding units split from an image, and the one or more reference coding units included in the processing block may be determined according to a specific order. That is, a determination order of one or more reference coding units determined in each processing block may correspond to one of various types of orders for determining reference coding units, and may vary depending on the processing block. The determination order of reference coding units, which is determined with respect to each processing block, may be one of various orders, e.g., raster scan, Z-scan, N-scan, up-right diagonal scan, horizontal scan, and vertical scan, but is not limited to the above-mentioned scan orders.

According to an embodiment, the image decoding apparatus 100 may obtain processing block size information and may determine the size of one or more processing blocks included in the image. The image decoding apparatus 100 may obtain the processing block size information from a bitstream and may determine the size of one or more processing blocks included in the image. The size of processing blocks may be a predetermined size of data units, which is indicated by the processing block size information.

According to an embodiment, the bitstream obtainer 110 of the image decoding apparatus 100 may obtain the processing block size information from the bitstream according to each specific data unit. For example, the processing block size information may be obtained from the bitstream in a data unit such as an image, sequence, picture, slice, or slice segment. That is, bitstream obtainer 110 may obtain the processing block size information from the bitstream according to each of the various data units, the image decoding apparatus 100 may determine the size of one or more processing blocks, which are split from the picture, by using the obtained processing block size information, and the size of the processing blocks may be integer times that of the reference coding units.

According to an embodiment, the image decoding apparatus 100 may determine the size of processing blocks 1602 and 1612 included in the picture 1600. For example, the image decoding apparatus 100 may determine the size of processing blocks based on the processing block size information obtained from the bitstream. Referring to FIG. 16, according to an embodiment, the image decoding apparatus 100 may determine a width of the processing blocks 1602 and 1612 to be four times the width of the reference coding units, and may determine a height of the processing blocks 1602 and 1612 to be four times the height of the reference coding units. The image decoding apparatus 100 may determine a determination order of one or more reference coding units in one or more processing blocks.

According to an embodiment, the image decoding apparatus 100 may determine the processing blocks 1602 and 1612, which are included in the picture 1600, based on the size of processing blocks, and may determine a determination order of one or more reference coding units included in the processing blocks 1602 and 1612. According to an embodiment, determination of reference coding units may include determination of the size of the reference coding units.

According to an embodiment, the image decoding apparatus 100 may obtain, from the bitstream, determination order information of one or more reference coding units included in one or more processing blocks, and may determine a determination order with respect to one or more reference coding units based on the obtained determination order information. The determination order information may be defined as an order or direction for determining the reference coding units in the processing block. That is, the determination order of reference coding units may be independently determined with respect to each processing block.

According to an embodiment, the image decoding apparatus 100 may obtain, from the bitstream, the determination order information of reference coding units according to each specific data unit. For example, the bitstream obtainer 110 may obtain the determination order information of reference coding units from the bitstream according to each data unit such as an image, sequence, picture, slice, slice segment, or processing block. Because the determination order information of reference coding units indicates an order for determining reference coding units in a processing block, the determination order information may be obtained with respect to each specific data unit including an integer number of processing blocks.

According to an embodiment, the image decoding apparatus 100 may determine one or more reference coding units based on the determined determination order.

According to an embodiment, the bitstream obtainer 110 may obtain the determination order information of reference coding units from the bitstream as information related to the processing blocks 1602 and 1612, and the image decoding apparatus 100 may determine a determination order of one or more reference coding units included in the processing blocks 1602 and 1612 and determine one or more reference coding units, which are included in the picture 1600, based on the determination order. Referring to FIG. 16, the image decoding apparatus 100 may determine determination orders 1604 and 1614 of one or more reference coding units in the processing blocks 1602 and 1612, respectively. For example, when the determination order information of reference coding units is obtained with respect to each processing block, different kinds of the determination order information of reference coding units may be obtained for the processing blocks 1602 and 1612. When the determination order 1604 of reference coding units in the processing block 1602 is a raster scan order, reference coding units included in the processing block 1602 may be determined according to the raster scan order. On the contrary, when the determination order 1614 of reference coding units in the other processing block 1612 is a backward raster scan order, reference coding units included in the processing block 1612 may be determined according to the backward raster scan order.

According to an embodiment, the image decoding apparatus 100 may decode the determined one or more reference coding units. The image decoding apparatus 100 may decode an image, based on the reference coding units determined as described above. A method of decoding the reference coding units may include various image decoding methods.

According to an embodiment, the image decoding apparatus 100 may obtain block shape information indicating the shape of a current coding unit or split shape mode information indicating a splitting method of the current coding unit, from the bitstream, and may use the obtained information. The split shape mode information may be included in the bitstream related to various data units. For example, the image decoding apparatus 100 may use the split shape mode information included in a sequence parameter set, a picture parameter set, a video parameter set, a slice header, or a slice segment header. Furthermore, the image decoding apparatus 100 may obtain, from the bitstream, a syntax element corresponding to the block shape information or the split shape mode information according to each largest coding unit, each reference coding unit, or each processing block, and may use the obtained syntax element.

A method of determining a splitting rule according to an embodiment of the present disclosure will be described in detail.

The image decoding apparatus 100 may determine a splitting rule of an image. The splitting rule may be previously determined between the image decoding apparatus 100 and the image encoding apparatus 200. The image decoding apparatus 100 may determine the splitting rule of the image based on information obtained from a bitstream. The image decoding apparatus 100 may determine the splitting rule based on information obtained from at least one of a sequence parameter set, a picture parameter set, a video parameter set, a slice header, and a slice segment header. The image decoding apparatus 100 may differently determine the splitting rule according to a frame, a slice, a temporal layer, a largest coding unit, or a coding unit.

The image decoding apparatus 100 may determine the splitting rule based on a block shape of a coding unit. The block shape may include a size, a shape, a ratio between a width and a height, and a direction of the coding unit. The image encoding apparatus 200 and the image decoding apparatus 100 may previously determine to determine the splitting rule based on the block shape of the coding unit. However, the present disclosure is not limited thereto. The image decoding apparatus 100 may determine the splitting rule, based on the information obtained from the bitstream received from the image encoding apparatus 200.

The shape of the coding unit may include a square shape and a non-square shape. When the width and the height of the coding unit are the same, the image decoding apparatus 100 may determine that the shape of the coding unit is a square shape. Also, when the width and the height of the coding unit are not the same, the image decoding apparatus 100 may determine that the shape of the coding unit is a non-square shape.

The size of the coding unit may include various sizes such as 4×4, 8×4, 4×8, 8×8, 16×4, 16×8, . . . , and 256×256. The size of the coding unit may be classified according to the length of a long side, the length of a short side, or the area of the coding unit. The image decoding apparatus 100 may apply the same splitting rule to coding units belonging to the same group. For example, the image decoding apparatus 100 may classify coding units whose long sides have the same length as coding units having the same size. Also, the image decoding apparatus 100 may apply the same splitting rule to coding units whose long sides have the same length.

The ratio between the width and the height of the coding unit may include 1:2, 2:1, 1:4, 4:1, 1:8, 8:1, 1:16, 16:1, 32:1, or 1:32. Also, the direction of the coding unit may include a horizontal direction and a vertical direction. The horizontal direction may indicate a case where the length of the width of the coding unit is greater than the length of the height of the coding unit. The vertical direction may indicate a case where the length of the width of the coding unit is less than the length of the height of the coding unit.

The image decoding apparatus 100 may adaptively determine the splitting rule based on the size of the coding unit. The image decoding apparatus 100 may differently determine an allowable split shape mode based on the size of the coding unit. For example, the image decoding apparatus 100 may determine whether splitting is allowed based on the size of the coding unit. The image decoding apparatus 100 may determine a split direction according to the size of the coding unit. The image decoding apparatus 100 may determine an allowable split type according to the size of the coding unit.

Determining the splitting rule based on the size of the coding unit may be the splitting rule that is previously determined between the image encoding apparatus 200 and the image decoding apparatus 100. Also, the image decoding apparatus 100 may determine the splitting rule, based on the information obtained from the bitstream.

The image decoding apparatus 100 may adaptively determine the splitting rule based on a location of the coding unit. The image decoding apparatus 100 may adaptively determine the splitting rule based on the location of the coding unit in the image.

Also, the image decoding apparatus 100 may determine the splitting rule so that coding units generated using different split paths do not have the same block shape. However, the present disclosure is not limited thereto, and the coding units generated using different split paths may have the same block shape. The coding units generated using different split paths may have different decoding processing orders. A decoding processing order has been described with reference to FIG. 12, and thus a detailed explanation thereof will not be provided here.

Figure 17:
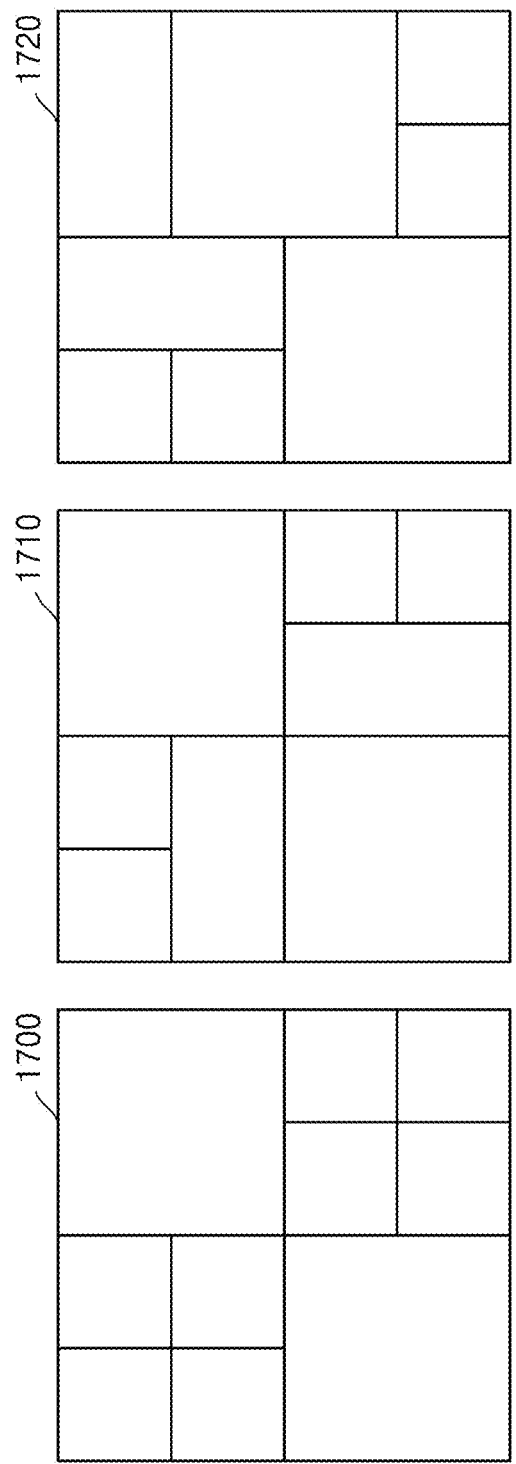
FIG. 17 illustrates coding units determinable per picture when a combination of shapes into which a coding unit is splittable is different per picture, according to an embodiment.

FIG. 17 illustrates coding units determinable per picture when a combination of shapes into which a coding unit is splittable is different per picture, according to an embodiment.

Referring to FIG. 17, the image decoding apparatus 100 may differently determine, per picture, a combination of shapes into which a coding unit is splittable. For example, the image decoding apparatus 100 may decode an image by using a picture 1700 that is splittable into 4 coding units, a picture 1710 that is splittable into 2 or 4 coding units, and a picture 1720 that is splittable into 2, 3, or 4 coding units, from among one or more pictures included in the image. In order to split the picture 1700 into a plurality of coding units, the image decoding apparatus 100 may use only split shape information indicating that the picture 1700 is split into 4 square coding units. In order to split the picture 1710, the image decoding apparatus 100 may use only split shape information indicating that the picture 1710 is split into 2 or 4 coding units. In order to split the picture 1720, the image decoding apparatus 100 may use only split shape information indicating that the picture 1720 is split into 2, 3, or 4 coding units. Because such a combination of split shapes is merely an embodiment for describing operations of the image decoding apparatus 100, the combination of split shapes should not be interpreted as being limited to the embodiment and various combinations of split shapes may be used according to predetermined data units.

According to an embodiment, the bitstream obtainer 110 of the image decoding apparatus 100 may obtain a bitstream including an index indicating a combination of split shape information according to predetermined data units (e.g., sequences, pictures, or slices). For example, the bitstream obtainer 110 may obtain the index indicating the combination of split shape information from a sequence parameter set, a picture parameter set, or a slice header. The image decoding apparatus 100 may determine a combination of split shapes into which a coding unit is splittable according to predetermined data units by using the obtained index, and thus different combinations of split shapes may be used according to predetermined data units.

FIG. 18 illustrates various shapes of a coding unit determinable based on split shape mode information representable as a binary code, according to an embodiment.

According to an embodiment, the image decoding apparatus 100 may split a coding unit into various shapes by using block shape information and split shape mode information obtained by the bitstream obtainer 110. Shapes into which a coding unit is splittable may correspond to various shapes including the shapes described with reference to the above embodiments.

Referring to FIG. 18, the image decoding apparatus 100 may split a square coding unit into at least one of a horizontal direction and a vertical direction and may split a non-square coding unit in a horizontal direction or a vertical direction, based on split shape mode information.

According to an embodiment, when the image decoding apparatus 100 is able to split a square coding unit in a horizontal direction and a vertical direction to obtain 4 square coding units, the number of split shapes that may be indicated by the split shape mode information about the square coding unit may be 4. According to an embodiment, the split shape mode information may be represented as a 2-digit binary code, and a binary code may be allocated to each split shape. For example, when a coding unit is not split, the split shape mode information may be represented as (00)b; when a coding unit is split in a horizontal direction and a vertical direction, the split shape mode information may be represented as (01)b; when a coding unit is split in a horizontal direction, the split shape mode information may be represented as (10)b; and when a coding unit is spilt in a vertical direction, the split shape mode information may be represented as (11)b.

According to an embodiment, when the image decoding apparatus 100 splits a non-square coding unit in a horizontal direction or a vertical direction, types of split shapes that may be indicated by the split shape mode information may be determined according to the number of coding units into which a coding unit is split. Referring to FIG. 18, the image decoding apparatus 100 may split a non-square coding unit into up to 3 coding units according to an embodiment. The image decoding apparatus 100 may split a coding unit into two coding units, and in this case, the split shape mode information may be represented as (10)b. The image decoding apparatus 100 may split a coding unit into three coding units, and in this case, the split shape mode information may be represented as (11)b. The image decoding apparatus 100 may determine not to split a coding unit, and in this case, the split shape mode information may be represented as (0)b. That is, in order to use a binary code indicating split shape mode information, the image decoding apparatus 100 may use variable length coding (VLC), instead of fixed length coding (FLC).

According to an embodiment, referring to FIG. 18, a binary code of the split shape mode information indicating that a coding unit is not split may be represented as (0)b. When a binary code of the split shape mode information indicating that a coding unit is not split is set to (00)b, all 2-bit binary codes of split shape mode information have to be used despite that there is no split shape mode information set to (01)b. However, as shown in FIG. 18, when 3 split shapes are used for a non-square coding unit, the image decoding apparatus 100 may determine not to split a coding unit even by using a 1-bit binary code (0)b as the split shape mode information, thereby efficiently using a bitstream. However, split shapes of a non-square coding unit, which are indicated by the split shape mode information, should not be interpreted as being limited to 3 shapes shown in FIG. 18 and should be interpreted as being various shapes including the above embodiments.

Figure 19:
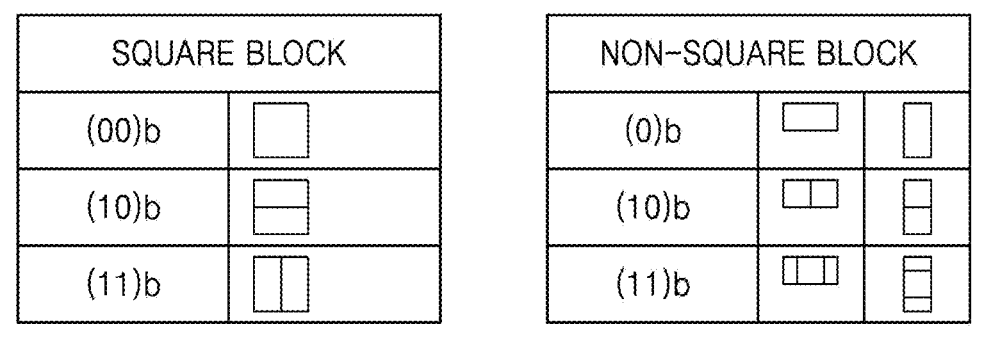

FIG. 19 illustrates other shapes of a coding unit determinable based on split shape mode information representable as a binary code, according to an embodiment.

Referring to FIG. 19, the image decoding apparatus 100 may split a square coding unit in a horizontal direction or a vertical direction and may split a non-square coding unit in a horizontal direction or a vertical direction, based on split shape mode information. That is, the split shape mode information may indicate that a square coding unit is split in one direction. In this case, a binary code of the split shape mode information indicating that a square coding unit is not split may be represented as (0)b. When a binary code of the split shape mode information indicating that a coding unit is not split is set to (00)b, all 2-bit binary codes of the split shape mode information have to be used despite that there is no split shape mode information set to (01)b. However, as shown in FIG. 19, when 3 split shapes are used for a square coding unit, the image decoding apparatus 100 may determine not to split a coding unit even by using a 1-bit binary code (0)b as the split shape mode information, thereby efficiently using a bitstream. However, split shapes of a square coding unit, which are indicated by the split shape mode information, should not be interpreted as being limited to 3 shapes shown in FIG. 19 and should be interpreted as being various shapes including the above embodiments.

According to an embodiment, block shape information or split shape mode information may be represented by using a binary code, and such information may be immediately generated as a bitstream. Alternatively, block shape information or split shape mode information representable as a binary code may not be immediately generated as a bitstream and may be used as a binary code input during context adaptive binary arithmetic coding (CABAC).

According to an embodiment, a process, performed by the image decoding apparatus 100, of obtaining syntax about block shape information or split shape mode information through CABAC will be described. A bitstream including a binary code for the syntax may be obtained by the bitstream obtainer 110. The image decoding apparatus 100 may detect a syntax element indicating the block shape information or the split shape mode information by de-binarizing a bin string included in the obtained bitstream. According to an embodiment, the image decoding apparatus 100 may obtain a set of binary bin strings corresponding to the syntax element to be decoded and may decode each bin by using probability information, and the image decoding apparatus 100 may repeatedly perform this process until a bin string including such decoded bins is the same as one of pre-obtained bin strings. The image decoding apparatus 100 may determine the syntax element by de-binarizing the bin string.

According to an embodiment, the image decoding apparatus 100 may determine syntax about a bin string by performing a decoding process of adaptive binary arithmetic coding, and may update a probability model for bins obtained by the bitstream obtainer 110. Referring to FIG. 18, the bitstream obtainer 110 of the image decoding apparatus 100 may obtain a bitstream indicating a binary code indicating split shape mode information according to an embodiment. The image decoding apparatus 100 may determine syntax about the split shape mode information by using the obtained binary code having a size of 1 bit or 2 bits. In order to determine the syntax about the split shape mode information, the image decoding apparatus 100 may update a probability of each bit from among the 2 bits of the binary code. That is, the image decoding apparatus 100 may update a probability that a next bin has a value of 0 or 1 during decoding, according to whether a value of a first bin in the 2-bits of the binary code is 0 or 1.

According to an embodiment, while determining the syntax, the image decoding apparatus 100 may update a probability of the bins used in a process of decoding the bins of the bin string for the syntax, and the image decoding apparatus 100 may determine that a specific bit in the bin string has the same probability without updating the probability.

Referring to FIG. 18, while determining syntax by using a bin string indicating split shape mode information about a non-square coding unit, the image decoding apparatus 100 may determine the syntax about the split shape mode information by using one bin having a value of 0 when the non-square coding unit is not split. That is, when block shape information indicates that a current coding unit has a non-square shape, a first bin of a bin string for the split shape information may be 0 when the non-square coding unit is not split and may be 1 when the non-square coding unit is split into two or three coding units. Accordingly, a probability that the first bin of the bin string of the split shape mode information about the non-square coding unit is 0 may be ⅓, and a probability that the first bin of the bin string of the split shape mode information about the non-square coding unit is 1 may be ⅔. As described above, because the split shape mode information indicating that the non-square coding unit is not split may represent only a 1-bit bin string having a value of 0, the image decoding apparatus 100 may determine syntax about the split shape mode information by determining whether a second bin is 0 or 1 only when the first bin of the split shape mode information is 1. According to an embodiment, when the first bin for the split shape mode information is 1, the image decoding apparatus 100 may decode a bin by determining that probabilities that the second bin is 0 and 1 are the same.

According to an embodiment, the image decoding apparatus 100 may use various probabilities for each bin while determining a bin of a bin string for split shape mode information. According to an embodiment, the image decoding apparatus 100 may differently determine probabilities of bins for split shape mode information according to a direction of a non-square block. According to an embodiment, the image decoding apparatus 100 may differently determine the probabilities of the bins for the split shape mode information according to an area or a length of a long side of a current coding unit. According to an embodiment, the image decoding apparatus 100 may differently determine the probabilities of the bins for the split shape mode information according to at least one of a shape and the length of the long side of the current coding unit.

According to an embodiment, the image decoding apparatus 100 may determine that the probabilities of the bins for the split shape mode information are the same with respect to coding units having a predetermined size or more. For example, the image decoding apparatus 100 may determine that the probabilities of the bins for the split shape mode information are the same with respect to coding units having a size equal to or greater than 64 samples based on a length of a long side of each coding unit.

According to an embodiment, the image decoding apparatus 100 may determine an initial probability of bins constituting a bin string of the split shape mode information based on a slice type (e.g., an I-slice, a P-slice, a B-slice, or the like).

Figure 20:
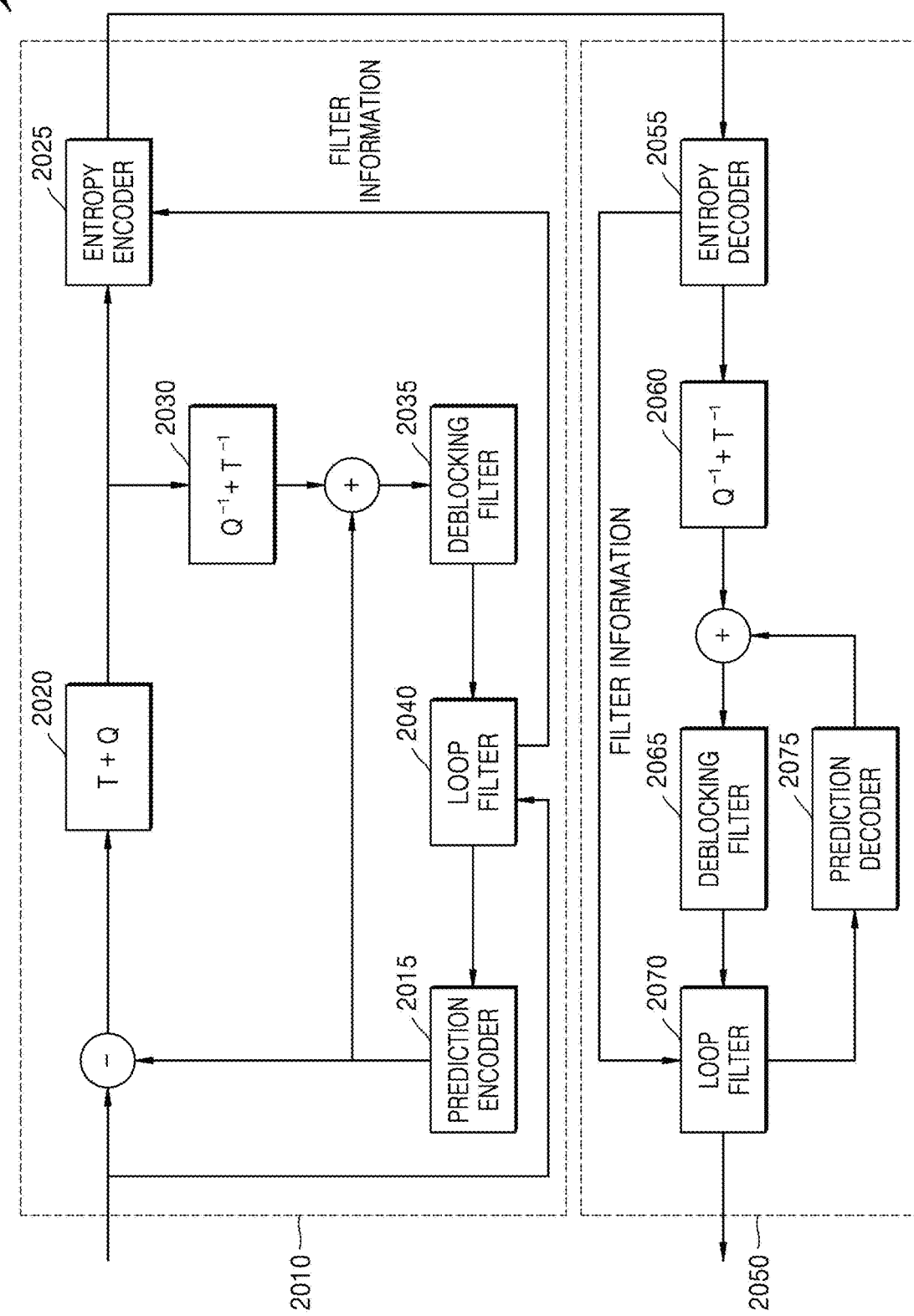
FIG. 20 is a block diagram of an image encoding and decoding system for performing loop filtering.

FIG. 20 is a block diagram of an image encoding and decoding system 2000 for performing loop filtering.

An encoding end 2010 of the image encoding and decoding system 2000 transmits an encoded bitstream of an image, and a decoding end 2050 receives and decodes the bitstream and outputs a reconstruction image. The encoding end 2010 may have a configuration similar to that of the image encoding apparatus 200 which will be described below, and the decoding end 2050 may have a configuration similar to that of the image decoding apparatus 100.

In the encoding end 2010, a prediction encoder 2015 outputs a reference image through inter prediction and intra prediction, and a transformer and quantizer 2020 quantizes residual data between the reference image and a current input image into a quantized transform coefficient and outputs the quantized transform coefficient. An entropy encoder 2025 encodes and transforms the quantized transform coefficient into a bitstream and outputs the bitstream. The quantized transform coefficient is reconstructed as data in a spatial domain by a de-quantizer and inverse converter 2030, and the reconstructed data in the spatial domain is output as a reconstruction image through a deblocking filter 2035 and a loop filter 2040. The reconstruction image may be used as a reference image of a next input image through the prediction encoder 2015.

Encoded image data from among the bitstream received by the decoding end 2050 is reconstructed as residual data in a spatial domain through an entropy decoder 2055 and a de-quantizer and inverse converter 2060. Image data in a spatial domain is formed as the residual data and a reference image output from a prediction decoder 2075 are combined, and a deblocking filter 2065 and a loop filter 2070 may filter the image data in the spatial domain and may output a reconstruction image for a current original image. The reconstruction image may be used as a reference image for a next original image by the prediction decoder 2075.

The loop filter 2040 of the encoding end 2010 performs loop filtering by using filter information input according to a user input or a system setting. The filter information used by the loop filter 2040 is output to the entropy encoder 2025, and is transmitted along with the encoded image data to the decoding end 2050. The loop filter 2070 of the decoding end 2050 may perform loop filtering based on the filter information input from the decoding end 2050.

The above various embodiments are for describing an operation related to an image decoding method performed by the image decoding apparatus 100. An operation of the image encoding apparatus 200 for performing an image encoding method corresponding to a reverse order process of the image decoding method will be described with reference to various embodiments.

Figure 2:
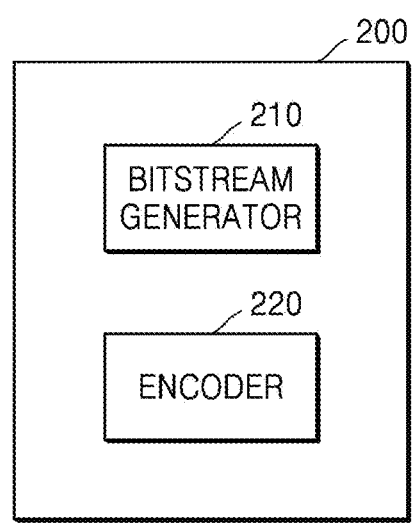
FIG. 2 is a block diagram of an image encoding apparatus according to an embodiment.

FIG. 2 is a block diagram of the image encoding apparatus 200 for encoding an image based on at least one of block shape information and split shape mode information, according to an embodiment.

The image encoding apparatus 200 may include an encoder 220 and a bitstream generator 210. The encoder 220 may receive an input image and may encode the input image. The encoder 220 may encode the input image and may obtain at least one syntax element. The syntax element may include at least one from among a skip flag, prediction mode, motion vector difference, motion vector prediction method (or index), transform quantized coefficient, coded block pattern, coded block flag, intra prediction mode, direct flag, merge flag, delta QP, reference index, prediction direction, and transform index. The encoder 220 may determine a context model based on block shape information including at least one from among a shape, a direction, a ratio between a width and a height, and a size of a coding unit.

The bitstream generator 210 may generate a bitstream based on the encoded input image. For example, the bitstream generator 210 may generate the bitstream by entropy encoding the syntax element based on the context model. Also, the image encoding apparatus 200 may transmit the bitstream to the image decoding apparatus 100.

According to an embodiment, the encoder 220 of the image encoding apparatus 200 may determine a shape of a coding unit. For example, the coding unit may have a square shape or a non-square shape, and information indicating the shape may be included in the block shape information.

According to an embodiment, the encoder 220 may determine which shape the coding unit is to be split into. The encoder 220 may determine a shape of at least one coding unit included in the coding unit, and the bitstream generator 210 may generate the bitstream including split shape mode information including the information about the shape of the coding unit.

According to an embodiment, the encoder 220 may determine whether the coding unit is split or not split. When the encoder 220 determines that only one coding unit is included in the coding unit or the coding unit is not split, the bitstream generator 210 may generate the bitstream including the split shape mode information indicating that the coding unit is not split. Also, the encoder 220 may split the coding unit into a plurality of coding units, and the bitstream generator 210 may generate the bitstream including the split shape mode information indicating that the coding unit is split into the plurality of coding units.

According to an embodiment, information indicating the number of coding units into which the coding unit is to be split or a direction in which the coding unit is to be split may be included in the split shape mode information. For example, the split shape mode information may indicate that the coding unit is split in at least one of a vertical direction and a horizontal direction or is not split.

The image encoding apparatus 200 determines the split shape mode information based on a split shape mode of the coding unit. The image encoding apparatus 200 determines the context model based on at least one of the shape, the direction, the ratio between the width and the height, and the size of the coding unit. The image encoding apparatus 200 generates the split shape mode information for splitting the coding unit based on the context model as the bitstream.

In order to determine the context model, the image encoding apparatus 200 may obtain an arrangement for corresponding at least one of the shape, the direction, the ratio between the width and the height, and the size of the coding unit to an index for the context model. The image encoding apparatus 200 may obtain the index for the context model based on at least one of the shape, the direction, the ratio between the width and the height, and the size of the coding unit in the arrangement. The image encoding apparatus 200 may determine the context model based on the index for the context model.

In order to determine the context model, the image encoding apparatus 200 may determine the context model further based on block shape information including at least one of a shape, a direction, a ratio between a width and a height, and a size of a neighboring coding unit adjacent to the coding unit. Also, the neighboring coding unit may include at least one from among coding units located at a left lower side, a left side, a left upper side, an upper side, a right upper side, a right side, or a right lower side of the coding unit.

Also, in order to determine the context model, the image encoding apparatus 200 may compare a length of a width of an upper neighboring coding unit with a length of the width of the coding unit. Also, the image encoding apparatus 200 may compare a length of a height of left and right neighboring coding units with a length of the height of the coding unit. Also, the image encoding apparatus 200 may determine the context model based on comparison results.

An operation of the image encoding apparatus 200 is similar to an operation of the image decoding apparatus 100 described with reference to FIGS. 3 through 20, and thus a detailed explanation thereof is not provided here.

An image decoding apparatus 2100 and an image encoding apparatus 3300 according to an embodiment will be described with reference to FIGS. 21 through 34.

Figure 21:
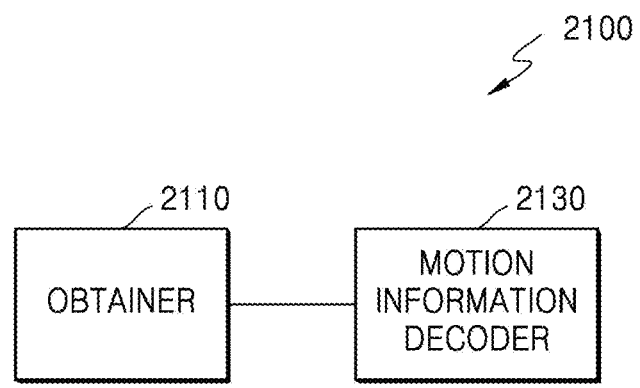
FIG. 21 is a block diagram of an image decoding apparatus according to an embodiment.

FIG. 21 is a block diagram of the image decoding apparatus 2100 according to an embodiment.

Referring to FIG. 21, the image decoding apparatus 2100 according to an embodiment may include an obtainer 2110 and a motion information decoder 2130.

The image decoding apparatus 2100 may obtain a bitstream generated as a result of encoding an image, and may decode motion information for inter prediction based on information included in the bitstream.

The image decoding apparatus 2100 according to an embodiment may include a central processor (not shown) for controlling the obtainer 2110 and the motion information decoder 2130. Alternatively, the obtainer 2110 and the motion information decoder 2130 may be operated by their own processors (not shown), and the image decoding apparatus 2100 may operate as the processors (not shown) organically operate. Alternatively, the obtainer 2110 and the motion information decoder 2130 may be controlled by an external processor (not shown) of the image decoding apparatus 2100.

The image decoding apparatus 2100 may include one or more data storages (not shown) in which input/output data of the obtainer 2110 and the motion information decoder 2130 are stored. The image decoding apparatus 2100 may include a memory controller (not shown) for controlling data input/output to/from the data storages (not shown).

In order to reconstruct an image through image decoding, the image decoding apparatus 2100 may perform an image decoding operation including prediction in association with an internal video decoding processor or an external video decoding processor. The internal video decoding processor of the image decoding apparatus 2100 according to an embodiment may perform a basic image decoding operation as a separate processor, or a central processing unit or a graphics processing unit may include an image decoding processing module and may perform a basic image decoding operation.

The image decoding apparatus 2100 may be included in the image decoding apparatus 100. For example, the obtainer 2110 may be included in the bitstream obtainer 110 of the image decoding apparatus 100 of FIG. 1, and the motion information decoder 2130 may be included in the decoder 120 of the image decoding apparatus 100.

The obtainer 2110 receives a bitstream generated as a result of encoding an image. The bitstream may include information for determining a motion vector used for inter prediction of a current block. The current block that is a block generated by being split according to a tree structure from an image may correspond to, for example, a largest coding unit, a coding unit, or a transform unit.

The obtainer 2110 may determine the current block based on block shape information and/or split shape mode information included in at least one of a sequence parameter set, a picture parameter set, a video parameter set, a slice header, and a slice segment header. Furthermore, the obtainer 2110 may obtain a syntax element corresponding to the block shape information or the split shape mode information from the bitstream for each largest coding unit, reference coding unit, or processing block and may use the syntax element to determine the current block.

The bitstream may include information indicating a prediction mode of the current block, and the prediction mode of the current block may include at least one of an intra mode, an inter mode, a merge mode, a skip mode, and a preset mode according to the present disclosure. The preset mode may be a mode for determining at least one primary differential motion vector candidate from among primary differential motion vector candidates classified according to a disparity distance and a disparity direction as a primary differential motion vector of the current block. The primary differential motion vector will be described in detail.

In an embodiment, the bitstream may include at least one from among information indicating whether the preset mode is applied to the current block, information indicating a base motion vector of the current block, information indicating the primary differential motion vector of the current block, information indicating a priority of disparity distances for classifying primary differential motion vector candidates, and information indicating a priority of disparity directions for classifying primary differential motion vector candidates. The obtainer 2110 may obtain the information included in the bitstream at a level corresponding to at least one of a coding unit, a transform unit, a largest coding unit, a slice unit, and a picture unit.

The motion information decoder 2130 determines a motion vector of the current block based on the information included in the bitstream.

The motion information decoder 2130 may check whether the preset mode is applied to the current block based on the information included in the bitstream. The information indicating whether the preset mode is applied may include a flag or an index.

The motion information decoder 2130 may obtain the information indicating whether the preset mode is applied from the bitstream of a unit level corresponding to the current block and may decode the current block according to the preset mode, or may obtain the information indicating whether the preset mode is applied from the bitstream of a unit level corresponding to an upper level block, a slice, or a picture and may decode blocks included in the upper level block, the slice, or the picture according to the preset mode.

In an example, the motion information decoder 2130 may determine whether the preset mode is applied to the current block based on information related to at least one of the current block, a previously decoded block, a current slice, a previously decoded slice, a current picture, and a previously decoded picture. In this case, the motion information decoder 2130 may determine whether the preset mode is applied by using the same criterion as that of the image encoding apparatus 3300.

When the preset mode is applied to the current block, the motion information decoder 2130 may determine primary differential motion vector candidates for each of one or more base motion vector candidates. The primary differential motion vector candidates may be classified according to a disparity distance and a disparity direction.

In an embodiment, the one or more base motion vector candidates of the current block may be determined based on a motion vector of a neighboring block that is spatially and temporally related to the current block. The neighboring block that is spatially and temporally related to the current block may include a block that is decoded earlier than the current block. The neighboring block spatially related to the current block may include, but is not limited to, a block located at a left side of the current block and a block located at an upper side of the current block.

Also, the neighboring block temporally related to the current block may include, for example, a block located at the same point as the current block from among blocks included in a reference picture different from the current picture including the current block and a block spatially adjacent to the block located at the same point.

In an embodiment, the motion information decoder 2130 may determine motion vectors of the neighboring block related to the current block as the one or more base motion vector candidates. Alternatively, the motion information decoder 2130 may determine the one or more base motion vector candidates by changing the motion vectors of the neighboring block related to the current block. Alternatively, the motion information decoder 2130 may determine the one or more base motion vector candidates by combining the motion vectors of the neighboring block related to the current block according to a predetermined equation.

In an embodiment, the motion information decoder 2130 may determine the one or more base motion vector candidates in the same manner as a method of determining a candidate list of a motion vector predictor in an adaptive motion vector prediction (AMVP) mode or a merge mode of HEVC.

In an embodiment, the motion information decoder 2130 may determine a zero motion vector having 0 as a component as the one or more base motion vector candidates.

When the one or more base motion vector candidates are determined, the motion information decoder 2130 may determine the base motion vector of the current block based on the information included in the bitstream. Information indicating the base motion vector of the current block may include an index, and the index indicating the base motion vector of the current block may be obtained from the bitstream corresponding to at least one of a transform unit level, a coding unit level, a largest coding unit level, a slice level, and a picture level.

In an embodiment, the information indicating the base motion vector of the current block may be encoded by using an FLC method, a unary coding method, or a truncated unary coding method and may be included in the bitstream.

In an embodiment, the motion information decoder 2130 may determine the base motion vector of the current block from among the one or more base motion vector candidates, based on the information related to at least one of the current block, the previously decoded block, the current slice, the previously decoded slice, the current picture, and the previously decoded picture. In this case, the motion information decoder 2130 may determine the base motion vector by using the same criterion as that of the image encoding apparatus 3300.

When the base motion vector of the current block is determined, the motion information decoder 2130 may determine a primary differential motion vector of the current block from among the one or more primary differential motion vector candidates.

The primary differential motion vector candidates of the current block may be classified according to a disparity distance and a disparity direction, and the obtainer 2110 may obtain information indicating at least one of the disparity distance and the disparity direction from the bitstream and the motion information decoder 2130 may determine the primary differential motion vector corresponding to the information indicating at least one of the disparity distance and the disparity direction.

At least one from among the information indicating the disparity distance for specifying the primary differential motion vector of the current block and the information indicating the disparity direction may be obtained from the bitstream of a transform unit level, a coding unit level, a largest coding unit level, a slice level, or a picture level.

The information indicating the disparity distance and the disparity direction, for specifying the primary differential motion vector of the current block, may be encoded by using an FLC method, a unary coding method, or a truncated unary coding method and may be included in the bitstream. The obtainer 2110 may decode the information indicating the disparity direction, e.g., at least one of indexes indicating the disparity direction, by using a context model from the bitstream.

In an embodiment, the motion information decoder 2130 may determine the primary differential motion vector of the current block from among the one or more primary differential motion vector candidates, based on the information related to at least one of the current block, the previously decoded block, the current slice, the previously decoded slice, the current picture, and the previously decoded picture. In this case, the motion information decoder 2130 may determine the primary differential motion vector by using the same criterion as that of the image encoding apparatus 3300.

When the primary differential motion vector of the current block is determined, the motion information decoder 2130 may determine the motion vector of the current block by applying the primary differential motion vector to the base motion vector of the current block. In an example, the motion information decoder 2130 may determine the motion vector of the current block by adding the primary differential motion vector to the base motion vector of the current block.

When information indicating a secondary differential motion vector is included in the bitstream, the motion information decoder 2130 may determine the secondary differential motion vector of the current block based on the information indicating the secondary differential motion vector. The information indicating the secondary differential motion vector may be encoded by using a method different from a method of encoding the information indicating the primary differential motion vector (e.g., an FLC method, a unary coding method, or a truncated coding method) and may be included in the bitstream. For example, the information indicating the secondary differential motion vector may be encoded by using an exponential Golomb coding method and may be included in the bitstream. The obtainer 2110 may obtain the information indicating the secondary differential motion vector from the bitstream of a transform unit level, a coding unit level, a largest coding unit level, a slice level, or a picture level.

The motion information decoder 2130 may determine the motion vector of the current block by applying the secondary differential motion vector to the base motion vector changed by applying the primary differential motion vector. In an example, the motion information decoder 2130 may determine the motion vector of the current block by adding the secondary differential motion vector to the base motion vector changed by applying the primary differential motion vector.

In an embodiment, when a prediction direction of the current block is a bi-direction, the secondary differential motion vector may be included in the bitstream for only one uni-direction. For example, the information indicating the secondary differential motion vector may be included in the bitstream for only one uni-direction from among a list 0 direction and a list 1 direction.

When the secondary differential motion vector is included in the bitstream for only the list 0 direction, the motion information decoder 2130 may determine the motion vector of the list 0 direction of the current block by applying the secondary differential motion vector for the list 0 direction to the base motion vector of the list 0 direction changed by applying the primary differential motion vector for the list 0 direction. The motion information decoder 2130 may determine the motion vector of the list 1 direction of the current block by applying the primary differential motion vector for the list 1 direction to the base motion vector of the list 1 direction, or may determine the motion vector of the list 1 direction of the current block by applying the secondary differential motion vector for the list 0 direction to a result obtained after applying the primary differential motion vector for the list 1 direction to the base motion vector of the list 1 direction.

When the preset mode according to the present disclosure and the AMVP mode of HEVC are compared with each other, in the AMVP mode, a decoding apparatus determines a prediction motion vector and a differential motion vector and then determines a motion vector of a block by combining the prediction motion vector with the differential motion vector. The base motion vector in the preset mode according to the present disclosure performs a function similar to that of the prediction motion vector, and the primary differential motion vector performs a function similar to that of the differential motion vector of the AMVP mode. However, there is a difference in that the primary differential motion vector in the preset mode according to the present disclosure is classified according to the disparity distance and the disparity direction and is encoded by using at least one of an FLC method, a unary coding method, and a truncated unary coding method, and the differential motion vector of the AMVP mode is encoded by using an exponential Golomb coding method. In addition, the preset mode according to the present disclosure encodes/decodes the secondary differential motion vector, thereby improving the accuracy of a motion vector of a block.

A method of determining primary differential motion vector candidates corresponding to one base motion vector candidate will be described with reference to FIGS. 22 through 25.

FIGS. 22 through 25 each illustrate primary differential motion vector candidates displayed in a coordinate plane.

Referring to FIGS. 22 through 25, the motion information decoder 2130 may determine candidates located according to a predetermined shape, to determine primary differential motion vector candidates. The predetermined shape may be a polygonal shape such as a diamond shape or a quadrangular shape, or a shape similar to a circular shape.

The motion information decoder 2130 may determine candidates at a certain disparity distance from a preset point (e.g., a point (0, 0)) as the primary differential motion vector candidates. The motion information decoder 2130 may determine primary differential motion vector candidates at a first disparity distance from a preset point as a first candidate group, may determine primary differential motion vector candidates at a second disparity distance from the preset point as a second candidate group, and may determine primary differential motion vector candidates at an n1 disparity distance from the preset point as an nti candidate group. The motion information decoder 2130 may determine primary differential motion vector candidates closet to the preset point as a first candidate group and may determine primary differential motion vector candidates second closest to the preset point as a second candidate group. That is, as a disparity distance increases, the number (or index) of a candidate group may sequentially increase.

As the number of the candidate group increases, the disparity distance may increase at logarithmic scale intervals or nonlinear intervals. Also, as the number of the candidate group increases, the disparity distance may increase at N intervals (N is an integer) (e.g., N, 2N, 3N, . . . ). Also, as the candidate group increases, the disparity distance may increase so that a difference between the disparity distance and a previous disparity distance is constant.

The disparity distance may be determined according to a user's definition. Alternatively, the motion information decoder 2130 may directly determine the disparity distance based on information related to a current block, a temporal layer, or a group of pictures (GOP), or may obtain information indicating the disparity distance for determining the primary differential motion vector candidates through a bitstream.

The motion information decoder 2130 may determine the disparity distance for determining the primary differential motion vector candidate of the current block according to the disparity distance determined at a level higher than a level corresponding to the current block.

The number of primary differential motion vector candidates may be independently determined for each candidate group. The motion information decoder 2130 may determine the number of primary differential motion vector candidates for each candidate group of the current block according to number information determined at a level higher than a level corresponding to the current block.

Figure 22:
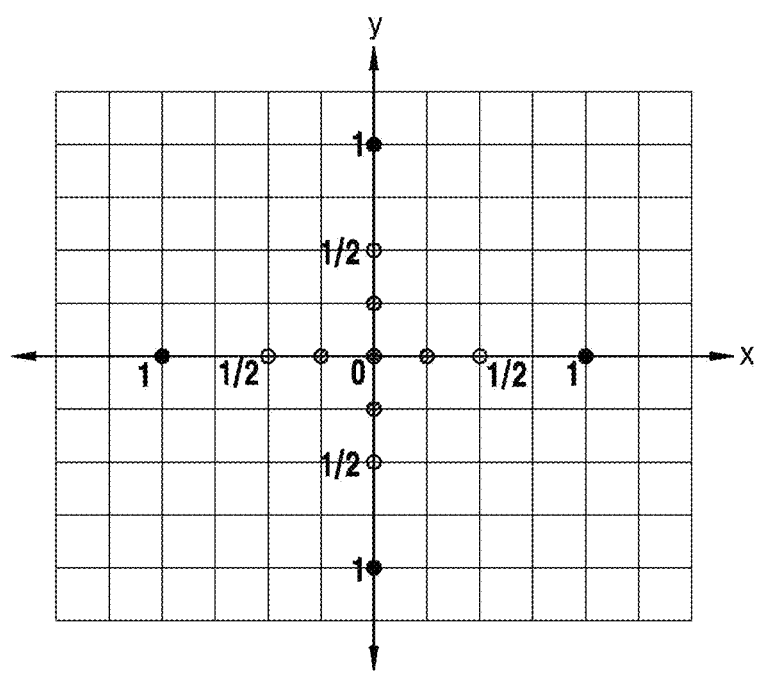
FIGS. 22 through 25 each illustrate primary differential motion vector candidates displayed in a coordinate plane.
Figure 23:
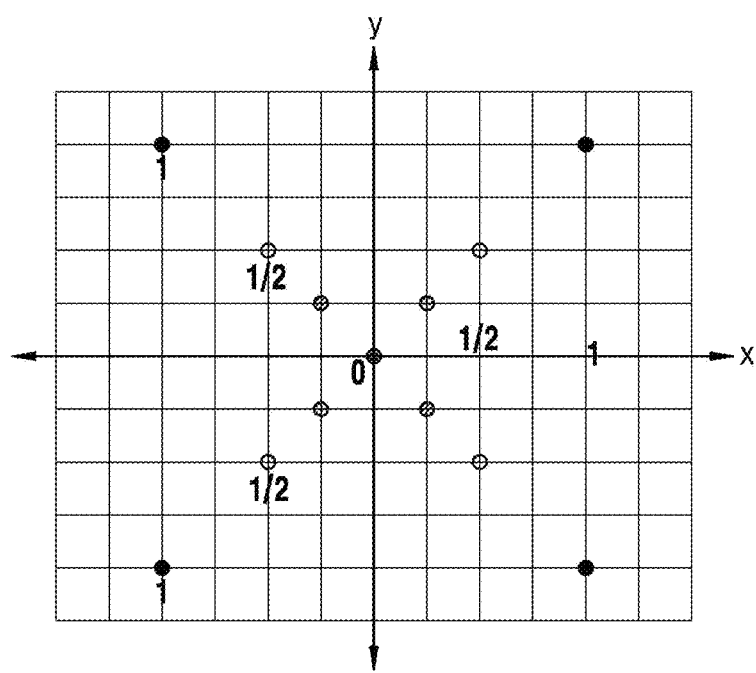

FIGS. 22 and 23 illustrate a case where the number of primary differential motion vector candidates in each candidate group is 4. Also, although the number of candidates groups is 3 in FIGS. 22 and 23, the number of candidate groups is not limited to 3.

Referring to FIG. 22, the motion information decoder 2130 may determine primary differential motion vector candidates having a diamond distribution based on a preset point. Although an interval between pixels corresponds to a ¼ pixel distance, a component value of the following vector candidates is scaled 4 times and is displayed for convenience of explanation. The ¼ pixel distance may correspond to a disparity distance of 1.

The motion information decoder 2130 may determine primary differential motion vector candidates (1, 0), (−1, 0), (0, 1), and (0, −1) at a distance of ¼ pixel from the preset point as a first candidate group.

The motion information decoder 2130 may determine primary differential motion vector candidates (2, 0), (−2, 0), (0, 2), and (0, −2) at a distance of ½ pixel from the preset point as a second candidate group.

The motion information decoder 2130 may determine primary differential motion vector candidates (4, 0), (−4, 0), (0, 4), and (0, −4) at a distance of 1 pixel from the preset point as a third candidate group.

Referring to FIG. 23, the motion information decoder 2130 may determine primary differential motion vector candidates having a quadrangular distribution based on the preset point.

The motion information decoder 2130 may determine primary differential motion vector candidates (1, 1), (1, −1), (−1, 1), and (−1, −1) at a distance of about ¼ pixel based on the preset point as a first candidate group.

The motion information decoder 2130 may determine primary differential motion vector candidates (2, 2), (2, −2), (−2, 2), and (−2, −2) at a distance of about ½ based on the preset point as a second candidate group.

The motion information decoder 2130 may determine primary differential motion vectors (4, 4), (4, −4), (−4, 4), and (−4, −4) at a distance of about 1 pixel based on the preset point as a third candidate group.

Figure 24:
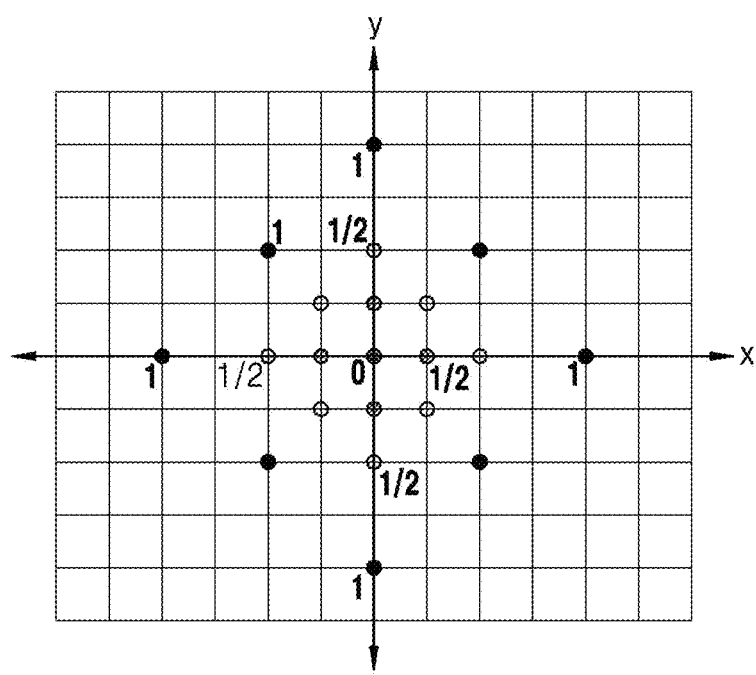

Referring to FIG. 24, the motion information decoder 2130 may determine the number of primary differential motion vector candidates included in at least one candidate group from among multiple candidate groups to be different from that of the other candidate groups.

In detail, the motion information decoder 2130 may determine eight primary differential motion vector candidates (1, 0), (−1, 0), (0, 1), (0, −1), (1, 1), (1, −1), (−1, 1), and (−1, −1) at a distance of about ¼ pixel from the preset point as a first candidate group.

Also, the motion information decoder 2130 may determine eight primary differential motion vector candidates (2, 0), (−2, 0), (0, 2), (0, −2), (2, 2), (2, −2), (−2, 2), and (−2, −2) at a distance of about ½ pixel from the preset point as a second candidate group.

The motion information decoder 2130 may determine four primary differential motion vector candidates (4, 0), (−4, 0), (0, 4), and (0, −4) at a distance of about 1 pixel from the preset point as a third candidate group.

Figure 25:
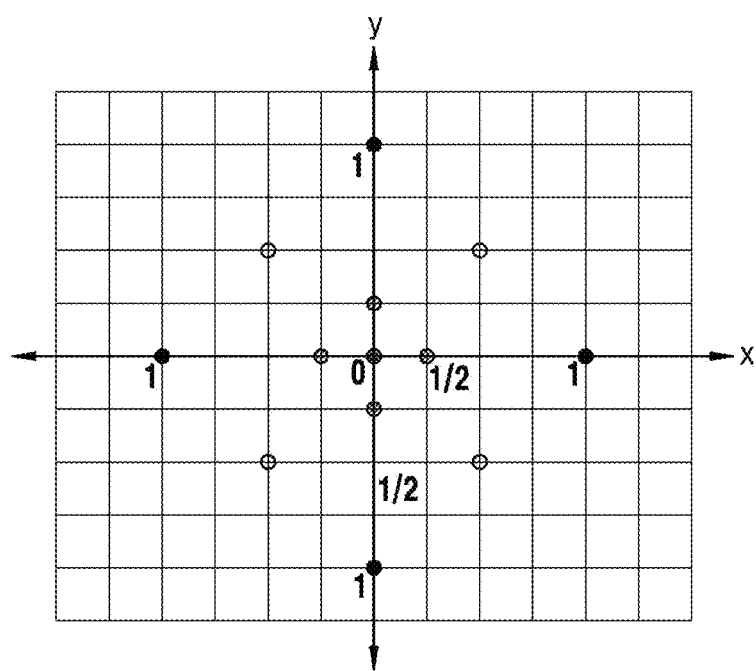

Referring to FIG. 25, the motion information decoder 2130 may variously determine distribution shapes of primary differential motion vector candidates according to candidate groups. In an example, the motion information decoder 2130 may determine the primary differential motion vector candidates (1, 0), (−1, 0), (0, 1), and (0, −1) having a diamond distribution based on the preset point as a first candidate group.

Also, the motion information decoder 2130 may determine the primary differential motion vector candidates (2, 2), (−2, 2), (2, −2), and (−2, −2) having a quadrangular distribution based on the preset point as a second candidate group.

Also, the motion information decoder 2130 may determine the primary differential motion vector candidates (4, 0), (−4, 0), (0, 4), and (0, −4) having a diamond distribution based on the preset point as a third candidate group. A distribution shape of primary differential motion vector candidates included in each candidate group is not limited to that shown in FIG. 25, and may be any of various other distribution shapes.

Figure 26:
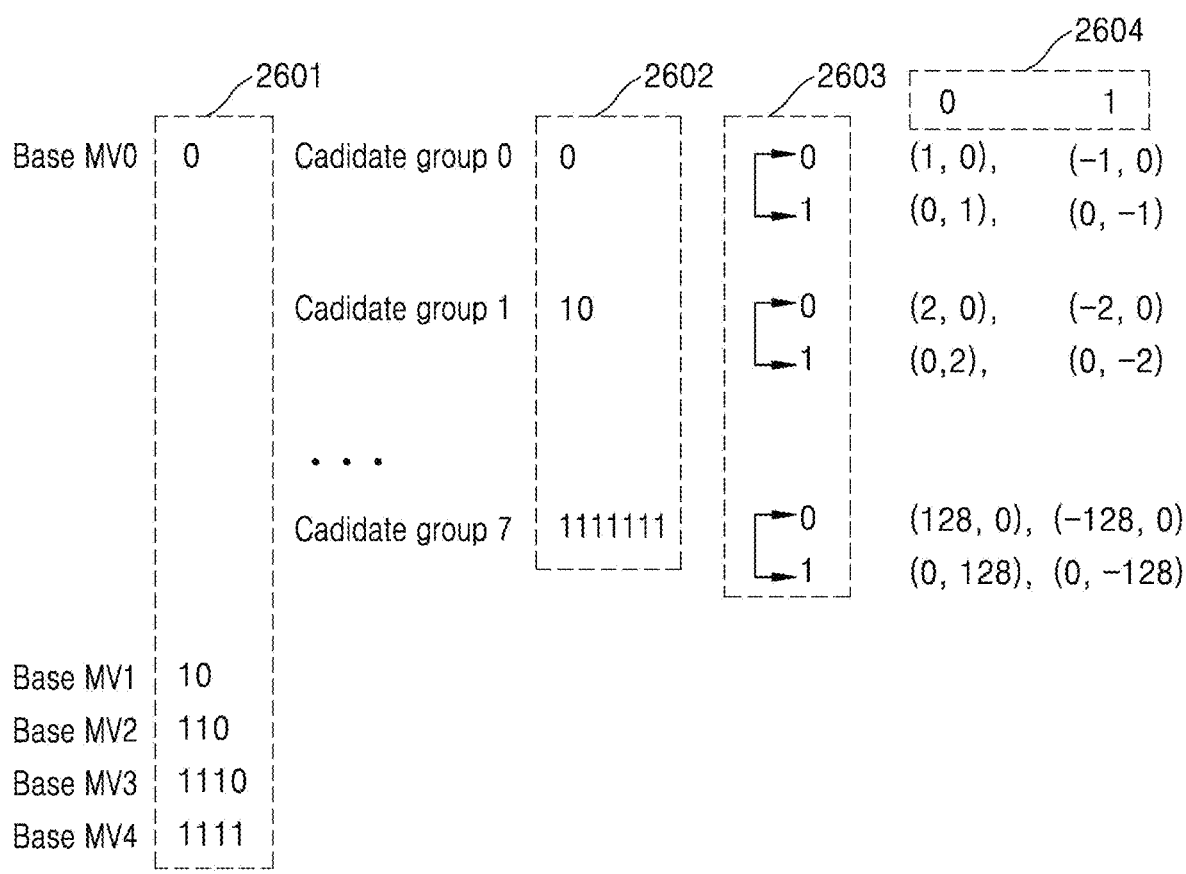
FIG. 26 is a diagram for describing an index indicating primary differential motion vector candidates, according to an embodiment.

FIG. 26 is a diagram for describing an index indicating primary differential motion vector candidates, according to an embodiment.

As shown in FIG. 26, reference numeral 2601 may denote a bit representation corresponding to an index indicating a base motion vector candidate, reference numeral 2602 may denote a bit representation corresponding to an index indicating a disparity distance (or a candidate group) of a primary differential motion vector candidate, and reference numerals 2603 and 2604 may denote a bit representation corresponding to an index indicating a disparity direction of the primary differential motion vector candidate.

In order to determine a base motion vector of a current block based on an index indicating the base motion vector included in a bitstream, the motion information decoder 2130 may assign an index to each of one or more base motion vector candidates. Also, the motion information decoder 2130 may assign an index to each of primary differential motion vector candidates to determine a primary differential motion vector of the current block based on an index indicating the primary differential motion vector included in the bitstream.

Referring to FIG. 26, an index of 0 may be assigned to a base motion vector candidate 0, and an index of 10 may be assigned to a base motion vector candidate 1. An index indicating each of the base motion vector candidates may be represented by using a unary coding method or a truncated unary coding method according to a predetermined order.

The number of bits representing an index may increase from the base motion vector candidate 0 to a base motion vector candidate 4, and a priority between base motion vector candidates for assigning an index may be set by using the same criterion as that of the image encoding apparatus 3300.

In an embodiment, information indicating the priority between the base motion vector candidates for assigning an index may be included in the bitstream, and in this case, the motion information decoder 2130 may assign an index to each of the base motion vector candidates according to the information indicating the priority obtained from the bitstream. The information indicating the priority between the base motion vector candidates obtained from the bitstream may include information about a changed priority number in comparison with the priority between the base motion vector candidates determined in a previous block, a previous slice, or a previous picture. For example, when a priority number of the base motion vector candidate 0 is 1 in the previous block, the previous slice, or the previous picture, but is changed to 3 in relation to a current block, a current slice, or a current picture, information indicating that the priority number of the base motion vector candidate 0 is changed to 3 may be included in the bitstream. Alternatively, information indicating that a priority between the base motion vector candidates determined in the previous block, the previous slice, or the previous picture and a priority between the base motion vector candidates in the current block, the current slice, or the current picture are compared with each other and there is no change therebetween may be included in the bitstream.

Primary differential motion vector candidates determined according to one base motion vector candidate may be grouped into a candidate group according to a predetermined criterion. The predetermined criterion may be how much disparity distance the primary differential motion vector candidates are spaced apart from the preset point. An index of each candidate group may be represented by using a unary coding method or a truncated unary coding method. According to an embodiment, an index of each candidate group may be represented by using an FLC method.

Referring to FIG. 26, the number of bits for representing an index of a candidate group may increase from a candidate group 0 corresponding to a disparity distance of 1 to a candidate group 7 corresponding to a disparity distance of 8, and a priority between candidate groups for assigning an index may be set by using the same criterion as that of the image encoding apparatus 3300.

In an embodiment, information indicating the priority between the candidate groups for assigning an index may be included in the bitstream, and in this case, the motion information decoder 2130 may assign an index to each of the candidate groups according to the information indicating the priority obtained from the bitstream. The information indicating the priority between the candidate groups obtained from the bitstream may include information about a changed priority number in comparison with a priority between the candidate groups determined in a previous block, a previous slice, or a previous picture. For example, when a priority number of the candidate group 0 is 1 in the previous block, the previous slice, or the previous picture, but is changed to 3 in relation to a current block, a current slice, or a current picture, information indicating that the priority number of the candidate group 0 is changed to 3 may be included in the bitstream. Alternatively, information indicating that a priority between the candidate groups determined in the previous block, the previous slice, or the previous picture and a priority between the candidate groups in the current block, the current slice, or the current picture are compared with each other and there is no change therebetween may be included in the bitstream.

The candidate group 0 of FIG. 26 may include candidates spaced apart by a disparity distance of 1 from a preset point, and in an embodiment, the candidate group 0 may include a candidate spaced apart by a distance of 0 from the preset point. Because the candidate spaced apart from the distance of 0 from the preset point is the preset point itself, when the preset point corresponds to (0, 0) as described with reference to FIGS. 22 through 25, a primary differential motion vector candidate becomes (0, 0). In this case, when information indicating a candidate group for specifying a primary differential motion vector of a current block indicates the candidate group 0, without needing to obtain information indicating a disparity direction, unless there is a secondary differential motion vector, a base motion vector of the current block may be determined as a motion vector of the current block. In other words, when one base motion vector is determined for the current block and information indicating a candidate group indicates the candidate group 0, the base motion vector is a motion vector of the current block, and thus a merge mode or a skip mode of conventional HEVC may be replaced.

An index (or a flag) indicating a disparity direction may be assigned to primary differential motion vector candidates included in one candidate group. In this case, the index indicating the disparity direction may be represented by using an FLC method. For example, when four primary differential motion vector candidates are included in one candidate group, two bits may be required to indicate each of the four primary differential motion vector candidates.

The motion information decoder 2130 may classify primary differential motion vector candidates included in one candidate group into groups according to locations in a coordinate plane, and may assign an index or a flag corresponding to each of the classified groups.

Referring to FIG. 26, according to whether primary differential motion vector candidates (1, 0), (−1, 0), (0, 1), and (0, −1) corresponding to the candidate group 0 of the base motion vector candidate 0 are located along an x-axis or a y-axis, an index (or a flag) of 0 or 1 may be assigned as shown in the bit representation 2603, and according to whether the primary differential motion vector candidates (1, 0), (−1, 0), (0, 1), and (0, −1) are located in a + direction or a − direction, an index (or a flag) of 0 or 1 may be assigned as shown in the bit representation 2604.

As described above, the obtainer 2110 may decode at least one of indexes indicating a disparity direction of a primary differential motion vector from the bitstream by using a context model. For example, the obtainer 2110 may divide four primary differential motion vector candidates included in one candidate group into two groups including two candidates located along the x-axis and two candidates located along the y-axis, and may decode, according to a context model, an index (2603) indicating whether a candidate is located along the x-axis or the y-axis. When it is determined that the candidate is located along the x-axis or the y-axis, the obtainer 2110 may decode, according to a context model, an index (2604) indicating whether the candidate is located in the + direction or the − direction.

In an embodiment, the motion information decoder 2130 may cause only a candidate located at a preset point in a coordinate plane to be included in each candidate group. For example, the motion information decoder 2130 may cause only candidates located along the x-axis or the y-axis to be included in each candidate group, based on information about at least one of a previous picture, a current picture, a previous slice, a current slice, a previous block, and a current block. For example, from among candidates (1, 0), (−1, 0), (0, 1), and (0, −1) included in the candidate group 0 of FIG. 26, only the candidates (1, 0) and (−1, 0) may be included in the candidate group 0, and only an index corresponding to the bit representation 2604 for indicating a disparity direction may be assigned as an index indicating a disparity direction to each candidate.

A method of determining a primary differential motion vector candidate when a base motion vector candidate is a bi-directional motion vector will be described.

Figure 27:
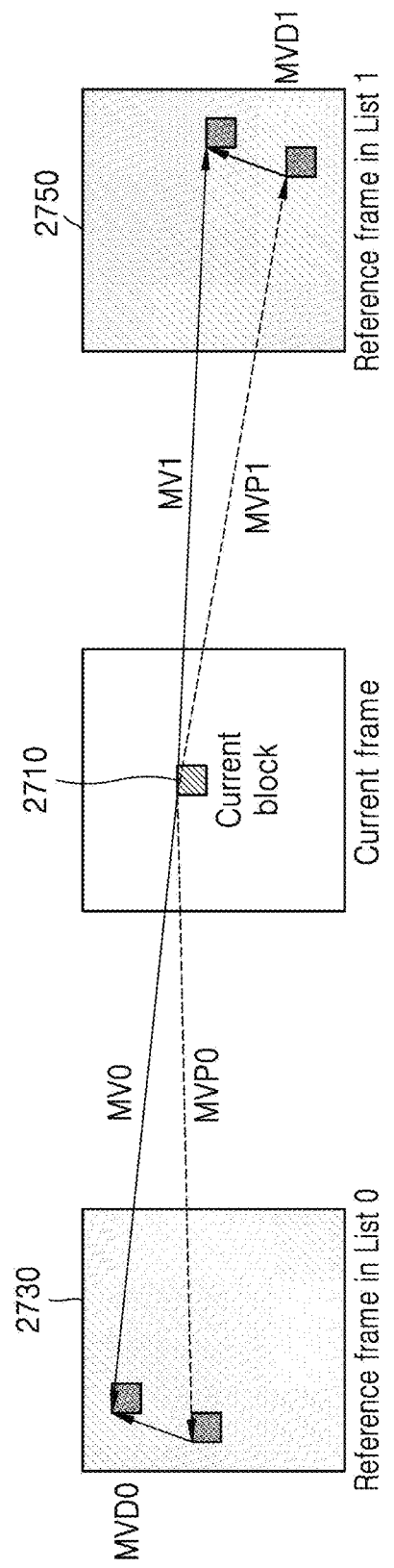
FIG. 27 is a diagram for describing motion information used for bi-directional prediction of a block.

First, FIG. 27 for describing motion information used for bi-directional prediction of a block illustrates a case where a block is bi-directionally predicted in an AMVP mode of HEVC.

A block 2710 may be uni-directionally predicted by using a reference picture 2750 included in a list 1 or a reference picture 2730 included in a list 0, or may be bi-directionally predicted by using two reference pictures 2730 and 2750 included in the list 0 and the list 1.

Referring to FIG. 27, when a prediction direction of the block 2710 is a uni-direction of a list 0 direction, a motion vector MV0 of the list 0 direction of the block 2710 is determined based on a prediction motion vector MVP0 corresponding to the list 0 direction and a differential motion vector MVD0 for the list 0 direction. When a prediction direction of the block 2710 is a uni-direction of a list 1 direction, a motion vector MV1 of the list 1 direction of the block 2710 is determined based on a prediction motion vector MVP1 corresponding to the list 1 direction and a differential motion vector MVD1 for the list 1 direction.

When a prediction direction of the block 2710 is a bi-direction including the list 0 direction and the list 1 direction, the motion vector MV0 of the list 0 direction of the block 2710 is determined based on the prediction motion vector MVP0 corresponding to the list 0 direction and the differential motion vector MVD0 for the list 0 direction, and the motion vector MV1 of the list 1 direction of the block 2710 is determined based on the prediction motion vector MVP1 corresponding to the list 1 direction and the differential motion vector MVD1 for the list 1 direction.

That is, when a block is bi-directionally predicted, it may mean that a motion vector of the block includes a motion vector of the list 0 direction and a motion vector of the list 1 direction, and may mean that a differential motion vector of the block includes a differential motion vector for the list 0 direction and a differential motion vector for the list 1 direction.

In an embodiment of the present disclosure, when one base motion vector candidate corresponds to a bi-directional motion vector, the base motion vector candidate includes a base motion vector candidate of the list 0 direction and a base motion vector candidate of the list 1 direction, and a method of determining a primary differential motion vector candidate for the list 0 direction and a primary differential motion vector candidate for the list 1 direction will be described.

Figure 28:
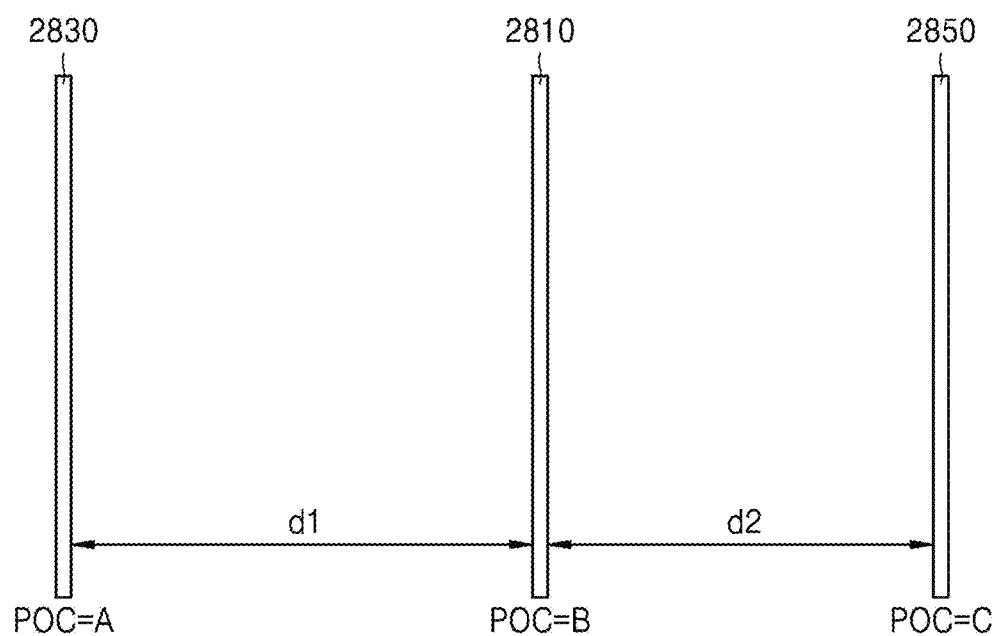
FIG. 28 is a diagram illustrating a positional relationship between a current picture and two reference pictures.

FIG. 28 illustrates, when a base motion vector candidate corresponds to a bi-directional motion vector, a positional relationship among a first reference picture 2830 indicated by a base motion vector candidate of a first uni-direction, a second reference picture 2850 indicated by a base motion vector candidate of a second uni-direction, and a current picture 2810 including a current block. In FIG. 28, it is assumed that a distance between the current picture 2810 and the first reference picture 2830 is d1, and a distance between the current picture 2810 and the second reference picture 2850 is d2. A distance between pictures may refer to a picture order counter (POC) value difference between the pictures. Also, the first uni-direction refers to a list 0 direction or a list 1 direction, and the second uni-direction refers to a direction different from the first uni-direction.

Referring to FIG. 28, the current picture 2810 has a POC B, and the first reference picture 2830 and the second reference picture 2850 respectively have a POC A and a POC C. Primary differential motion vector candidates when the POC B has a value between the POC A and the POC C are illustrated in FIG. 29.

Although primary differential motion vector candidates of FIG. 26 include a differential candidate for a list 0 or a differential candidate for a list 1 according to a direction of a base motion vector candidate, when a base motion vector candidate is bi-directional, each primary differential motion vector candidate may include a differential candidate for the list 0 and a differential candidate for the list 1.

When the POC B has a value between the POC A and the POC C, each of primary differential motion vector candidates classified according to a disparity distance and a disparity direction may include a primary differential motion vector candidate for the first uni-direction having a value of a size corresponding to the disparity distance and a primary differential motion vector candidate for the second uni-direction having a value of the opposite sign and a size corresponding to the disparity distance.

For example, in FIG. 29, a primary differential motion vector candidate specified by an index 00 indicating a disparity direction from among primary differential motion vector candidates included in a candidate group 0 may include (1, 0) having a value of a size corresponding to a disparity distance as a component and (−1, 0) having a value of the opposite sign as a component. (1, 0) may correspond to a primary differential motion vector candidate for the first uni-direction, and (−1, 0) may correspond to a primary differential motion vector candidate for the second uni-direction. When the index 00 indicating the disparity direction is obtained from a bitstream, the motion information decoder 2130 may determine (1, 0) as the primary differential motion vector for the first uni-direction of the current block, and may determine (−1, 0) as the primary differential motion vector for the second uni-direction of the current block.

In an embodiment, a value of a primary differential motion vector candidate for one uni-direction may be scaled according to a distance between d1 and d2. For example, when a primary differential motion vector candidate for the first uni-direction in the case where d1 is 1 is (1, 0), a primary differential motion vector candidate for the second uni-direction in the case where d2 is 2 may be determined to be (−2, 0).

In other words, a primary differential motion vector candidate for the first uni-direction is (x, y), a primary differential motion vector candidate for the second uni-direction may be determined to be ((d2/d1)*(−x), (d2/d1)*(−y)). In an example, d2/d1 may be calculated as an integer (int) type, or according to an embodiment, may be calculated as a double type or a float type. Alternatively, according to an embodiment, d2/d1 may be converted through a bit shift operator (<<, >>), may be rounded, and then may be calculated by applying again a bit shift operator.

Figure 30:
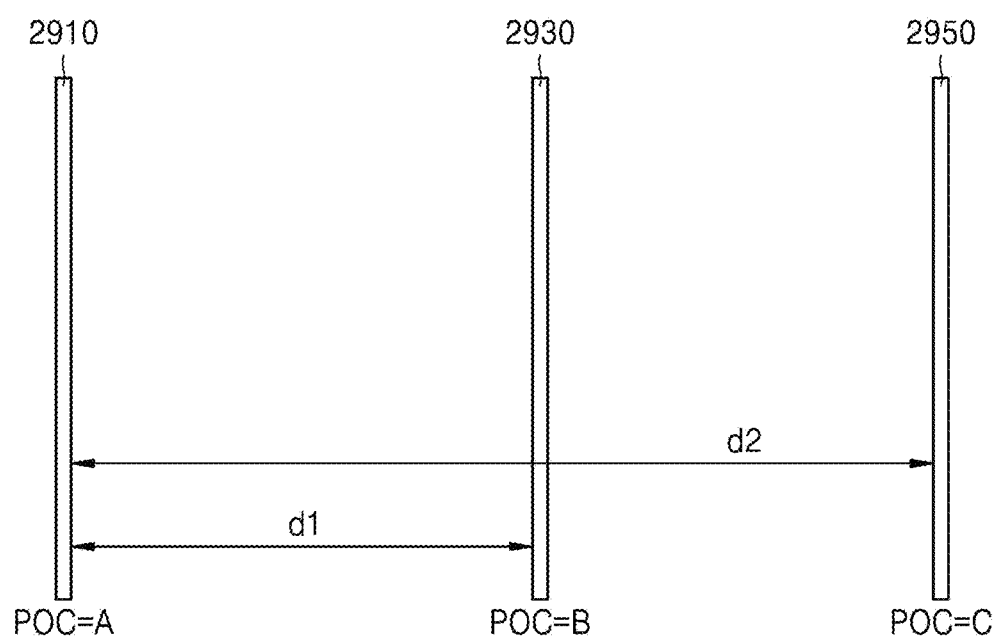
FIG. 30 is a diagram illustrating a positional relationship between a current picture and two reference pictures.

FIG. 30 illustrates, when a base motion vector candidate corresponds to a bi-directional motion vector, a positional relationship among a first reference picture 2930 indicated by a base motion vector candidate of a first uni-direction, a second reference picture 2950 indicated by a base motion vector candidate of a second uni-direction, and a current picture 2910 including a current block. In FIG. 30, it is assumed that a distance between the current picture 2910 and the first reference picture 2930 is d1, and a distance between the current picture 2910 and the second reference picture 2950 is d2.

Referring to FIG. 30, the current picture 2910 has a POC A, and the first reference picture 2930 and the second reference picture 2950 respectively have a POC B and a POC C. Primary differential motion vector candidates when the POC A is less than the POC B and the POC C are illustrated in FIG. 31. Primary differential motion vector candidates when the POC A is greater than the POC B and the POC C may be the same as those in FIG. 31.

Each of primary differential motion vector candidates classified according to a disparity distance and a disparity direction may include a differential candidate for the first uni-direction and a differential candidate for the second uni-direction.

When the POC A is greater or less than the POC B and the POC C, each of primary differential motion vector candidates classified according to a disparity distance and a disparity direction may include a primary differential motion vector candidate for the first uni-direction having a value of a size corresponding to the disparity distance and a primary differential motion vector candidate for the second uni-direction having a value of the same sign and a size corresponding to the disparity distance.

For example, referring to FIG. 31, a primary differential motion vector candidate specified by an index 00 indicating a disparity direction from among primary differential motion vector candidates included in a candidate group 0 may include (1, 0) having a value of a size corresponding to the disparity distance as a component and (1, 0) having a value of the same sign and the size as (1, 0) as a component.

Here, a value of a primary differential motion vector candidate for one uni-direction may be scaled according to a distance between d1 and d2. For example, when a primary differential motion vector candidate for the first uni-direction in the case where d1 is 1 is (1, 0), a primary differential motion vector candidate for the second uni-direction in the case where d2 is 2 may be determined to be (2, 0).

In other words, when a primary differential motion vector candidate for the first uni-direction is (x, y), a primary differential motion vector candidate for the second uni-direction may be determined to be ((d2/d1)*(x), (d2/d1)*(y)). In an example, d2/d1 may be calculated as an integer (int) type, or according to an embodiment, may be calculated as a double type or a float type. Alternatively, according to an embodiment, d2/d1 may be converted through a bit shift operator (<, >), may be rounded, and then may be calculated by applying again a bit shift operator.

A method of determining a motion vector of a current block in consideration of a prediction direction of the current block and a direction of a base motion vector will be described.

When a prediction direction of a current block and a direction of a base motion vector of the current block are the same, the motion information decoder 2130 may determine a motion vector of the current block by applying a primary differential motion vector to the base motion vector of the current block.

In an embodiment, the obtainer 2110 may extract information indicating a usage direction of the base motion vector, e.g., an index, from a bitstream. The information indicating the usage direction of the base motion vector may correspond to the prediction direction of the current block. In an example, when the usage direction of the base motion vector is a list 0 direction, the current block may be subjected to uni-directional prediction of the list 0 direction, and when the usage direction of the base motion vector is a list 1 direction, the current block may be subjected to uni-directional prediction of the list 1 direction. Also, when the usage direction of the base motion vector is a bi-direction, the current block may be subjected to bi-directional prediction.

For example, when the base motion vector is bi-directional, a bit value 0 may indicate that the usage direction of the base motion vector is the bi-direction, a bit value 10 may indicate that the usage direction of the base motion vector is the list 0 direction, and a bit value 11 may indicate that the usage direction of the base motion vector is the list 1 direction.

Also, for example, when the base motion vector is in a first uni-direction of the list 0 direction or the list 1 direction, the bit value 0 may indicate that the usage direction of the base motion vector is the first uni-direction, the bit value 10 may indicate that the usage direction of the base motion vector is a second uni-direction different from the first uni-direction, and the bit value 11 may indicate that the usage direction of the base motion vector is the bi-direction.

The usage direction of the base motion vector corresponding to the bit value may also be changed.

When a Base Motion Vector is Bi-Directional and a Usage Direction of the Base Motion Vector is a Bi-Direction The motion information decoder 2130 may determine a motion vector of a list 0 direction of a current block by applying a primary differential motion vector for the list 0 direction to a base motion vector of the list 0 direction. The motion information decoder 2130 may determine the motion vector of a list 1 direction of the current block by applying the primary differential motion vector for the list 1 direction to the base motion vector of the list 1 direction.

When the base motion vector is bi-directional, a usage direction of the base motion vector is a bi-direction, and only information indicating the primary differential motion vector for the list 0 direction is included in a bitstream, the motion information decoder 2130 may determine the primary differential motion vector for the list 1 direction based on the primary differential motion vector for the list 0 direction.

The motion information decoder 2130 may determine the primary differential motion vector for the list 1 direction, in consideration of a positional relationship among a reference picture corresponding to the base motion vector of the list 0 direction, a current picture including the current block, and a reference picture corresponding to the base motion vector of the list 1 direction.

In an example, when the current picture is located between the reference picture of the list 0 direction and the reference picture of the list 1 direction, the motion information decoder 2130 may determine the primary differential motion vector for the list 1 direction by changing the sign of a value of the primary differential motion vector for the list 0 direction to the opposite and scaling the value of the primary differential motion vector for the list 0 direction according to a ratio between d1 (a distance between the current picture and the reference picture of the list 0 direction) and d2 (a distance between the current picture and the reference picture of the list 1 direction). For example, when the primary differential motion vector for the list 0 direction is (1, 1), d1 is 1, and d2 is 2, the primary differential motion vector for the list 1 direction may be determined to be (−2, −2).

In another example, when the current picture is located before or after the reference picture of the list 0 direction and the reference picture of the list 1 direction, the motion information decoder 2130 may determine the primary differential motion vector for the list 1 direction by maintaining the sign of the value of the primary differential motion vector for the list 0 direction and scaling the value of the primary differential motion vector for the list 0 direction according to a ratio between d1 and d2. For example, when the primary differential motion vector for the list 0 direction is (1, 1), d1 is 1, and d2 is 2, the primary differential motion vector for the list 1 direction may be determined to be (2, 2).

When a Base Motion Vector is Bi-Directional and a Usage Direction of the Base Motion Vector is a Uni-Direction When a base motion vector is bi-directional, and a usage direction of the base motion vector is a list 0 direction or a list 1 direction, the motion information decoder 2130 may determine a motion vector of a current block of the list 0 direction or the list 1 direction by applying a primary differential motion vector for the list 0 direction or a primary differential motion vector for the list 1 direction to the base motion vector of the list 1 direction or the base motion vector of the list 0 direction.

When the usage direction of the base motion vector is a first uni-direction but only information indicating the primary differential motion vector for a second uni-direction is included in a bitstream, the motion information decoder 2130 may determine the primary differential motion vector for the first uni-direction from the primary differential motion vector for the second uni-direction in consideration of a positional relationship and a distance among a current picture, a reference picture of the list 0 direction, and a reference picture of the list 1 direction as described above.

When a Base Motion Vector is Uni-Directional and a Usage Direction of the Base Motion Vector is a Uni-Direction When a base motion vector is in a first uni-direction of a list 0 direction or a list 1 direction, a usage direction of the base motion vector is a second uni-direction different from the first uni-direction, and only information indicating a primary differential motion vector for the first uni-direction is included in a bitstream, the motion information decoder 2130 may determine the base motion vector of the second uni-direction based on the base motion vector of the first uni-direction, and may determine the primary differential motion vector for the second uni-direction based on the primary differential motion vector for the first uni-direction.

First, the motion information decoder 2130 may determine a first reference picture and a second reference picture located in a direction opposite to the first reference picture based on a current picture, in consideration of d1 (a distance between the current picture and the first reference picture indicated by the base motion vector of the first uni-direction).

In an example, the second reference picture spaced apart by the same distance as d1 may be determined. In this case, because d1 and d2 (a distance between the current picture and the second reference picture) are the same and the current picture is located between the first reference picture and the second reference picture, the motion information decoder 2130 may generate the base motion vector of the second uni-direction by changing the sign of the base motion vector of the first uni-direction to the opposite, and may generate the primary differential motion vector for the second uni-direction by changing the sign of the primary differential motion vector for the first uni-direction to the opposite.

When there is no picture spaced apart by the same distance as d1, a picture located in a direction opposite to the first reference picture based on the current picture while being located closest to the current picture may be determined as the second reference picture. In this case, although the current picture is located between the first reference picture and the second reference picture, d1 and d2 are different from each other. The motion information decoder 2130 may generate the base motion vector of the second uni-direction by changing the sign of the base motion vector of the first uni-direction to the opposite and scaling the base motion vector of the first uni-direction according to a ratio between d1 and d2. Also, the motion information decoder 2130 may determine the primary differential motion vector for the second uni-direction by changing the sign of the primary differential motion vector for the first uni-direction to the opposite and scaling the primary differential motion vector for the first uni-direction according to a ratio between d1 and d2.

When the current picture corresponds to a last picture of a GOP, the motion information decoder 2130 may determine one picture located in the same direction as the first reference picture about the current picture as the second reference picture. A picture closest to the first reference picture or the current picture may be determined as the second reference picture. In this case, because the current picture is located after the first reference picture and the second reference picture, the motion information decoder 2130 may generate the base motion vector of the second uni-direction by scaling a value of the base motion vector of the first uni-direction (without changing the sign) according to a ratio between d1 and d2. Also, the motion information decoder 2130 may generate the primary differential motion vector for the second uni-direction by scaling a value of the primary differential motion vector for the first uni-direction (without changing the sign) according to a ratio between d1 and d2.

In an example, when the current picture corresponds to a last picture of a GOP and the first reference picture itself is determined as the second reference picture, the motion information decoder 2130 may determine the base motion vector of the first uni-direction as the base motion vector of the second uni-direction and may determine the primary differential motion vector for the first uni-direction as the primary differential motion vector for the second uni-direction.

When the primary differential motion vector and the base motion vector for the second uni-direction are generated, the motion information decoder 2130 may determine a motion vector of the second uni-direction of the block by applying the primary differential motion vector for the second uni-direction to the base motion vector of the second uni-direction.

When a Base Motion Vector is Uni-Directional and a Usage Direction of the Base Motion Vector is a Bi-Direction When a base motion vector is in a first uni-direction of a list 0 direction or a list 1 direction, a usage direction of the base motion vector is a bi-direction, and only information indicating a primary differential motion vector for the first uni-direction is included in a bitstream, the motion information decoder 2130 may generate the base motion vector of a second uni-direction based on the base motion vector of the first uni-direction, and may generate the primary differential motion vector for the second uni-direction based on the primary differential motion vector for the first uni-direction.

First, the motion information decoder 2130 may determine a first reference picture and a second reference picture located in a direction opposite to the first reference picture based on a current picture, in consideration of d1 (a distance between the current picture and the first reference picture indicated by the base motion vector of the first uni-direction).

In an example, the second reference picture spaced apart by the same distance as d1 may be determined. In this case, because d1 and d2 (a distance between the current picture and the second reference picture) are the same and the current picture is located between the first reference picture and the second reference picture, the motion information decoder 2130 may generate the base motion vector of the second uni-direction by changing the sign of the base motion vector of the first uni-direction to the opposite, and may generate the primary differential motion vector for the second uni-direction by changing the sign of the primary differential motion vector for the first uni-direction to the opposite.

When there is no picture spaced apart by the same distance as d1, a picture located in a direction opposite to the first reference picture based on the current picture while being closest to the current picture may be determined as the second reference picture. In this case, although the current picture is located between the first reference picture and the second reference picture, d1 and d2 are different from each other. The motion information decoder 2130 may generate the base motion vector of the second uni-direction by changing the sign of the base motion vector of the first uni-direction to the opposite and scaling the base motion vector of the first uni-direction according to a ratio between d1 and d2. Also, the motion information decoder 2130 may determine the primary differential motion vector for the second uni-direction by changing the sign of the primary differential motion vector for the first uni-directional to the opposite and scaling the primary differential motion vector for the first uni-direction according to a ratio between d1 and d2.

When the current picture corresponds to a last picture of a GOP, the motion information decoder 2130 may determine a picture located in the same direction as the first reference picture about the current picture as the second reference picture. A picture closest to the first reference picture or the current picture may be determined as the second reference picture. In this case, because the current picture is located after the first reference picture and the second reference picture, the motion information decoder 2130 may generate the base motion vector of the second uni-direction by scaling a value of the base motion vector of the first uni-direction (without changing the sign) according to a ratio between d1 and d2. Also, the motion information decoder 2130 may generate the primary differential motion vector for the second uni-direction by scaling a value of the primary differential motion vector for the first uni-direction (without changing the sign) according to a ratio between d1 and d2.

In an example, when the current picture corresponds to a last picture of a GOP and the first reference picture itself is determined as the second reference picture, the motion information decoder 2130 may determine the base motion vector of the first uni-direction as the base motion vector of the second uni-direction and may determine the primary differential motion for the first uni-direction as the primary differential motion for the second uni-direction.

When the base motion vector and the primary differential motion vector for the second uni-direction are generated, the motion information decoder 2130 may determine a motion vector of the second uni-direction of the current block by applying the primary differential motion vector for the second uni-direction to the base motion vector of the second uni-direction, and may determine the motion vector of the first uni-direction of the current block by applying the primary differential motion vector for the first uni-direction to the base motion vector of the first uni-direction.

In an embodiment, the obtainer 2110 may obtain, from a bitstream, information indicating whether a current block is multi-pass coded and information about a coding mode applied to the current block when multi-pass coding is applied. The term 'multi-pass coding' may refer to a method of encoding a block in two different coding modes and then finally selecting a coding mode with higher efficiency to encode a block.

When it is checked that the current block is multi-pass coded, the obtainer 2110 may obtain information, e.g., a flag, indicating a coding mode, in which the current block is encoded, from among the two coding modes.

When it is checked that the current block to which multi-pass coding is applied is encoded in a preset mode according to the present disclosure, the motion information decoder 2130 may decode motion information of the current block based on information indicating a base motion vector of the current block and information indicating a primary differential motion vector. When it is checked that the current block that is multi-pass coded is encoded in a mode other than the preset mode, e.g., a merge mode, a skip mode, or an AMVP mode, the motion information decoder 2130 may decode the motion information according to the checked mode.

The current block according to the present disclosure may correspond to a first child block split from a parent block. When information indicating that the parent block is split is included in the bitstream, the motion information decoder 2130 may split the parent block into the first child block corresponding to the current block and a second child block. Alternatively, the motion information decoder 2130 may split the parent block into the first child block corresponding to the current block and the second child block in consideration of at least one of a size, a horizontal length, and a vertical length of the parent block. For example, when the horizontal length of the parent block is greater than the vertical length, the motion information decoder 2130 may determine two child blocks by halving the horizontal length of the parent block, and when the vertical length of the parent block is greater than the horizontal length, the motion information decoder 2130 may determine two child blocks by halving the vertical length of the parent block. The parent block may refer to a basic block for prediction such as a prediction unit of HEVC. According to an embodiment, the motion information decoder 2130 may split the parent block into the first child block corresponding to the current block, the second child block, and a third child block, that is, three child blocks.

Also, shapes of the child blocks may include not only a square shape or a rectangular shape but also a triangular shape or a trapezoidal shape.

When the preset mode according to the present disclosure is applied to the first child block, the motion information decoder 2130 may determine a motion vector of the first child block according to the above-described methods.

In order to determine a motion vector of the second child block, like for the first child block, the motion information decoder 2130 may determine a base motion vector of the second child block and a primary differential motion vector of the second child block based on the information indicating the base motion vector and the information indicating the primary differential motion vector obtained from the bitstream, and may determine the motion vector of the second child block by adding the base motion vector to the primary differential motion vector. In this case, base motion vector candidates and primary differential motion vector candidates determined for the parent block may also be used for the first child block and the second child block. In other words, the base motion vector candidates and the primary differential motion vector candidates may be determined at a parent block level, and the motion vector of the first child block may be determined based on the information indicating the base motion vector and the information indicating the primary differential motion vector of the first child block, and the motion vector of the second child block may be determined based on the information indicating the base motion vector and the information indicating the primary differential motion vector of the second child block.

As another example, the motion vector determined for the first child block may be determined as the base motion vector of the second child block, and only information indicating the primary differential motion vector of the second child block may be obtained from the bitstream to determine the primary differential motion vector of the second child block. The motion information decoder 2130 may determine the motion vector of the second child block by adding the base motion vector of the second child block to the primary differential motion vector of the second child block.

As another example, at least one from among the information indicating the base motion vector, information indicating a disparity distance, and information indicating a disparity direction, obtained from the bitstream in relation to the first child block, may be shared with the second child block. In this case, the motion information decoder 2130 may determine the base motion vector and the primary differential motion vector of the second child block based on the information shared with the second child block from among the information indicating the base motion vector, the information indicating the disparity distance, and the information indicating the disparity direction which are obtained from the bitstream in relation to the first child block, and remaining information obtained from the bitstream in relation to the second child block.

Also, information indicating a secondary differential motion vector may be included in only the bitstream related to one block from among the first child block and the second child block. For example, when the secondary differential motion vector is determined in relation to the first child block, the motion information decoder 2130 may also apply the secondary differential motion vector of the first child block to the second child block.

In an embodiment, the first child block may be encoded in the preset mode according to the present disclosure, and the second child block may be encoded in a mode different from the preset mode applied to the first child block. In this case, the motion information decoder 2130 may decode the first child block and the second child block according to the modes respectively applied to the first child block and the second child block.

When the motion vectors of the first child block and the second child block are determined, a first prediction block corresponding to the first child block and a second prediction block corresponding to the second child block may be determined through inter prediction. Smoothing filtering may be performed on a boundary between the first prediction block and the second prediction block, a residual block may be added to a final prediction block generated as a filtering result, and the parent block may be finally reconstructed. For the smoothing filtering, an N-tap filter may be used or an overlapped block motion compensation (OBMC) method may be used. A weight may be applied to an overlapped portion between the first prediction block and the second prediction block according to the OBMC method. Although a weight of a boundary region may be 0.5:0.5, a weight may increase as a region is farther away from a boundary.

Figure 32:
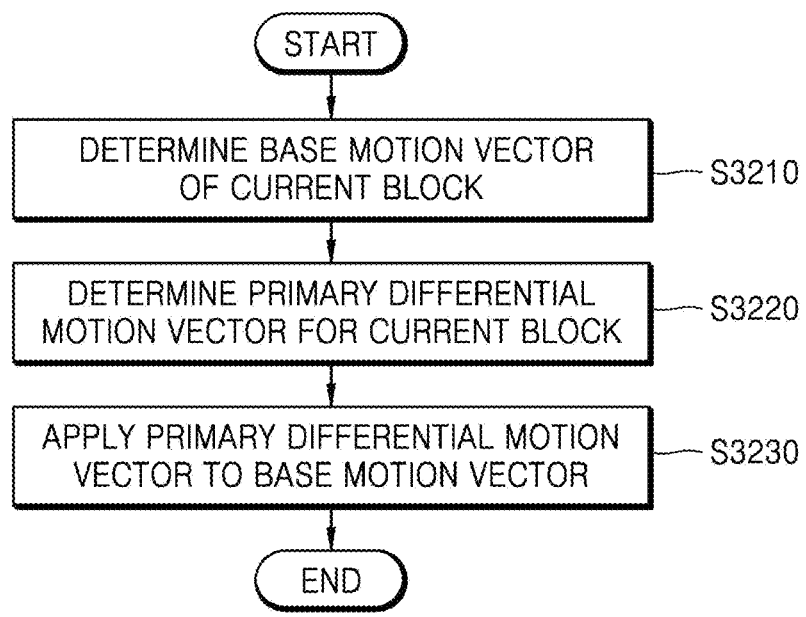
FIG. 32 is a flowchart for describing an image decoding method according to an embodiment.

FIG. 32 is a flowchart for describing an image decoding method according to an embodiment.

In operation S3210, the image decoding apparatus 2100 determines a base motion vector of a current block. The image decoding apparatus 2100 may determine one base motion vector candidate from among one or more base motion vector candidates as the base motion vector of the current block.

The image decoding apparatus 2100 may determine the base motion vector of the current block based on information indicating the base motion vector included in a bitstream. In an example, the image decoding apparatus 2100 may obtain the information indicating the base motion vector at a block level, a slice level, or a picture level.

In operation S3220, the image decoding apparatus 2100 determines a primary differential motion vector of the current block.

The image decoding apparatus 2100 may determine primary differential motion vector candidates for the one or more base motion vector candidates, and may obtain information indicating a disparity distance and a disparity direction of a primary differential motion vector from the bitstream and may determine the primary differential motion vector of the current block from among the primary differential motion vector candidates.

The image decoding apparatus 2100 may obtain at least one of the information indicating the disparity distance and the information indicating the disparity direction at a block level, a slice level, or a picture level.

In operation S3230, the image decoding apparatus 2100 may determine a motion vector of the current block by applying the primary differential motion vector to the base motion vector of the current block.

When information indicating a secondary differential motion vector is included in the bitstream, the image decoding apparatus 2100 may determine the motion vector of the current block by applying the secondary differential motion vector to the base motion vector changed by applying the primary differential motion vector.

Figure 33:
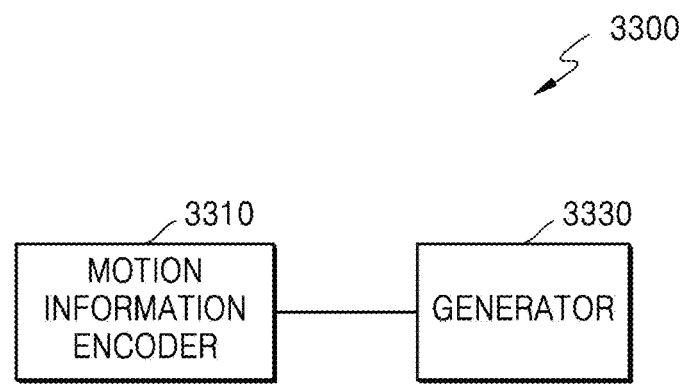
FIG. 33 is a block diagram of an image encoding apparatus according to an embodiment.

FIG. 33 is a block diagram of the image encoding apparatus 3300 according to an embodiment.

Referring to FIG. 33, the image encoding apparatus 3300 according to an embodiment of the present disclosure may include a motion information encoder 3310 and a generator 3330.

The image encoding apparatus 3300 may encode an image, and may generate a bitstream including information generated as an encoding result.

The image encoding apparatus 3300 according to an embodiment may include a central processor (not shown) for controlling the motion information encoder 3310 and the generator 3330. Alternatively, the motion information encoder 3310 and the generator 3330 may be operated by their own processors (not shown), and the image encoding apparatus 3300 may operate as the processors (not shown) organically operate. Alternatively, the motion information encoder 3310 and the generator 3330 may be controlled by an external processor (not shown).

The image encoding apparatus 3300 may include one or more data storages (not shown) in which input/output data of the motion information encoder 3310 and the generator 3330 are stored. The image encoding apparatus 3300 may include a memory controller (not shown) for controlling data input/output to/from the data storages (not shown).

In order to encode an image, the image encoding apparatus 3300 may perform an image encoding operation including prediction in association with an internal video encoding processor or an external video encoding processor. The internal video encoding processor of the image encoding apparatus 3300 according to an embodiment may perform a basic image encoding operation as a separate processor, or a central processing unit or a graphics processing unit may include an image encoding processing module and may perform a basic image encoding operation.

The image encoding apparatus 3300 may be included in the image encoding apparatus 200. For example, the generator 3330 may be included in the bitstream generator 210 of the image encoding apparatus 200 of FIG. 2, and the motion information encoder 3310 may be included in the encoder 220 of the image encoding apparatus 200.

The motion information encoder 3310 encodes a motion vector of a current block. The current block that is generated by being split according to a tree structure from an image may correspond to, for example, a largest coding unit, a coding unit, or a transform unit. The motion information encoder 3310 may determine a prediction mode to be applied to the current block. The prediction mode may include at least one from among, for example, an intra mode, an inter mode, a merge mode, a skip mode, and a preset mode according to the present disclosure.

The generator 3330 generates a bitstream including information generated as a result of encoding the motion vector. In an embodiment, the bitstream may include information indicating at least one from among whether the preset mode is applied to the current block, a base motion vector of the current block, a primary differential motion vector of the current block, a priority of disparity distances for classifying primary differential motion vector candidates, and a priority of disparity directions for classifying primary differential motion vector candidates. The generator 3330 may cause the information to be included in the bitstream corresponding to at least one of a coding unit level, a transform unit level, a largest unit level, a slice unit level, and a picture unit level.

The motion information encoder 3310 may determine whether the preset mode is applied to the current block.

The motion information encoder 3310 may determine whether the preset mode is applied to the current block, based on information related to at least one of the current block, a previously encoded block, a current slice, a previously encoded slice, a current picture, and a previously encoded picture.

In an example, the motion information encoder 3310 may determine whether the preset mode is applied to the current block, in consideration of statistical information about a prediction mode in a previous slice or a previous picture. The motion information encoder 3310 may determine that the preset mode is not applied to the current block based on the statistical information.

In an example, the motion information encoder 3310 may determine that the preset mode is applied to the current block based on a cost corresponding to each of various prediction modes applicable to the current block. A rate-distortion cost may be used during cost calculation.

When the preset mode is applied to the current block, the motion information encoder 3310 may determine one or more primary differential motion vector candidates for each of one or more base motion vector candidates. The one or more primary differential motion vector candidates may be classified according to a disparity distance and a disparity direction. A method of determining the primary differential motion vector candidates is the same as that made in relation to the image decoding apparatus 2100, and thus detailed descriptions thereof will not be provided here.

In an embodiment, the one or more base motion vector candidates of the current block may be determined based on a motion vector of a neighboring block that is spatially and temporally related to the current block. The neighboring block that is spatially and temporally related to the current block may include a block that is encoded earlier than the current block.

In an embodiment, the motion information encoder 3310 may determine motion vectors of the neighboring block related to the current block as the one or more base motion vector candidates. Alternatively, the motion information encoder 3310 may determine the one or more base motion vector candidates by changing the motion vectors of the neighboring block related to the current block. Alternatively, the motion information encoder 3310 may determine the one or more base motion vector candidates by combining the motion vectors of the neighboring block related to the current block according to a predetermined equation.

In an embodiment, the motion information encoder 3310 may determine the one or more base motion vector candidates in the same manner as a method of determining a candidate list of a motion vector predictor in an AMVP mode or a merge mode of HEVC.

In an embodiment, the motion information encoder 3310 may determine a zero motion vector having 0 as a component as the one or more base motion vector candidates.

When the one or more base motion vector candidates are determined, the motion information encoder 3310 may determine the base motion vector of the current block from among the one or more base motion vector candidates. The motion information encoder 3310 may determine the base motion vector of the current block, based on information related to at least one of the current block, the previously encoded block, the current slice, the previously encoded slice, the current picture, and the previously encoded picture.

In an example, the motion information encoder 3310 may determine the base motion vector of the current block, in consideration of statistical information in the previous slice or the previous picture. In another example, the motion information encoder 3310 may determine the base motion vector of the current block based on a cost between the one or more base motion vector candidates. A rate-distortion cost may be used during cost calculation.

In an embodiment, information indicating the base motion vector of the current block may be encoded by using an FLC method, a unary coding method, or a truncated unary coding method and may be included in the bitstream.

When the base motion vector of the current block is determined, the motion information encoder 3310 may determine the primary differential motion vector of the current block from among the one or more primary differential motion vector candidates.

The motion information encoder 3310 may determine the primary differential motion vector of the current block from among the one or more primary differential motion vector candidates, in consideration of a difference value between the motion vector of the current block and the base motion vector of the current block.

Information indicating a disparity distance and a disparity direction for specifying the primary differential motion vector of the current block may be encoded by using at least one of an FLC method, a unary coding method, and a truncated coding method and may be included in the bitstream. The generator 3330 may encode information indicating the disparity direction, e.g., at least one of indexes indicating the disparity direction, by using a context model and may cause the information to be included in the bitstream.

In an embodiment, the motion information encoder 3310 may determine the primary differential motion vector of the current block from among the one or more primary differential motion vector candidates, based on information related to at least one of the current block, the previously encoded block, the current slice, the previously encoded slice, the current picture, and the previously encoded picture.

When the primary differential motion vector of the current block is determined, the motion information encoder 3310 may apply the primary differential motion vector to the base motion vector of the current block to obtain a resultant value, and may determine a secondary differential motion vector by comparing the resultant value with the motion vector of the current block. For example, the secondary differential motion vector may correspond to a value obtained by subtracting a result obtained by adding the base motion vector of the current block to the primary differential motion vector from the motion vector of the current block.

When the secondary differential motion vector is determined, the generator 3330 may generate the bitstream including information indicating the secondary differential motion vector of the current block. The generator 3330 may encode the information indicating the secondary differential motion vector by using a method different from a method of encoding information indicating the primary differential motion vector (e.g., an FLC method, a unary coding method, or a truncated coding method) and may cause the information to be included in the bitstream. In an example, the information indicating the secondary differential motion vector may be encoded by using an exponential Golomb coding method and may be included in the bitstream. The generator 3330 may cause the information indicating the secondary differential motion vector to be included in the bitstream corresponding to a transform unit level, a coding unit level, a largest coding unit level, a slice level, or a picture level.

In an embodiment, when a prediction direction of the current block is a bi-direction, the generator 3330 may cause only the information indicating the secondary differential motion vector for one uni-direction, instead of the secondary differential motion vector for a bi-direction, to be included in the bitstream.

The generator 3330 may cause an index indicating the base motion vector of the current block and an index indicating the primary differential motion vector to be included in the bitstream, and to this end, the motion information encoder 3310 may assign indexes to the one or more base motion vector candidates and the one or more primary differential motion vector candidates.

Referring to FIG. 26, reference numeral 2601 may denote a bit representation corresponding to an index indicating a base motion vector candidate, reference numeral 2602 may denote a bit representation corresponding to an index indicating a disparity distance (or a candidate group) of a primary differential motion vector candidate, and reference numerals 2603 and 2604 may denote a bit representation corresponding to an index indicating a disparity direction of the primary differential motion vector candidate.

Referring to FIG. 26, an index of 0 may be assigned to a base motion vector candidate 0, and an index of 10 may be assigned to a base motion vector candidate 1. That is, an index indicating each of the base motion vector candidates may be represented by using a unary coding method or a truncated unary coding method according to a predetermined order.

The number of bits representing an index may increase from the base motion vector candidate 0 to a base motion vector candidate 4, and a priority between base motion vector candidates for assigning an index may be determined according to a preset criterion.

In an embodiment, the motion information encoder 3310 may determine the priority between the base motion vector candidates for the current block, in consideration of a ratio or the number of times a base motion vector candidate is selected as a base motion vector in a previous slice or a previous picture from among the base motion vector candidates. For example, when a base motion vector candidate 3 is most selected as a base motion vector of a block in the previous slice or the previous picture, the motion information encoder 3310 may assign an index of 0 to the base motion vector candidate 3.

In an embodiment, information indicating the priority between the base motion vector candidates for assigning an index may be included in the bitstream. The information indicating the priority between the base motion vector candidates may include information about a changed priority number in comparison with the priority between the base motion vector candidates determined in a previous block, a previous slice, or a previous picture.

Primary differential motion vector candidates determined to correspond to one base motion vector candidate may be grouped into a candidate group according to a predetermined criterion. The predetermined criterion may be how much disparity distance the primary differential motion vector candidates are spaced apart from the preset point. An index of each candidate group may be represented by using a unary coding method or a truncated unary coding method. According to an embodiment, an index of each candidate group may be represented by using an FLC method.

Referring to FIG. 26, the number of bits for representing an index of a candidate group may increase from a candidate group 0 corresponding to a disparity distance of 1 to a candidate group 7 corresponding to a disparity distance of 8, and a priority between candidate groups for assigning an index may be determined according to a preset criterion.

In an embodiment, the motion information encoder 3310 may determine the priority between the candidate groups for the current block, in consideration of a ratio or the number of times a primary differential motion vector candidate is selected to specify a primary differential motion vector in a previous slice or a previous picture from among the candidate groups. For example, when a primary differential motion vector candidate included in a candidate group 3 is most selected as a primary differential motion vector of a block in the previous slice or the previous picture, the motion information encoder 3310 may assign an index of 0 to the candidate group 3.

In an embodiment, information indicating the priority between the candidate groups for assigning an index may be included in the bitstream. The information indicating a priority between the candidate groups may include information about a changed priority number in comparison with the priority between the candidate groups determined in a previous block, a previous slice, or a previous picture.

The candidate group 0 of FIG. 26 may include candidates spaced apart by a disparity distance of 1 from the preset point. However, in an embodiment, a candidate group 0 may include a candidate spaced apart by a disparity distance of 0 from the preset point. Because the candidate spaced apart from the disparity distance of 0 from the preset point is the preset point itself, when the base motion vector candidate corresponds to (0, 0) as described with reference to FIGS. 22 through 25, a primary differential motion vector candidate becomes (0, 0). In this case, when information indicating a candidate group for specifying a primary differential motion vector indicates the candidate group 0, unless there is a secondary differential motion vector, the base motion vector of the current block may be determined as the motion vector of the current block. In other words, when the base motion vector of the current block is the same as the motion vector of the current block, the motion information encoder 3310 may select the candidate group 0 and may cause information indicating the candidate group 0 to be included in the bitstream. When the candidate group 0 is selected, the base motion vector is the motion vector of the current block, and thus a merge mode or a skip mode of conventional HEVC may be replaced.

An index (or a flag) indicating a disparity direction may be assigned to primary differential motion vector candidates included in one candidate group. In this case, the index indicating the disparity direction may be represented by using an FLC method. For example, when four primary differential motion vector candidates are included in one candidate group, two bits may be required to indicate each of the four primary differential motion vector candidates.

The motion information encoder 3310 may classify primary differential motion vector candidates included in one candidate group into groups according to locations in a coordinate plane, and may assign an index corresponding to each of the classified groups.

Referring to FIG. 26, according to whether primary differential motion vector candidates (1, 0), (−1, 0), (0, 1), and (0, −1) corresponding to the candidate group 0 of the base motion vector candidate 0 are located along an x-axis or a y-axis, an index (or a flag) of 0 or 1 may be assigned as shown in the bit representation 2603, and according to whether the primary differential motion vector candidates (1, 0), (−1, 0), (0, 1), and (0, −1) are located in a + direction or a − direction, an index (or a flag) of 0 or 1 may be assigned as shown in the bit representation 2604.

As described above, the generator 3330 may encode at least one of indexes indicating a disparity direction of a primary differential motion vector by using a context model. For example, the generator 3330 may divide four primary differential motion vector candidates included in one candidate group into two groups including two candidates located along the x-axis and two candidates located along the y-axis, and may encode, according to a context model, an index (2603) indicating whether a candidate is located along the x-axis or the y-axis. When it is determined that the candidate is located along the x-axis or the y-axis, the generator 3330 may encode, according to a context model, an index (2604) indicating whether the candidate is located in the + direction or the − direction.

In an embodiment, the motion information encoder 3310 may cause only a candidate located at a preset point in a coordinate plane to be included in each candidate group. For example, the motion information encoder 3310 may cause only candidates located along the x-axis or the y-axis to be included in each candidate group, based on information about at least one of a previous picture, a current picture, a previous slice, a current slice, a previous block, and a current block. For example, from among candidates (1, 0), (−1, 0), (0, 1), and (0, −1) included in the candidate group 0 of FIG. 26, only the candidates (1, 0) and (−1, 0) may be included in the candidate group 0, and only an index corresponding to the bit representation 2604 for indicating a disparity direction may be assigned to each candidate.

When a base motion vector candidate is a bi-directional motion vector, the motion information encoder 3310 may cause each of primary differential motion vector candidates classified according to a disparity distance and a disparity direction to include a primary differential motion vector candidate for a list 0 direction and a primary differential motion vector candidate for a list 1 direction. A method of determining a primary differential motion vector candidate for a bi-direction is the same as that made in relation to the image decoding apparatus 2100, and thus detailed descriptions thereof will not be provided.

In an embodiment, when a base motion vector of a current block is determined, an image encoding method may determine a usage direction of the base motion vector, and the generator 3330 may cause information indicating the usage direction of the base motion vector to be included in a bitstream.

The base motion vector may correspond to a motion vector for a list 0 direction, a motion vector for a list 1 direction, or a motion vector for a bi-direction, and the image encoding method may determine the usage direction of the base motion vector to improve encoding efficiency of a motion vector of the current block.

The information indicating the usage direction of the base motion vector may include an index. For example, when the base motion vector is bi-directional, a bit value 0 may indicate that the usage direction of the base motion vector is the bi-direction, a bit value 10 may indicate that the usage direction of the base motion vector is the list 0 direction, and a bit value 11 may indicate that the usage direction of the base motion vector is the list 1 direction.

Also, for example, when the base motion vector is in a first uni-direction of the list 0 direction or the list 1 direction, the bit value 0 may indicate that the usage direction of the base motion vector is the first uni-direction, the bit value 10 may indicate that the usage direction of the base motion vector is a second uni-direction different from the first uni-direction, and the bit value 11 may indicate that the usage direction of the base motion vector is the bi-direction.

The usage direction of the base motion vector corresponding to the bit value may also be changed.

In an example, when it is determined that a base motion vector is a bi-directional and a usage direction of the base motion vector is a bi-direction, the motion information encoder 3310 may determine a primary differential motion vector of a list 0 direction of a current block and a primary differential motion vector of a list 1 direction. The generator 3330 may cause information indicating the bi-directional base motion vector, information indicating the primary differential motion vector for the list 0 direction of the current block, and information indicating the primary differential motion vector for the list 1 direction of the current block to be included in a bitstream.

In another example, when it is determined that a base motion vector is bi-directional and a usage direction of the base motion vector is a bi-direction, although the motion information encoder 3310 may determine a primary differential motion vector for a list 0 direction of a current block and a primary differential motion vector for a list 1 direction, the generator 3330 may cause information indicating only one of the primary differential motion vector for the list 0 direction and the primary differential motion vector for the list 1 direction and information indicating the base motion vector to be included in a bitstream.

In another embodiment, when a base motion vector is bi-directional and a usage direction of the base motion vector is a first unary direction of a list 0 direction or a list 1 direction, the motion information encoder 3310 may determine a primary differential motion vector of the first uni-direction of a current block, and the generator 3330 may cause information indicating the base motion vector and information indicating the primary differential motion vector for the first uni-direction to be included in a bitstream.

In another example, when a base motion vector is bi-directional and a usage direction of the base motion vector is a first uni-direction of a list 0 direction or a list 1 direction, the motion information encoder 3310 may determine a primary differential motion vector for a second uni-direction different from the first uni-direction of a current block, and the generator 3330 may cause information indicating the base motion vector and information indicating the primary differential motion vector for the second uni-direction to be included in a bitstream.

In another example, when a base motion vector is in a first uni-direction of a list 0 direction or a list 1 direction and a usage direction of the base motion vector is a second uni-direction different from the first uni-direction, the motion information encoder 3310 may determine a primary differential motion vector of the current block for the first uni-direction, and the generator 3330 may cause information indicating the base motion vector and information indicating the primary differential motion vector for the first uni-direction to be included in a bitstream.

In another example, when a base motion vector is in a first uni-direction of a list 0 direction or a list 1 direction and a usage direction of the base motion vector is a bi-direction, the motion information encoder 3310 may determine a primary differential motion vector of a current block for the first uni-direction, and the generator 3330 may cause information indicating the base motion vector and information indicating the primary differential motion vector for the first uni-direction to be included in a bitstream.

In an embodiment, the motion information encoder 3310 may determine whether multi-pass coding is to be applied to a current block. The motion information encoder 3310 may encode the current block according to two different coding modes, and may select one coding mode based on a cost. The generator 3330 may cause information indicating whether the current block is multi-pass coded and information about a coding mode applied to the current block when multi-pass coding is applied to be included in a bitstream.

The two different coding modes may include one of an AMVP mode, a merge mode, and a skip mode, and a preset mode according to the present disclosure.

In an embodiment, the motion information encoder 3310 may determine whether a parent block is split, and may split the parent block into a first child block corresponding to the current block and a second child block adjacent to the first child block. According to an embodiment, the motion information encoder 3310 may determine whether the parent block is split, and may split the parent block into the first child block corresponding to the current block, and the second child block and a third child block adjacent to the first child block.

The motion information encoder 3310 may encode the first child block according to the preset mode, and the generator 3330 may generate a bitstream including information generated as a result of encoding the first child block.

In order to encode the second child block, like for the first child block, the motion information encoder 3310 may encode the second child block according to the preset mode according to the present disclosure. In this case, base motion vector candidates and primary differential motion vector candidates determined for the parent block may also be used for the first child block and the second child block. In other words, the base motion vector candidates and the primary differential motion vector candidates may be determined at a parent block level, a base motion vector of the first child block and a base motion vector of the second child block from among the base motion vector candidates may be independently determined, and a primary differential motion vector of the first child block and a primary differential motion vector of the second child block from among the primary differential motion vector candidates may be independently determined.

In another example, the motion information encoder 3310 may determine a motion vector determined for the first child block as a base motion vector of the second child block, and may determine a primary differential motion vector of the second child block from among primary differential motion vector candidates. The generator 3330 may cause information indicating the base motion vector of the second child block not to be included in a bitstream, and instead, may cause information indicating the primary differential motion vector of the second child block to be included in the bitstream.

In another example, at least one from among the base motion vector, the disparity distance, and the disparity direction determined in relation to the first child block may be applied to the second child block. In this case, the motion information encoder 3310 may encode a motion vector of the second child block by using at least one from among the base motion vector, the disparity distance, and the disparity direction determined in relation to the first child block.

Also, the motion information encoder 3310 may determine a secondary differential motion vector related to one block from among the first child block and the second child block, and the generator 3330 may cause information indicating the determined secondary differential motion vector to be included in the bitstream.

In an embodiment, the motion information encoder 3310 may encode the first child block in the preset mode according to the present disclosure, and the second child block may be encoded in a mode different from the preset mode applied to the first child block.

Figure 34:
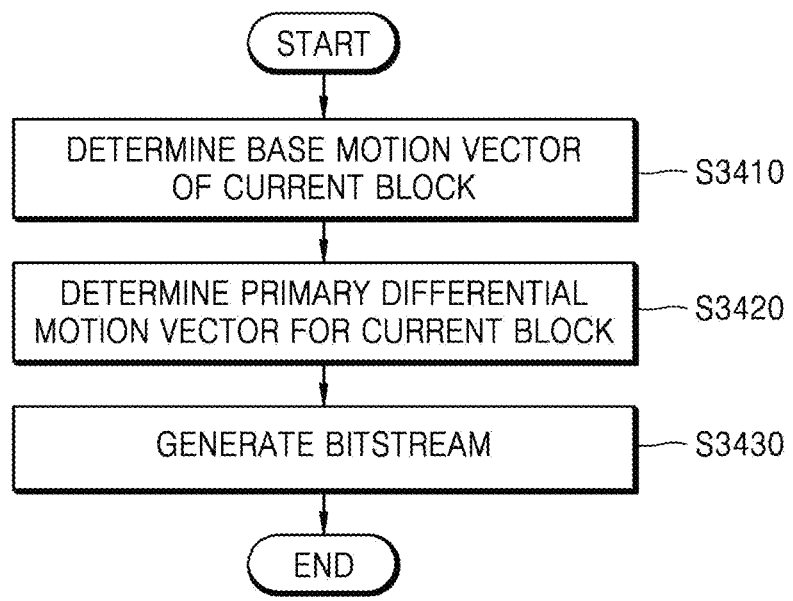
FIG. 34 is a flowchart for describing an image encoding method according to an embodiment.

FIG. 34 is a flowchart for describing an image encoding method according to an embodiment.

In operation S3410, the image encoding apparatus 3300 determines a base motion vector of a current block. The image encoding apparatus 3300 may determine one base motion vector candidate from among one or more base motion vector candidates as the base motion vector of the current block.

In operation S3420, the image encoding apparatus 3300 determines a primary differential motion vector of the current block.

The image encoding apparatus 3300 may determine primary differential motion vector candidates for each of one or more base motion vector candidates, and may determine the primary differential motion vector of the current block from among the primary differential motion vector candidates.

The image encoding apparatus 3300 may determine a primary differential motion vector candidate having a value most similar to a value obtained by subtracting the base motion vector of the current block from a motion vector of the current block as the primary differential motion vector of the current block.

In operation S3430, the image encoding apparatus 3300 generates a bitstream as a result of encoding the current block.

In an embodiment, the bitstream may include information indicating at least one of whether a preset mode is applied to the current block, the base motion vector of the current block, the primary differential motion vector of the current block, a priority of disparity distances for classifying primary differential motion vector candidates, and a priority of disparity directions for classifying primary differential motion vector candidates. The generator 3330 may cause the information to be included in the bitstream corresponding to at least one of a coding unit level, a transform unit level, a largest coding unit level, a slice unit level, and a picture level.

The embodiments may be implemented as a computer-executable program, and the program may be stored in a medium.

The medium may continuously store the computer-executable program, or may temporally store the computer-executable program to execute or download the computer-executable program. Also, the medium may be any of various recording means or storage means including single hardware or a combination of a plurality of hardware, and may be distributed in a network without being limited to a medium directly connected to a computer system. The medium may be configured to store program instructions, and examples of the medium may include a magnetic medium such as a hard disk, a floppy disk, or a magnetic tape, an optical recording medium such as a compact disc read-only memory (CD-ROM) or a digital versatile disc (DVD), a magneto-optical medium such as a floptical disk, a ROM, a random-access memory (RAM), and a flash memory. Also, other examples of the medium may include a recording medium and a storage medium managed by an application store that distributes applications or a site or a server that supplies or distributes various other software.

While the present disclosure has been particularly shown and described with reference to embodiments thereof, it will be understood by one of ordinary skill in the art that various changes in form and details may be made therein without departing from the spirit and scope of the present disclosure as defined by the appended claims.

The invention claimed is:

1. A method of decoding motion information, the method comprising:
    obtaining a first motion vector difference for a first direction by parsing a disparity distance index and a disparity direction index from a bitstream;
    if a prediction direction of a current block corresponds to a bi-direction, deriving a second motion vector difference for a second direction, based on the first motion vector difference, a POC (picture order count) of a current picture, a POC of a first reference picture, and a POC of a second reference picture;
    obtaining a first motion vector for the first direction using the first motion vector difference and a first base motion vector for the first direction;
    obtaining a second motion vector for the second direction using the second motion vector difference and a second base motion vector for the second direction; and
    reconstructing the current block using the first motion vector, the first reference picture, the second motion vector and the second reference picture,
    wherein a picture is split into a plurality of largest coding units, and a largest coding unit among the plurality of largest coding units is hierarchically split into at least one coding unit comprising the current block.

2. A method of encoding motion information, the method comprising:
    obtaining a first motion vector difference for a first direction by using a first motion vector of a current block for the first direction and a first base motion vector for the first direction;
    if a prediction direction of the current block corresponds to a bi-direction, deriving a second motion vector difference for a second direction, based on the first motion vector difference, a POC (picture order count) of a current picture, a POC of a first reference picture, and a POC of a second reference picture; and
    generating a bitstream including a disparity distance index and a disparity direction index, the disparity distance index and the disparity direction index representing the first motion vector difference,
    wherein a picture is split into a plurality of largest coding units, and a largest coding unit among the plurality of largest coding units is hierarchically split into at least one coding unit comprising the current block.

3. A method of transmitting a bitstream,
    the bitstream comprising:
        a disparity distance index; and
        a disparity direction index,
    wherein the disparity distance index and the disparity direction index represent a first motion vector difference for a first direction,
    wherein the first motion vector difference for the first direction is obtained by using a first motion vector of a current block for the first direction and a first base motion vector for the first direction,
    wherein if it is determined that the current block is to be bi-predicted, a second motion vector difference for a second direction is derived based on the first motion vector difference, a picture order count (POC) of a current picture, a POC of a first reference picture, and a POC of a second reference picture, and
    wherein a picture is split into a plurality of largest coding units, and a largest coding unit among the plurality of largest coding units is hierarchically split into at least one coding unit comprising the current block.

* * * * *